US012798724B2

(12) United States Patent
Marchildon et al.

(10) Patent No.: US 12,798,724 B2
(45) Date of Patent: Nov. 17, 2026

(54) RETRACTABLE WHEEL SYSTEM WITH DOUBLE PIVOT

(71) Applicant: KIMPEX INC., Drummondville (CA)

(72) Inventors: Louis-Frederic Marchildon, Drummondville (CA); Patrick L'Herault, St-Marjorique-de-Grantham (CA)

(73) Assignee: Kimpex Inc. (CA)

( * ) Notice: Subject to any disclaimer, the term of this patent is extended or adjusted under 35 U.S.C. 154(b) by 255 days.

(21) Appl. No.: 18/412,201

(22) Filed: Jan. 12, 2024

(65) Prior Publication Data

US 2024/0239444 A1 Jul. 18, 2024

Related U.S. Application Data

(60) Provisional application No. 63/479,769, filed on Jan. 13, 2023.

(51) Int. Cl.
*B62M 27/02* (2006.01)

(52) U.S. Cl.
CPC ....... *B62M 27/02* (2013.01); *B62M 2027/025* (2013.01)

(58) Field of Classification Search
CPC ...................................................... B62M 27/02
See application file for complete search history.

(56) References Cited

U.S. PATENT DOCUMENTS

| | | | | |
|---|---|---|---|---|
| 1,154,370 A * | 9/1915 | Burke | B62B 13/18 16/99 |
| 2,977,073 A * | 3/1961 | Ditter | B64C 25/66 244/108 |
| 3,128,065 A * | 4/1964 | Landes | B64C 25/66 244/108 |
| 6,824,147 B2 * | 11/2004 | Ouellette | B62M 27/00 280/7.14 |
| 8,505,929 B2 * | 8/2013 | Lachance | B62B 13/18 280/10 |
| 8,915,501 B2 * | 12/2014 | Forcier | B62B 13/18 280/11 |
| 9,180,900 B2 * | 11/2015 | Ouellette | B62B 13/18 |
| 10,059,362 B1 * | 8/2018 | Robillard | B62B 17/02 |
| 2024/0190498 A1 * | 6/2024 | Marchildon | B62B 13/18 |
| 2024/0239444 A1 * | 7/2024 | Marchildon | B62D 55/04 |

* cited by examiner

*Primary Examiner* — Erez Gurari
(74) *Attorney, Agent, or Firm* — Eversheds Sutherland (US) LLP

(57) ABSTRACT

A retractable wheel system for a snowmobile ski is provided. The system includes a support plate connectable to the snowmobile ski, an actuator operatively coupled to the support plate and having a driver segment and a driven segment adapted to cooperate to define a double-pivot assembly, and a wheel coupled to the double-pivot assembly. The wheel is movable along a first trajectory between a stowed position, where the wheel is spaced from a ground surface, and an intermediary position, where the wheel contacts the ground surface. The wheel is further movable along a second trajectory between the intermediary position and a deployed position, where the wheel is in engagement with the ground surface and provides lift to the snowmobile ski relative to the ground surface.

19 Claims, 52 Drawing Sheets

RETRACTABLE WHEEL SYSTEM WITH DOUBLE PIVOT

CROSS-REFERENCE TO RELATED APPLICATIONS

This application claims priority under 35USC § 119(e) of U.S. Provisional Application No. 63/479,769, filed Jan. 13, 2023, entitled "RETRACTABLE WHEEL SYSTEM WITH DOUBLE PIVOT", the entirety of which is hereby incorporated by reference.

TECHNICAL FIELD

The technical field generally relates to a wheel system for snowmobiles, and more specifically to a wheel system having a double-pivot actuation system operable to engage the wheel system.

BACKGROUND

Wheel systems can be installed and/or attached to snowmobile skis, allowing for lifting the skis off the ground and moving the snowmobile around on the wheels to prevent or mitigate damaging or wearing down the skis, for example. These wheel systems are typically operated by raising the corresponding ski above the ground and manually actuating or engaging the wheel system to position the wheel below the ski. The ski can then be released, and the snowmobile can be ridden on the wheels. This can be time-consuming and can require physical effort from a rider, for example, in order to lift the ski from the ground and simultaneously engage the wheel system.

Therefore, there is a need for an improved wheel system which would be able to overcome or at the very least minimize some of known drawbacks and/or deficiencies associated with conventional methods and/or devices, for example.

SUMMARY

According to an aspect of the present disclosure, a retractable wheel system for a snowmobile ski is provided. The retractable wheel system includes an actuating assembly comprising a support plate connectable to the snowmobile ski and comprising a first pivot; and a driver segment pivotally connected to the support plate and operable to pivot about the first pivot, the driver segment comprising a second pivot; and a driven segment pivotally connected to the driver segment and operable to pivot about the second pivot. The wheel system also has a wheel coupled to the driven segment and movable therewith about the second pivot between a stowed position, where the wheel is spaced from a ground surface, and a deployed position, where the wheel is in engagement with the ground surface and provides lift to the snowmobile ski relative to the ground surface, wherein operating the driver segment to pivot about the first pivot engages the second pivot in rotation about the first pivot, and further engages the driven segment and the wheel in rotation about the second pivot to position the wheel in the deployed position.

According to an embodiment, the first member comprises a coupler channel defined along a portion thereof, and wherein the actuating assembly further comprises a coupler adapted to extend through the driven segment and engage the coupler channel to operatively couple the driven segment to the driver segment.

According to an embodiment, the coupler channel is arcuate and extends at least partially about the second pivot, and wherein the coupler is configured to guide the rotation of the driven segment and of the wheel about the second pivot upon pivoting the driver segment about the first pivot.

According to an embodiment, the coupler channel includes a first end and a second end, the coupler channel being shaped and adapted to limit movement of the coupler therealong and defining a predetermined range of rotational movement of the wheel about the second pivot.

According to an embodiment, upon pivoting the first member, the coupler is adapted to slide along the coupler channel from the first end toward the second end, and the wheel is adapted to pivot about the first pivot and the second pivot simultaneously.

According to an embodiment, upon sliding the coupler from the first end to the second end, the wheel is pivoted further than a normal vector extending from the ground surface through the second pivot.

According to an embodiment, when the coupler abuts against the second end, pivoting the driver segment engages the driven segment and the wheel in rotation about the first pivot, and wherein the wheel is adapted to engage with and push against the ground surface for lifting the snowmobile ski from the ground.

According to an embodiment, wherein the driver segment is adapted to pivot about the first pivot by a driver distance to engage the wheel in rotation about the second pivot by a wheel distance, wherein the wheel distance is about 3 to 12 times greater than the driver distance.

According to an embodiment, the actuating assembly comprises a resilient element configured to bias the wheel to the stowed position.

According to an embodiment, the resilient element comprises a coiled spring or a helicoidal spring operatively coupled to the driver segment and configured to bias the driver segment about the first pivot to revert the wheel to the stowed position.

According to an embodiment, the resilient element comprises a compression spring operatively coupled between the driver segment and the driven segment to assist in rotating the driven segment about the second pivot to revert the wheel to the stowed position.

According to an embodiment, the support plate comprises a guiding slot, and wherein the coupler is adapted to extend through the driver segment and the driven segment to engage the guiding slot and operatively couple the driver segment, the driven segment and the support plate to one another.

According to an embodiment, the guiding slot comprises a deployment slot section adapted to guide the coupler along a predetermined deployment trajectory from a starting location to an end location to guide the wheel from the stowed position to the deployed position.

According to an embodiment, the guiding slot comprises a retraction slot section adapted to guide the coupler along a predetermined retraction trajectory from the end location to the starting location to guide the wheel from the deployed position to the stowed position.

According to an embodiment, the support plate comprises a locking component configured to at least temporarily lock the coupler in at least one of the starting location and the end location.

According to an embodiment, the coupler is spring-loaded, and the locking component comprises a deployment cam device provided along the deployment slot section, and wherein the coupler is adapted to retract upon engagement with the deployment cam device and extend upon clearing the deployment cam device, thereby preventing movement of the coupler along the deployment slot section toward the starting location.

According to an embodiment, the locking component comprises a retraction cam device provided along the retraction slot section, and wherein the coupler is adapted to retract upon engagement with the retraction cam device and extend upon clearing the retraction cam device, thereby preventing movement of the coupler along the retraction slot section toward the end location.

According to an embodiment, the support plate is removably connectable to the snowmobile ski.

According to an embodiment, the actuating assembly is a left-side actuating assembly removably connectable to a left-side ski of the snowmobile, and wherein the retractable wheel system further comprises a right-side actuating assembly adapted to be connected to a right-side ski of the snowmobile; and a right-side actuating assembly removably connectable to the right-side adapter plate.

According to an embodiment, the support plate is connectable to an inner side of the snowmobile ski facing the opposite ski.

According to another aspect, a snowmobile having a pair of skis provided with respective retractable wheel systems as defined above is provided.

According to another aspect, a snowmobile ski having the retractable wheel system as defined above is provided.

According to another aspect, a kit for a snowmobile comprising a snowmobile ski and a retractable wheel system as defined above is provided.

According to another aspect, a retractable wheel system for a snowmobile ski is provided. The retractable wheel system includes a support plate connectable to the snowmobile ski; an actuator operatively coupled to the support plate and comprising a driver segment and a driven segment adapted to cooperate to define a double-pivot assembly; and a wheel coupled to the double-pivot assembly and being movable along a first trajectory between a stowed position, where the wheel is spaced from a ground surface, and an intermediary position, where the wheel contacts the ground surface, the wheel being further movable along a second trajectory between the intermediary position and a deployed position, where the wheel is in engagement with the ground surface and provides lift to the snowmobile ski relative to the ground surface.

According to an embodiment, movement of the wheel along the first trajectory includes a rotational movement of the wheel about a first pivot axis, and further includes a rotational movement of the wheel about a second pivot axis.

According to an embodiment, the wheel is adapted to rotate about the first pivot axis and the second pivot axis generally simultaneously during movement along the first trajectory.

According to an embodiment, the actuator comprises an angular range limiter configured to block rotation of the wheel about the second pivot axis during movement of the wheel along the second trajectory.

According to an embodiment, the driver segment is pivotally connected to the support plate about the first pivot axis, and the driven segment is pivotally connected to the driver segment about the second pivot axis.

According to an embodiment, the actuator comprises a follower pin configured to operatively coupled the driven segment to the driver segment such that pivoting the driver segment about the first pivot axis engages the driven segment in rotation about the second pivot axis.

According to an embodiment, the follower pin is housed in a portion of the driven segment and operatively engages the angular range limiter.

According to an embodiment, the angular range limiter comprises a groove defined in the driver segment.

According to an embodiment, the actuating assembly comprises a biasing mechanism provided with one or more resilient elements configured to bias the wheel to the stowed position.

According to an embodiment, the one or more resilient elements comprise a coiled spring or a helicoidal spring operatively coupled to the driver segment and configured to bias the driver segment about the first pivot to revert the wheel to the stowed position.

According to an embodiment, the one or more resilient elements comprise a compression spring operatively coupled to at least one of the driver segment and the driven segment, the compression spring being configured to generate a force opposing rotation of at least one of the driver segment and the driven segment to assist in reverting the wheel to the stowed position.

According to an embodiment, the one or more resilient elements comprise a secondary pivot biasing element configured to oppose rotation of the driven segment about the second pivot and exert a force thereon to assist in reverting the wheel to the stowed position.

DETAILED DESCRIPTION

Figure 1:
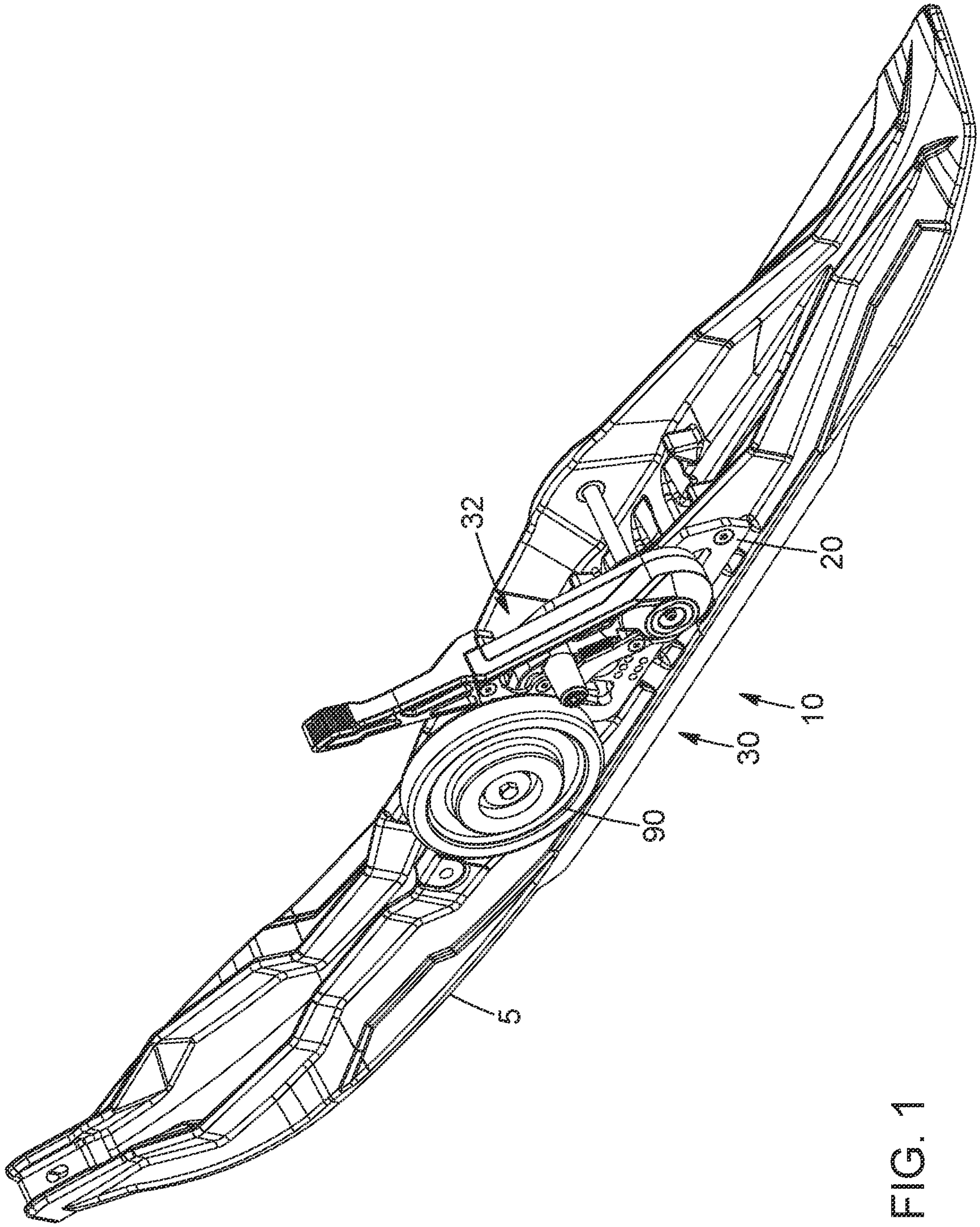
FIG. 1 is a perspective view of a snowmobile ski provided with a wheel system according to an embodiment.
Figure 2:
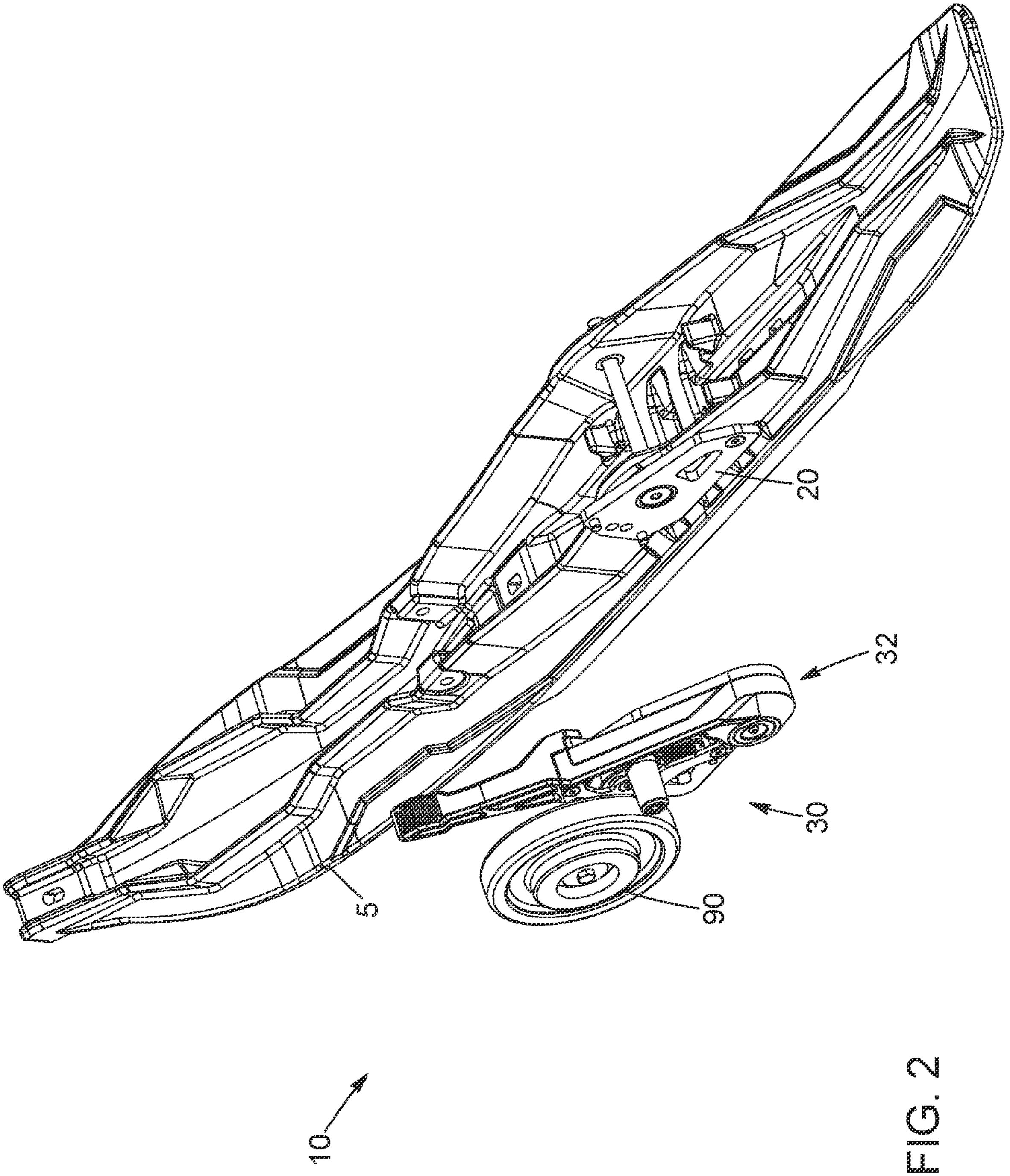
FIG. 2 is a perspective view of the snowmobile ski shown in FIG. 1, showing the wheel system disconnected from the snowmobile ski, according to an embodiment.
Figure 3:
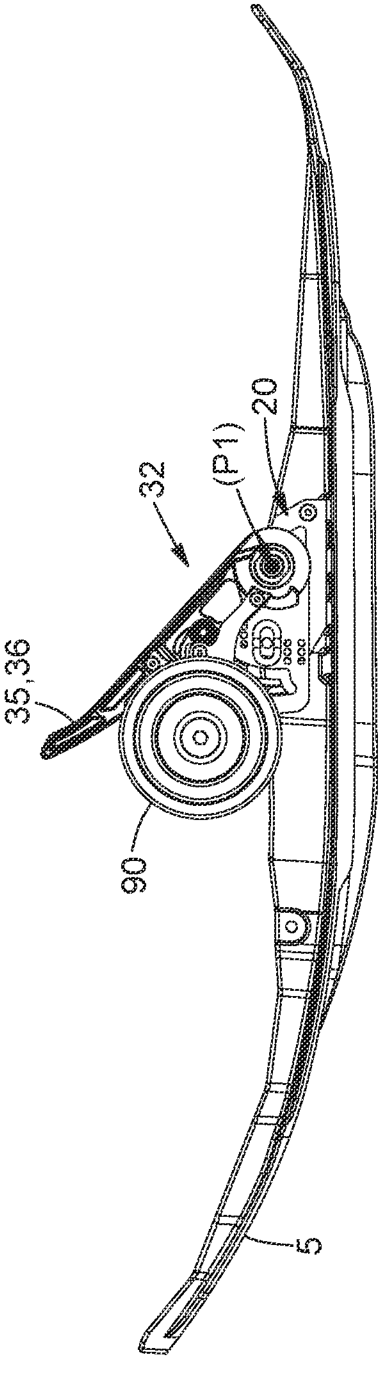
FIGS. 3 and 4 are front views of the snowmobile ski shown in FIG. 1, showing an actuating assembly in an idle configuration (FIG. 3) and in an engaged configuration (FIG. 4), according to an embodiment.
Figure 4:
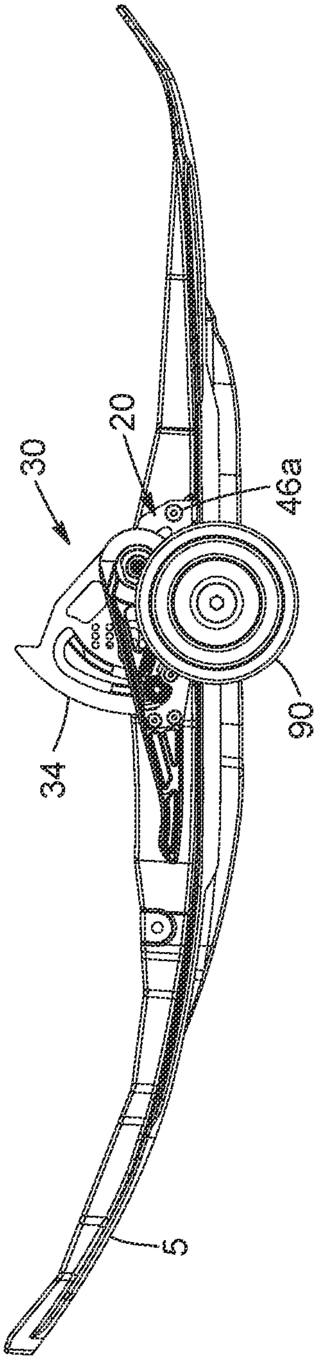

As will be described herein in relation with various embodiments, a wheel system for a snowmobile ski is provided. The wheel system generally includes an adapter plate adapted to be secured to a ski of the snowmobile, an actuating assembly provided with a support plate connectable to the adapter plate and a wheel operatively connected to the actuating assembly. The actuating assembly comprises an actuator operable for displacing the wheel in a desired configuration. The actuator includes a first member (also referred to as a driver or driver segment) pivotally coupled to the support plate, and a second member (also referred to as a driven segment) pivotally coupled to the first member, with the wheel being coupled to the second member. The first member is pivotable about a first pivot defined at least partially on the adapter plate, and the second member is pivotable about a second pivot defined at least partially on the first member. The actuation of the first member (e.g., pivoting about the first pivot) therefore displaces the location of the second pivot in rotation about the first pivot, thereby engaging the second member and the wheel in rotation about the first and second pivots simultaneously. As such, the actuating assembly can define a double-pivot or double-pivoting assembly configured to facilitate displacement of the wheel.

The wheel can therefore be displaced from an elevated or stowed position, where the wheel is spaced from a ground surface (enabling riding the snowmobile on the ski), to a deployed or engaged position, where the wheel engages the ground surface to lift the ski off the ground and enable riding the snowmobile on wheels. As will be described further below, the wheel is adapted to rotate about the first and second pivots, between the stowed and engaged positions, in order to pass a central axis defined by a normal axis or vector extending from the ground surface through the second pivot. In other words, the wheel is adapted to pivot from the stowed position to an over-centered position to at least partially lock the wheel in the desired position. This configuration enables the wheel to remain in the engaged position as long as the wheel remains in engagement with the ground surface (or any other corresponding surface) while riding the snowmobile.

In some embodiments, the wheel system includes a stowing or biasing mechanism configured to move or urge the wheel from the engaged position back to the stowed position. More particularly, the stowing mechanism is adapted to autonomously or automatically move the wheel back to the elevated position in order to ride the snowmobile on its skis once more. In the described embodiments, the stowing mechanism includes a biasing element, such as a spring, configured to generate a force on the wheel, when in the engaged position, to move it back to the stowed position. As mentioned, the over-centered position prevents the biasing element from moving the wheel back to the stowed position as the ground surface blocks said movement. It is thus noted that the wheel can be moved back to the stowed position by lifting it up from the ground surface, thereby enabling movement of the wheel past the central axis and back to the stowed position.

The actuating assembly includes a coupler or follower configured to extend through the first and second member, thereby coupling them together to enable rotation of the second member upon actuation of the first member, or vice versa. The coupler thereby enables, or at least assists in enabling the double-pivoting motion of the actuating assembly to facilitate movement of the wheel from the stowed position to the engaged position. The adapter plate can have a guiding slot defined on a surface thereof, with the coupler being further configured to engage the guiding slot. It is thus noted that the first member, the second member and the adapter plate are coupled to one another via the coupler, and that the guiding slot of the adapter plate is shaped and configured to guide, or at least assist in guiding the movement or trajectory of the coupler upon operation of the actuating assembly.

Referring to FIGS. 1 to 4, a wheel system 10 for a snowmobile ski 5 is shown in accordance with a possible embodiment. The wheel system 10 includes an adapter plate 20 adapted to be secured to the ski 5, an actuating assembly 30 connectable to the adapter plate 20, and a wheel 90 operatively coupled to the actuating assembly 30. The actuating assembly 30 includes an actuator 32 operable between an idle configuration (seen in FIG. 3), where the wheel 90 is in a stowed position, such as raised or elevated off a ground surface, and in an engaged configuration (seen in FIG. 4), where the wheel 90 is in an engaged position, such as in contact or in engagement with the ground surface. As will be described further below, operation of the actuator from the idle configuration to the engaged configuration displaces the wheel in order for it to engage and push against the ground to lift the ski 5 off the ground, thereby enabling a user (e.g., a rider) to ride the snowmobile on the wheel instead of the ski.

In this embodiment, the actuating assembly 30 includes a support plate 34 adapted to be removably and adjustably connected to the adapter plate 20. The actuating assembly 30 can therefore be selectively connected to and disconnected from the adapter plate 20, and thereby from the ski 5 of the snowmobile. For example, in loose snow or on snow-covered terrain, the wheel system may be superfluous, and a user (e.g., a rider of the snowmobile) can choose to disconnect the actuating assembly 30 from the adapter plate 20.

With reference to FIGS. 5 to 9, in addition to FIGS. 1 to 4, the actuator 32 can have a portion thereof adapted to be pivotally connected to the support plate 34 which is in turn coupled to the ski 5, as described above. The wheel 90 is coupled to the actuator 32 such that operation of the actuator engages the wheel in a pivoting or rotating motion to move between the stowed and engaged positions. It should be understood that the wheel is coupled to the actuator 32, on a corresponding axle 92 defining a wheel axis (W), thereby allowing the wheel to rotate about the wheel axis (W) to enable riding the snowmobile on the wheel. The actuator 32 includes at least two segments 35 pivotally connected to the support plate and/or to each other such that each segment is configured to pivot about at least respective pivot axes. It is thus noted that the actuator 32 defines a multi-pivoting assembly configured to facilitate (e.g., expedite) movement/rotation of the wheel.

Figure 5:
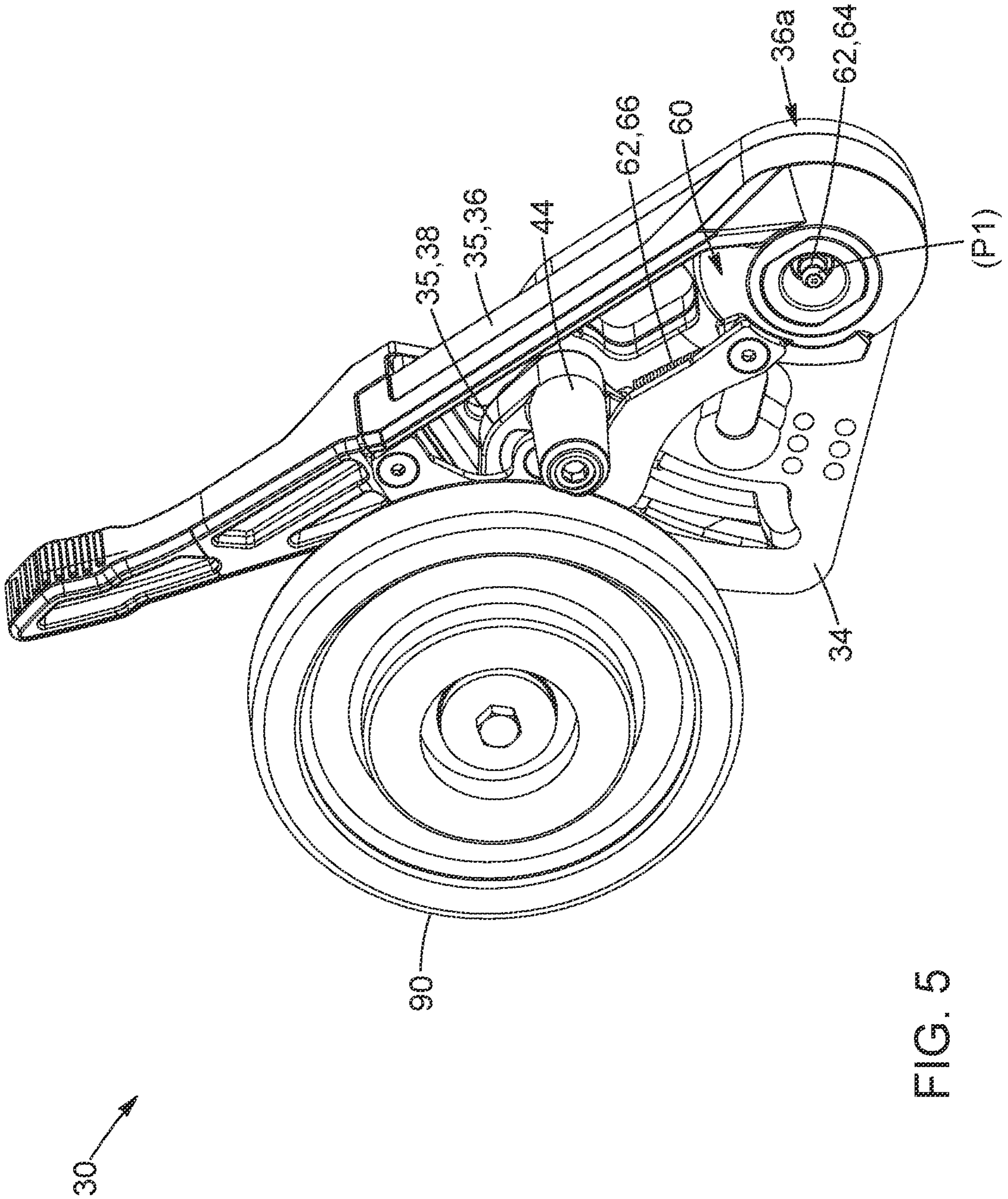
FIG. 5 is a perspective view of the actuating assembly shown in FIG. 3, showing a wheel coupled to a driver segment of the actuating assembly, according to an embodiment.
Figure 6:
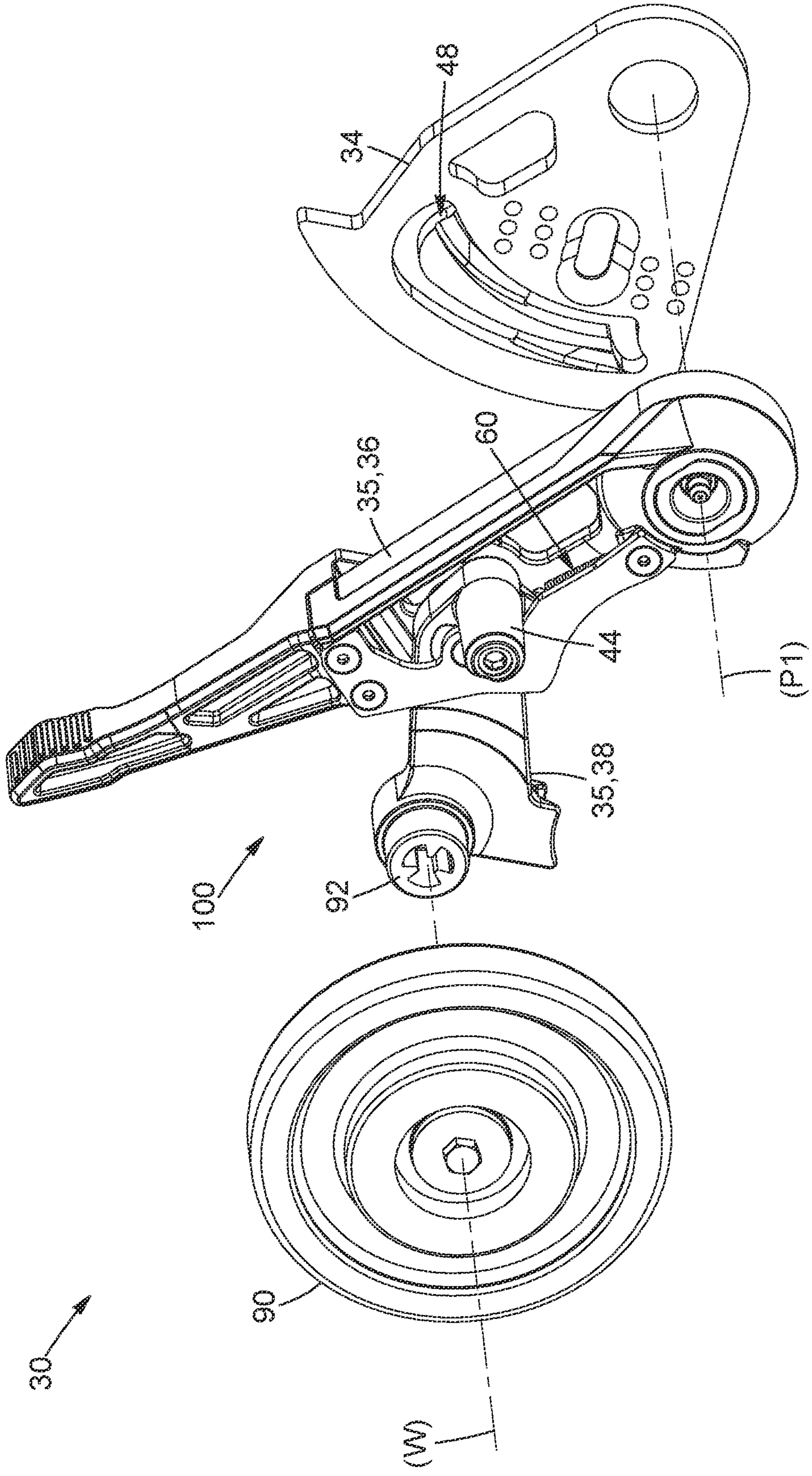
FIG. 6 is an exploded view of the actuating assembly shown in FIG. 5, showing the wheel being connectable to a driven segment, which is connected to the driver segment, which is connectable to a support plate, according to an embodiment.
Figure 13:
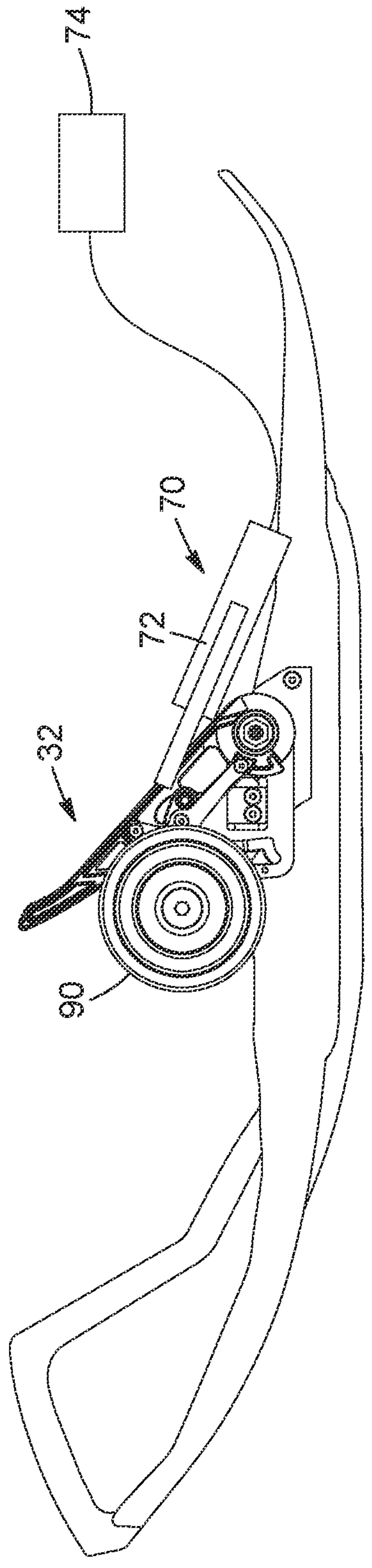
FIGS. 13 and 14 are front views of a snowmobile ski, showing an alternate embodiment of the actuating assembly including a mechanical device coupled thereto for operating between an idle configuration (FIG. 13) and an engaged configuration (FIG. 14).
Figure 14:
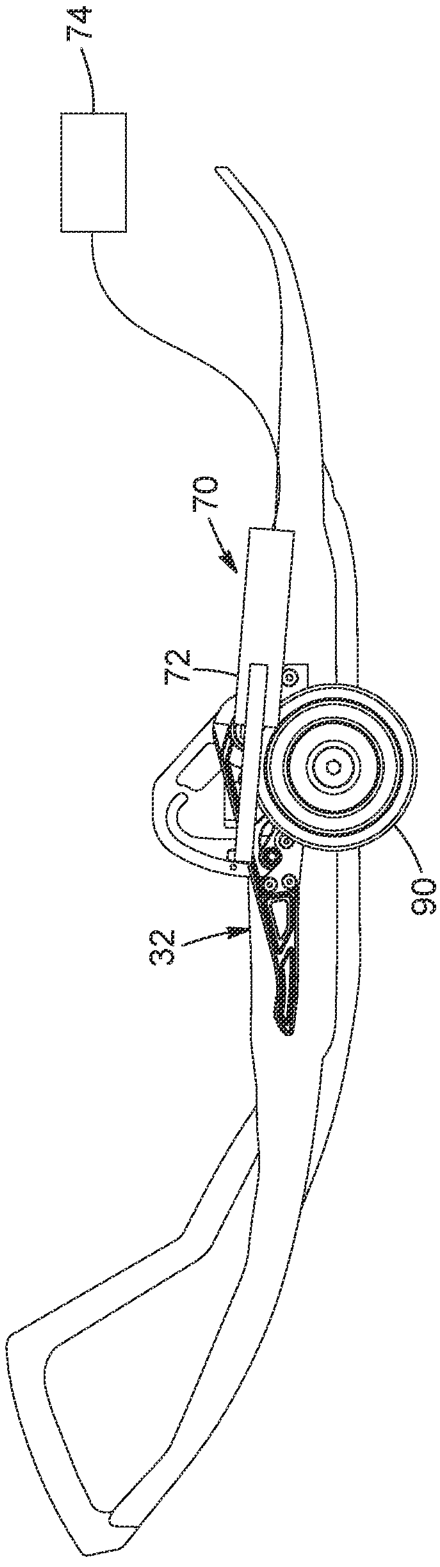
Figure 15:
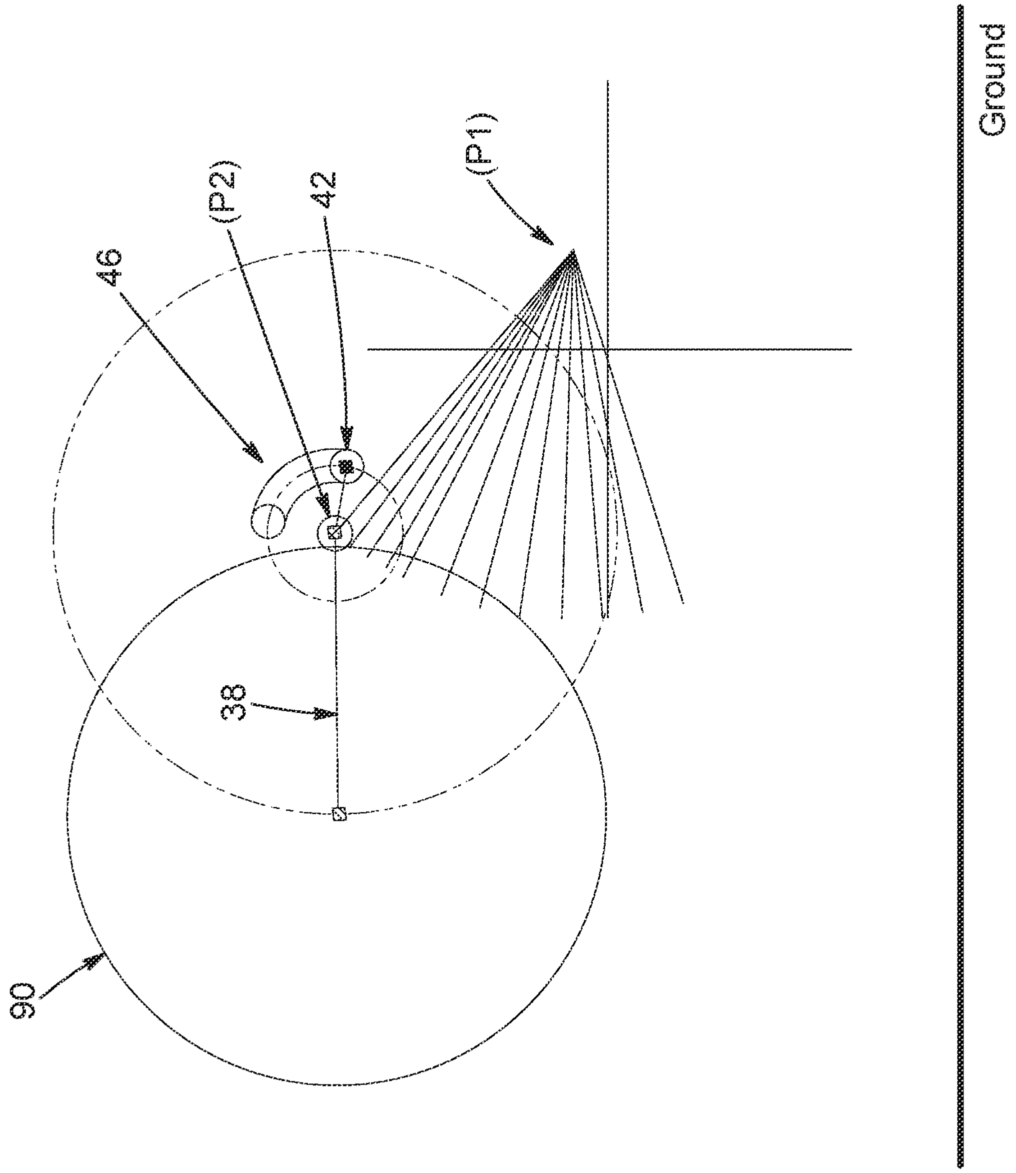
FIGS. 15, 17, 19, 21, 23, 25, 27, 29, 31, 34, 37 and 40 are schematic representations of the trajectory of the various components of the actuating assembly during operation thereof, according to an embodiment.
Figure 16:
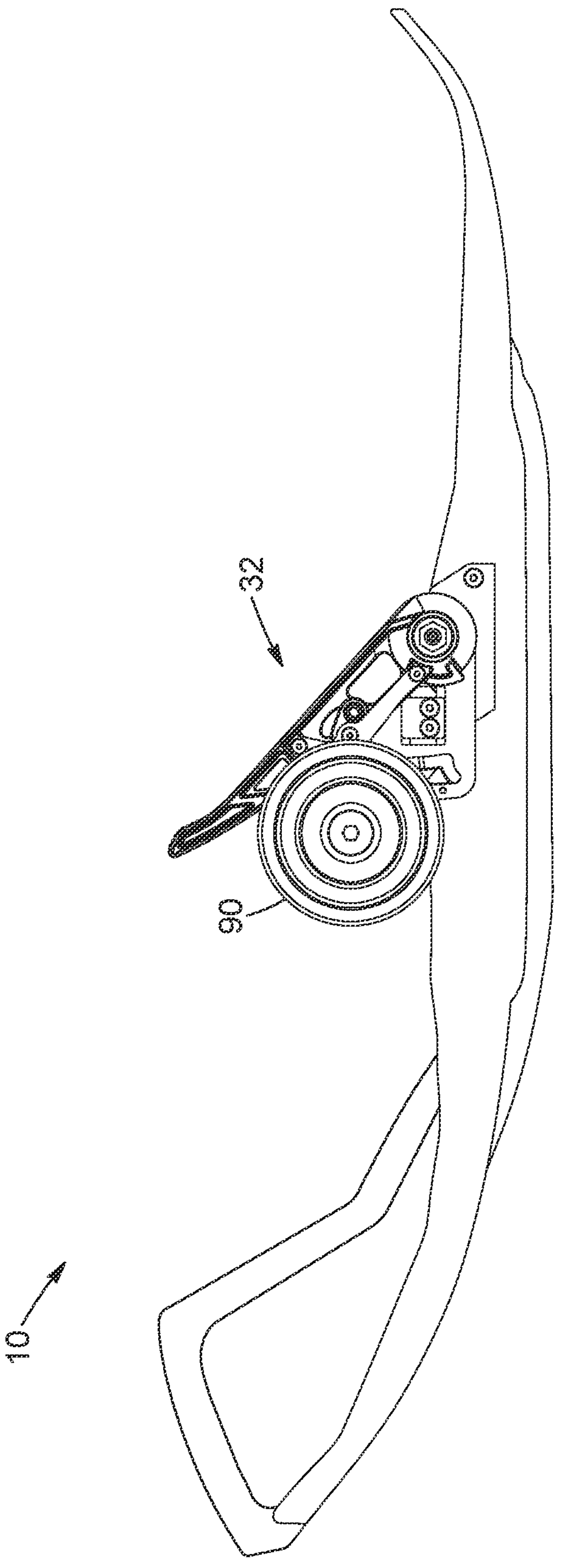
FIGS. 16, 18, 20, 22, 24, 26, 28, 30, 33, 36, 39 and 41 are front views of the snowmobile ski and actuating assembly in various positions and corresponding to the trajectory shown in FIGS. 15, 17, 19, 21, 23, 25, 27, 29, 31, 34, 37 and 40, respectively.

In this embodiment, the actuator segments 35 include a first segment, or driver segment 36 pivotally connected to the support plate 34 and adapted to be actuated to operate the actuating assembly 30 (e.g., to move the wheel). As seen in FIGS. 5 and 6, the driver segment 36 is connected to the support plate at a proximal end **36*a* thereof and is adapted to pivot about a first pivot and/or first pivot axis (P1) between an idle position (e.g., for having the wheel in the stowed position) and an engaged, operational or driven position (e.g., for having the wheel in the engaged position). In some embodiments, the driver segment 36 can correspond to a pedal configured for manual operation, such as via a rider's foot, for example. However, it is appreciated that other methods of operating the driver segment are possible and may be used. For example, the driver segment can include a handle adapted for manual operation via the hand, or the actuating assembly 30 can be provided with a mechanical device configured and/or operable for automated control of the actuating assembly 30. As seen in FIGS. 13 and 14, the mechanical device 70 can include an electrical, pneumatic or hydraulic actuator 72 connected to a power source 74 operable to engage the actuator 32 and operate the actuating assembly in the desired configuration. Therefore, it is noted that the mechanical device 70 foregoes the need for the user's manual force to operate the actuating assembly 30**, without necessarily preventing manual operation of the actuator, if desired.

Still with reference to FIGS. 5 to 9, the actuator segments 35 include a second segment, or driven segment 38 pivotally connected to the driver segment 36. The driven segment 38 is adapted to pivot, relative to the driver segment, about a second pivot and/or second pivot axis (P2) spaced from the first pivot axis (P1). In this embodiment, the driver segment 36 and the driven segment 38 include respective openings 37, 39 superposable to enable a fastener, such as a pin 40, to be inserted therethrough for pivotally connecting the driven segment to the driver segment. The driven segment 38 can be operatively coupled to the driver segment 36 such that, upon rotation of the driver segment about the first pivot axis (P1), the driven segment is urged to rotate about the second pivot axis (P2). For example, the driven segment 38 can be coupled to the driver segment 36 via a follower or coupler 42 engaging both segments. As such, movement of one of the driver and driven segments can engage the other one of the driver and driven segments in motion.

In this embodiment, the driven segment 38 includes a coupler casing 44 shaped and configured to house the coupler 42 therein, and the driver segment 36 includes a coupler slot or channel 46 shaped and adapted to have a portion of the coupler 42 extend therethrough. Therefore, as the driver segment 36 is pivoted, the coupler channel 46 is correspondingly moved, thereby displacing the coupler 42 located therealong. More particularly, the coupler 42 moves with the driver segment 36 (e.g., as the driver segment is pivoted) and also moves along the coupler channel 46. As such, the driven segment 38 correspondingly moves with the driver segment about the first pivot axis, and also pivots about the second pivot axis as the coupler moves along the coupler channel. In other words, engaging the driver segment 36 in rotation about the first pivot engages the driven segment 38 in rotation about the second pivot, in addition to rotating about the first pivot. It is thus noted that the driver and driven segments cooperate to form a double-pivot assembly 100 of the actuating assembly 30.

Figure 7:
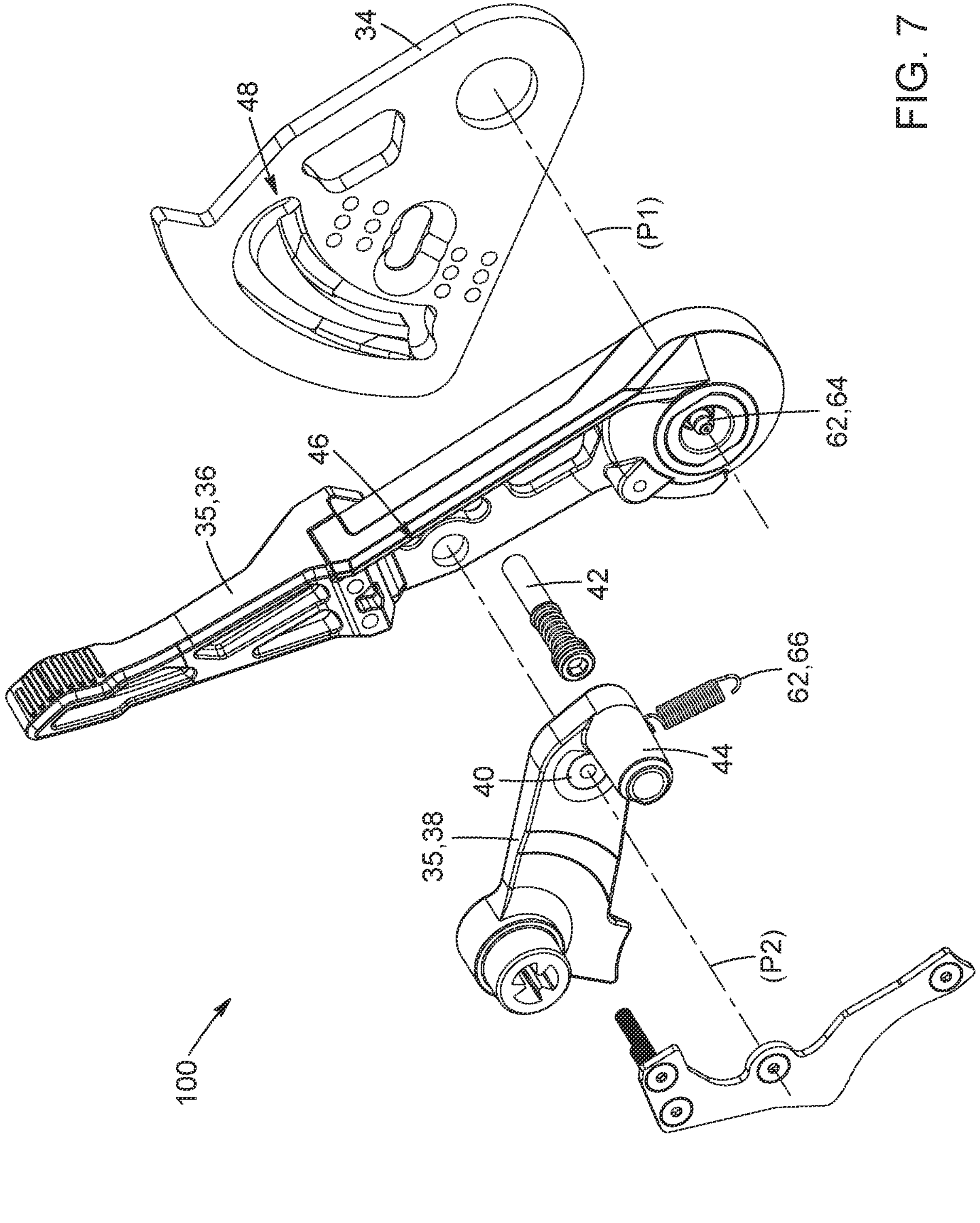
FIG. 7 is an exploded view of a portion of the actuating assembly shown in FIG. 6, showing a coupler for coupling the driver segment, the driven segment and the support plate together, according to an embodiment.
Figure 9:
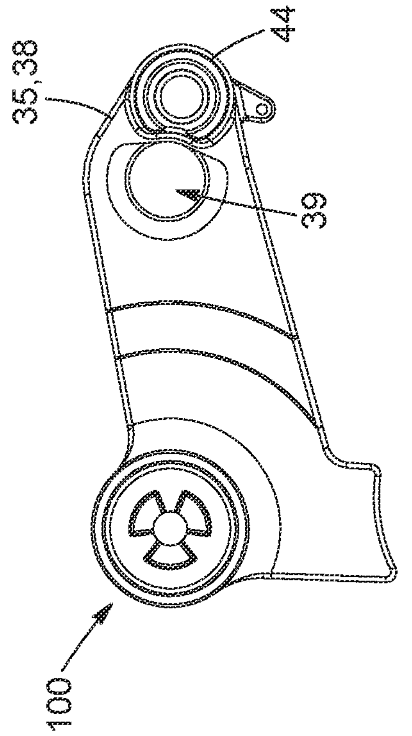
FIGS. 8 and 9 are front views of the driver segment and driven segment, respectively, showing a first axis, a second axis and a wheel axle, according to an embodiment.
Figure 8:
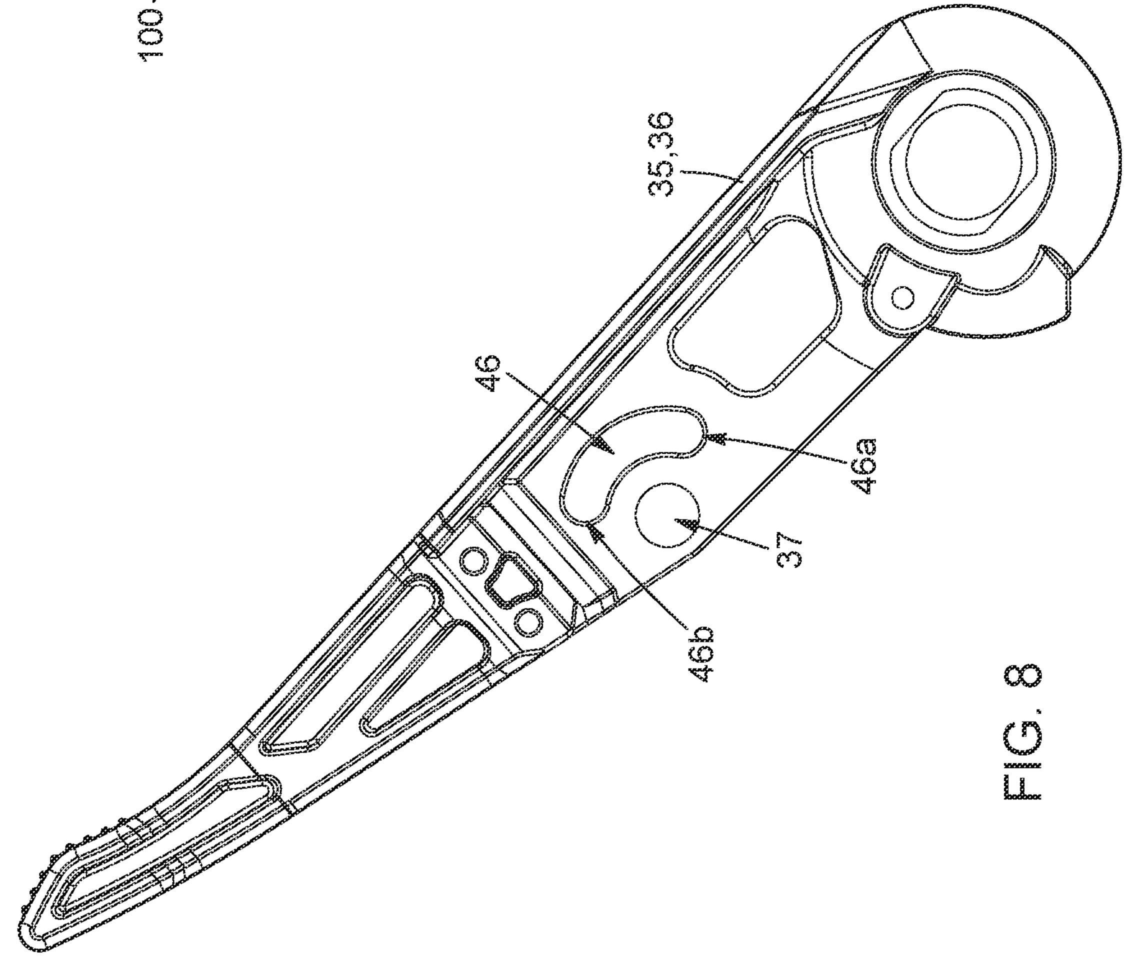

As seen in FIGS. 7 to 9, the coupler channel 46 is shaped and sized to extend at least partially about the opening 37 defining the second pivot axis (P2). Therefore, movement of the coupler 42 along the coupler channel 46 corresponds to a rotation of the coupler about the second pivot axis. In the illustrated embodiment, the coupler casing 44 is provided proximate an end of the driven segment 38, spaced from the opening 39 defining the second pivot axis (P2). With the coupler 42 being housed and/or retained within the coupler casing 44, it is noted that the coupler casing 44 is urged to move (e.g., rotate) about the second pivot axis along with the coupler 42, engaging the driven segment 38 in rotation. However, it is appreciated that other types of connections, configurations or cooperation between the driver and driven segments are possible and may be implemented to form a double-pivot assembly, as defined above.

It should be noted that the driven segment 38 can have a predetermined range of angular motion due to the coupler 42 being confined within the coupler channel 46 of the driver segment 36. For example, the coupler 42 can be positioned in a first position in engagement with a first end 46*a* of the coupler channel. The first position can correspond to a position of the coupler 42 when the actuating assembly is operated in the idle configuration (e.g., when the driver segment 36 is in the idle position). Then, upon actuation of the driver segment 36, the coupler 42 is displaced (e.g., slides) along the coupler channel towards a second end 46*b* thereof, engaging the driven segment, and therefore the wheel 90, in rotation about the second pivot axis. In some embodiments, the coupler channel 46 is shaped and sized to enable a rotation of the coupler 42, of the driven segment and of the wheel about the second pivot by any suitable angle, such as between 40 degrees and 180 degrees, such as between 60 degrees and 150 degrees, such as between 80 degrees and 120 degrees, although other configurations are possible. It is thus noted that the coupler channel 46 corresponds to an angular range limiter adapted to limit the angular motion of the driven segment about the second pivot axis.

As seen in FIGS. 8 and 9, a distance between the wheel axle 92 and the opening 39 defining the second pivot through the driven segment 38 is greater than a distance between the coupler casing 44 and the opening 39. Therefore, and although the angular motion of the coupler casing and of the wheel axle is substantially the same, it should be understood that the range of motion (e.g., the distance traveled) of the wheel axle is greater than that of the coupler casing. Moreover, the double-pivot assembly is configured to enable greater angular motion of the driven segment 38 (and therefore of the wheel) from smaller angular motion of the driver segment 36. For example, it is noted that movement of the driver segment 36 displaces the coupler channel 46 in rotation about the first pivot axis. Therefore, the double-pivot assembly is configured to engage the coupler 42 in rotation simultaneously about the first pivot axis and about the second pivot axis. As will be further described below, in some embodiments, the driver segment can be operated and pivoted by about 10 degrees to engage the driven segment in rotation by about 100 degrees. As such, the double-pivot assembly can define a pivoting distance ratio between the driver segment and the driven segment (and the wheel) of about 10:100, although other configurations and ratios are possible.

As the driver segment 36 is pivoted about the first pivot, the coupler 42 travels along the coupler channel 46 and engages the second end 46*b*. It is noted that rotation of the driven segment 38 about the second pivot axis is blocked once the coupler 42 has engaged with and/or abutted against the second end 46*b* of the coupler channel 46. The wheel 90 is positioned in an intermediary position (e.g., between the stowed and deployed positions) when the coupler 42 engages the second end 46*b*, and prior to pivoting the driver segment further toward the driven position. In the intermediary position, the wheel has rotated in an over-centered position (e.g., seen in FIG. 23) and is proximate to or has initiated its engagement with the ground surface. The driver segment 36 is then further pivoted about the first pivot (e.g., toward the operational position) which engages the driven segment, and corresponding/associated parts, in rotation about the first pivot, since rotation about the second pivot is blocked. Therefore, the wheel 90 engages and pushes against the ground surface as it rotates about the first pivot in order to lift the ski off from the ground and enable traveling on the wheel 90. It is noted that the wheel system 10 is configured to maintain the wheel 90 in the engaged position due to its over-centered position which prevents the wheel from reverting to the intermediary and/or stowed positions due to the presence of the ground surface. In other words, the weight of the snowmobile (with or without the rider) maintains the wheel in the over-centered position.

With reference to FIGS. 5, 7, 11 and 12, in some embodiments, the wheel system 10 includes a biasing mechanism 60 configured to bias the wheel 90 in the stowed configuration. More specifically, the biasing mechanism 60 is operatively coupled to the actuating assembly 30 to assist in returning the wheel to the stowed position, for example, after having deployed the wheel in the engaged position. In this embodiment, the biasing mechanism 60 includes a resilient element 62 configured to generate a force on one or more components of the actuating assembly 30 to bias the wheel 90 in the stowed position. The resilient element 62 can be coupled to one or more of the driver segment 36, the driven segment 38 and the wheel 90 to generate a reverting force on the corresponding component. For instance, the resilient element 62 can include a torsion spring or helicoidal spring 64 (also seen in FIG. 44) operatively coupled to the driver or driven segment about the first or second pivot, respectively.

It should thus be understood that the helicoidal spring 64 is adapted to generate a force opposite the force required to operate the actuating assembly 30 in order to revert the assembly to an idle configuration. In this embodiment, the driver segment is configured to be rotated counter-clockwise (e.g., downwardly) about the first pivot. As such, the helicoidal spring is configured to generate a biasing force on the driver segment clockwise about the first pivot in order to counter and/or revert the movement of the driver segment. However, it is appreciated that other configurations are possible.

In the illustrated embodiment, the driver segment 36 can be adapted to house the helicoidal spring 64 at its proximal end such that the helicoidal spring 64 is coupled about the first pivot within the driver segment. The helicoidal spring 64 is therefore configured to generate a force on the driver segment 36 (e.g., once the driver segment is actuated/pivoted) to have the driver segment return to the idle position (seen in FIG. 3). In some embodiments, the resilient element 62 can alternatively, or additionally, include a tension spring 66 operatively coupled between the driver and the driven segments. For example, the tension spring 66 can be connected to the driver segment proximate the proximal end (e.g., proximate the first pivot) and connected to the driven segment proximate to the coupler casing 44 and/or the second pivot. As described above, upon actuation of the driver segment, the driven segment is engaged in rotation about the second pivot. Therefore, it is noted that rotation of the driven segment about the second pivot can engage the tension spring 66 in extension, thereby generating a force adapted to counter and/or revert the movement of the driven segment.

It should be noted that, when the wheel is positioned in the over-centered position, such as illustrated in FIGS. 4 and 23 to 40, the biasing mechanism 60 is blocked by the wheel's engagement with the ground surface. In other words, the wheel is prevented from reverting to the stowed position due to the over-centered configuration of its position. Therefore, the wheels remain in operation (e.g., the snowmobile can be ridden on the wheels) as long as the wheels remain in contact and/or in relative engagement with the ground surface. In some embodiments, lifting the wheels from the ground allows the biasing mechanism 60 to revert the wheel back toward the stowed position. For example, the ski can be lifted (e.g., manually) to enable the wheel to disengage the ground and "snap back" to the stowed position. Alternatively, the rider can perform a manoeuvre to raise the front end of the snowmobile from the ground temporarily, but by a sufficient height and during a sufficient amount of time to enable the wheels to autonomously (e.g., via gravity and/or the biasing mechanism) move to the stowed position, thereby enabling the rider to land back on the snowmobile's skis. It is appreciated that many other embodiments and configurations of the biasing mechanism 60 and/or resilient element(s) 62 are possible and may be implemented to assist in reverting the wheel to its stowed position.

With reference to FIGS. 6 to 10, the support plate 34 can include a guiding slot 48 defined along a surface thereof and adapted to receive a portion of the coupler 42 therein. More particularly, the guiding slot 48 is configured to guide the movement of the coupler during operation of the wheel system. It is thus noted that the coupler 42 extends through and/or engages the driver segment 36, the driven segment 38 and the support plate 34, and that the guiding slot 48 can be configured to guide movement of the coupler 42 relative to the driver segment, the driven segment and the support plate. For example, and with reference to FIG. 10, the guiding slot 48 can include a deployment slot section 50 adapted to guide the coupler 42 during deployment of the wheel (e.g., from the stowed position to the deployed position). In the illustrated embodiment, the guiding slot 48 also includes a retraction slot section 52 adapted to guide the coupler 42 as the wheel is retracted back into the stowed position. It is noted that, in order to guide the coupler 42 along its trajectory, the guiding slot 48 is shaped, sized and configured to enable movement of the coupler 42 as it pivots about the first pivot axis and the second pivot axis, independently and/or simultaneously.

In some embodiments, the guiding slot 48 corresponds to a recess 49 defined in a thickness of the support plate 34. In other words, the guiding slot 48 does not extend completely through the support plate, and the coupler can be adapted to engage the guiding slot 48 by extending into the recess 49, contacting a bottom surface thereof and/or contacting sidewalls thereof during operation of the wheel system. Alternatively, the guiding slot 48 can be defined as an opening extending through the support plate such that the coupler 42 can correspondingly extend through the support plate via the guiding slot.

Figure 10:
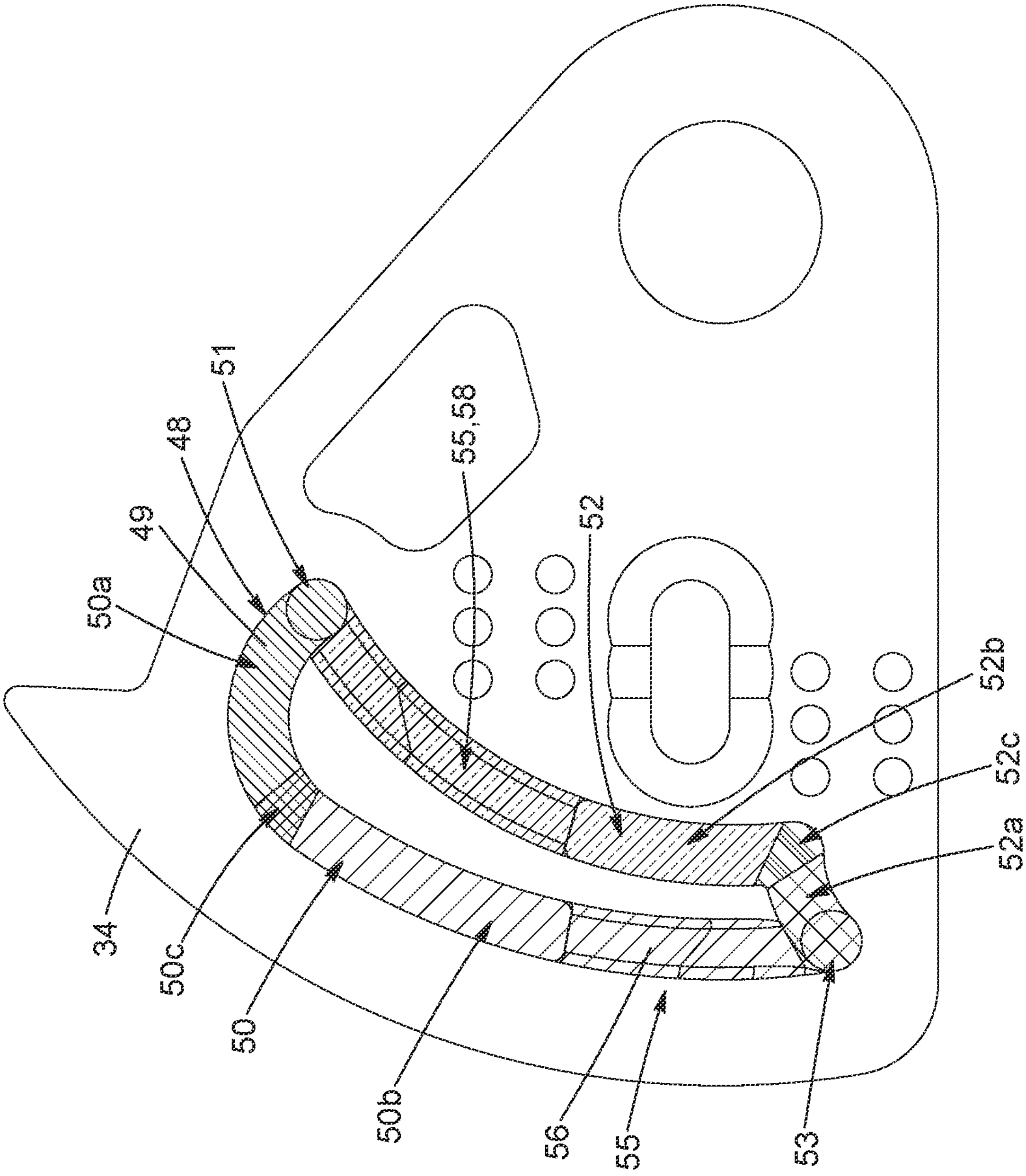
FIG. 10 is a front view of the support plate shown in FIG. 6, showing a guiding slot configured to guide movement of the coupler, according to an embodiment.
Figure 12:
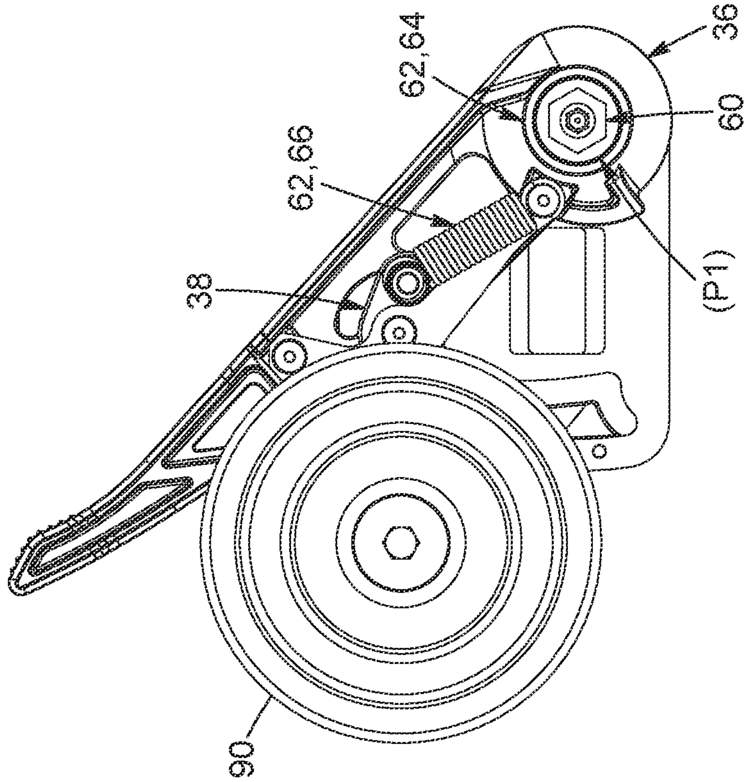
FIG. 12 is a front view of the actuating assembly shown in FIG. 11.
Figure 11:
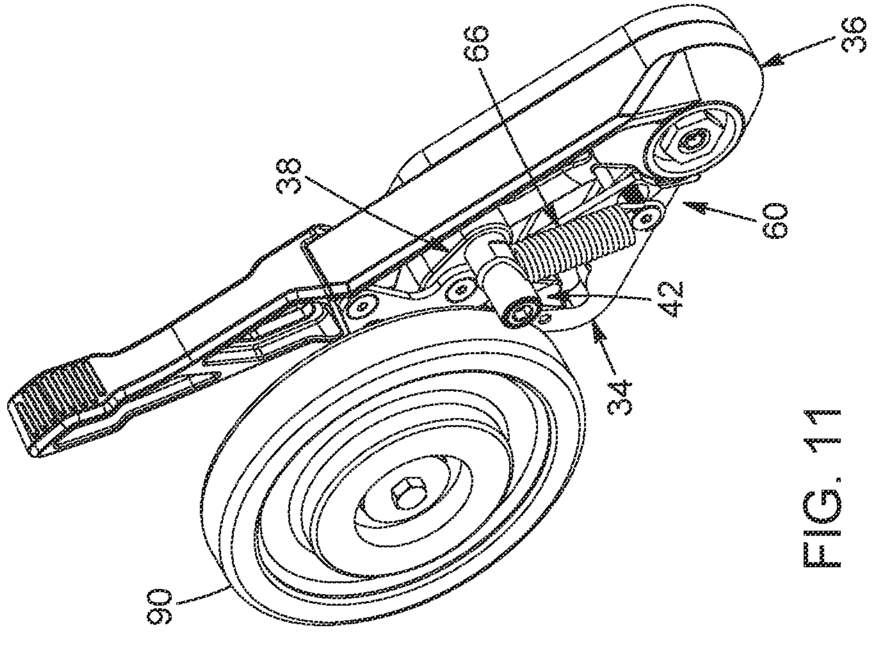
FIG. 11 is a perspective view of an alternate embodiment of the actuating assembly shown in FIG. 5, showing a pair of resilient members coupled to the driver and driven segments.

As seen in FIG. 10, the deployment slot section 50 can include a first portion 50*a* and a second portion 50*b* communicating with one another at a transition portion 50*c* to enable movement of the coupler therebetween. The first portion 50*a* is shaped and configured to guide movement of the coupler as the driver segment is initially operated, and thus as the coupler slides along the coupler channel. In this embodiment, the first portion 50*a* has substantially the same shape as the coupler channel to assist in guiding the coupler along the coupler channel (e.g., about the second axis) during rotation of the driver segment. As such, it should be understood that the first portion 50*a* of the deployment slot section 50 is adapted to assist in engaging the driven segment in rotation about the second pivot by guiding the coupler. The coupler is adapted to travel (e.g., slide), from a starting position 51, along the first portion 50*a* and transition into the second portion 50*b* as the driver segment is pivoted further, for example, after the coupler 42 has engaged the second end of the coupler channel. The second portion 50*b* therefore corresponds to the trajectory of the coupler 42 during rotation of the driver segment 36 about the first axis and while rotation of the driven segment 38 about the second pivot is blocked. In other words, when the coupler engages the second end of the coupler channel, the coupler is located in the transition section 50*c*. It is also noted that the second portion 50*b* generally corresponds to an arc extending about the first pivot. The second portion 50*b* is therefore configured to guide the coupler in rotation about the first pivot while maintaining the coupler in engagement with the second end of the coupler channel. However, it is appreciated that other configurations of the deployment slot section, and corresponding portions, are possible.

In this embodiment, the coupler is adapted to travel along the second portion 50*b* toward an end position 53, corresponding to operation of the actuating assembly in the engaged configuration, where the wheels engage the ground surface to lift the skis. The support plate can include a locking feature 55 configured to lock, or at least block the coupler in a predetermined position, such as in the end position 53. More particularly, the locking feature 55 is adapted to prevent the coupler from travelling back along the deployment slot section 50 once in the end position 53. The locking feature can be integrally formed as part of the support plate 34 (e.g., molded or otherwise integrated therewith), or removably connected thereto.

Figure 35:
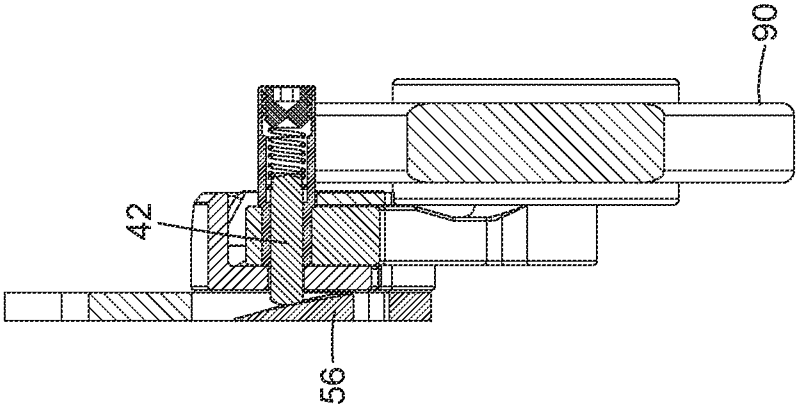
Figure 36:
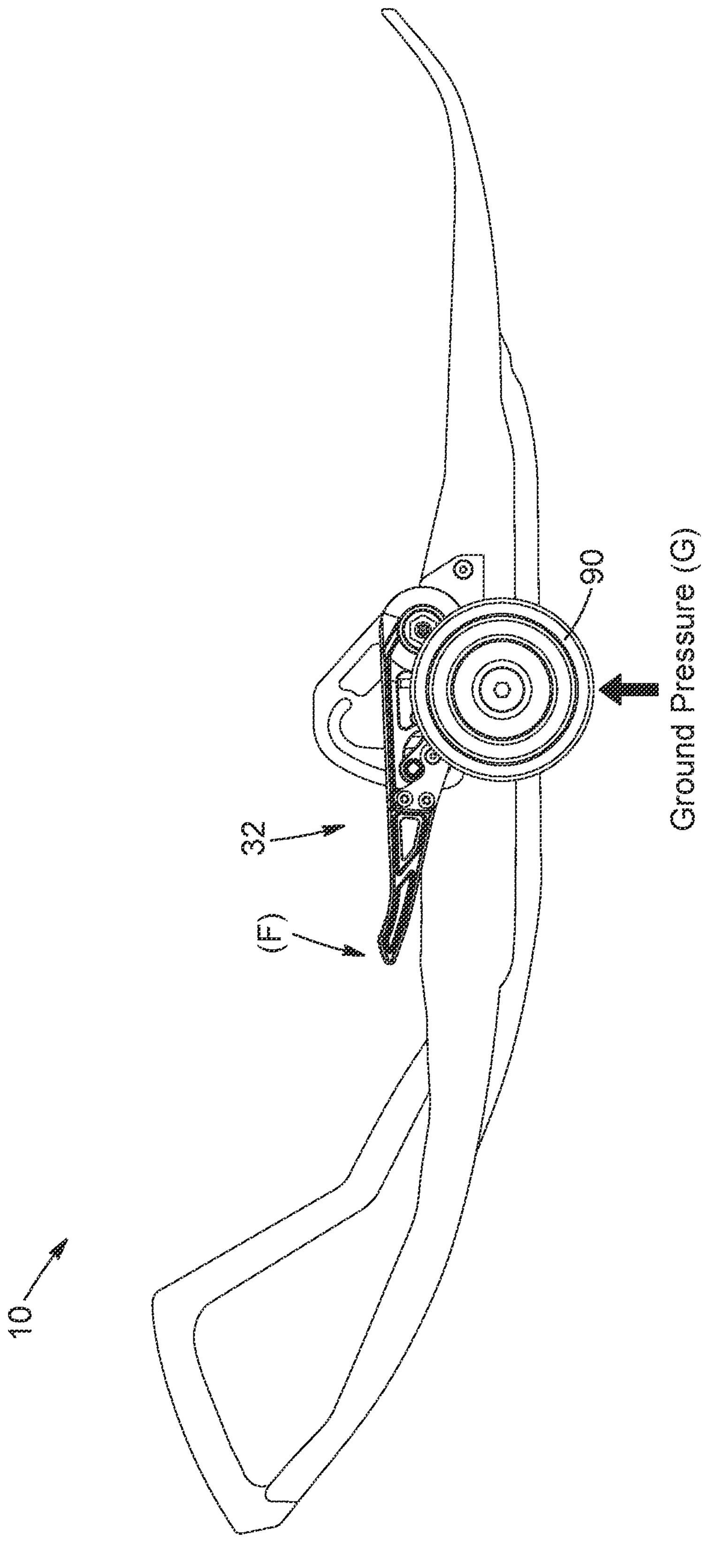
Figure 38:
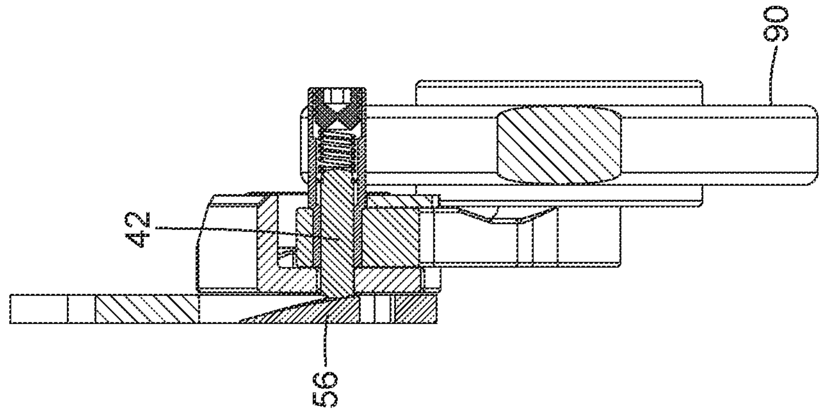
Figure 37:
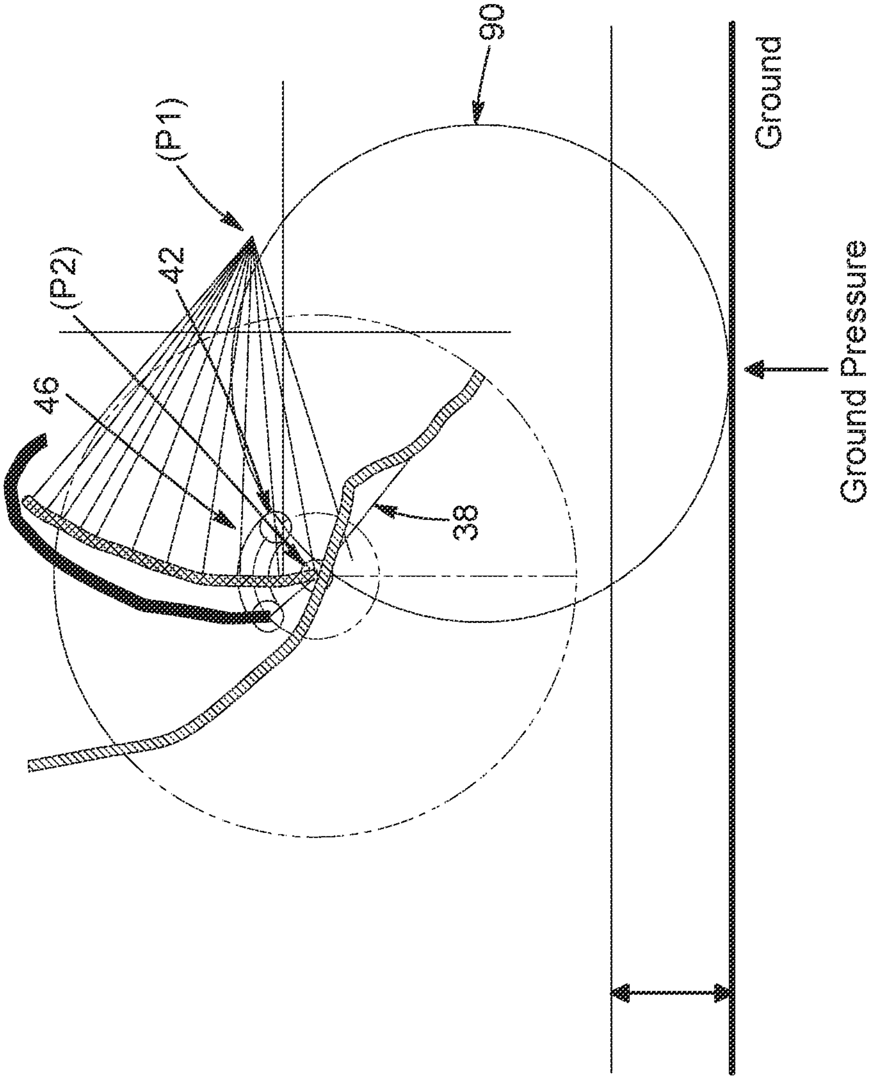
Figure 39:
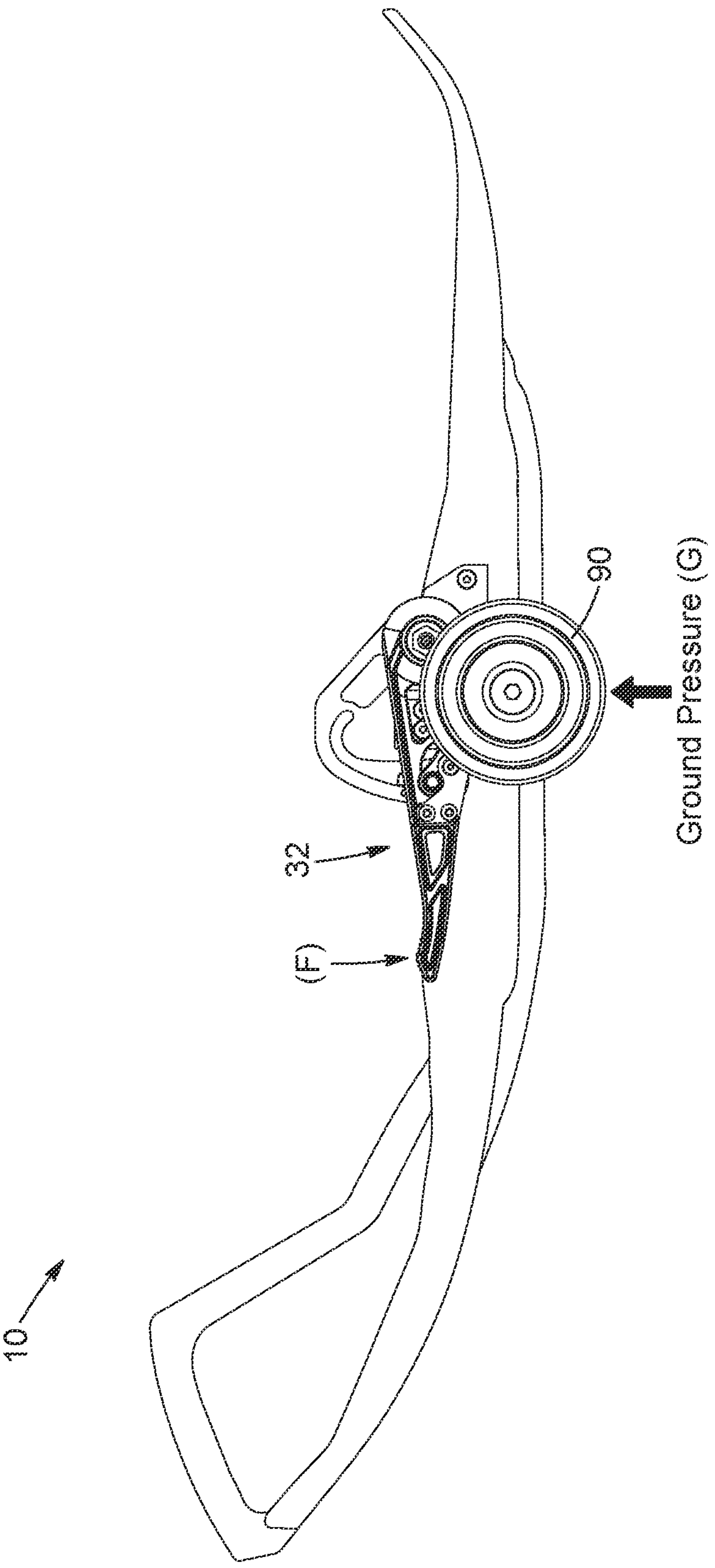
Figure 42:
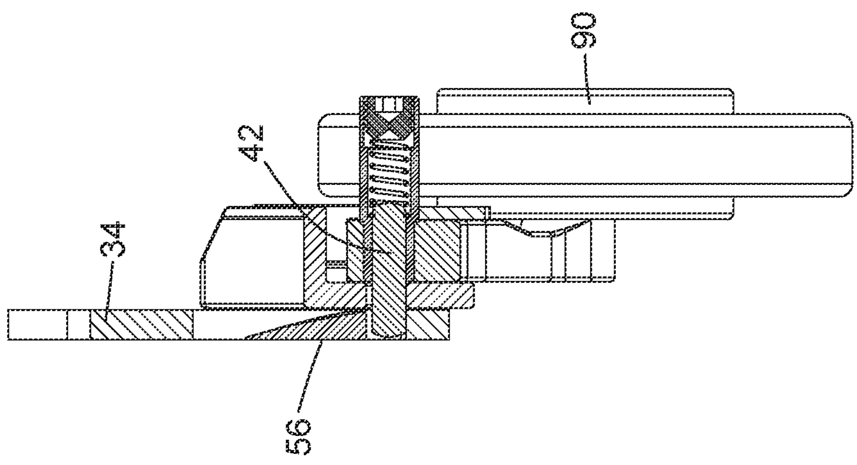

The locking feature 55 can include a cam device 56 configured to enable movement of the coupler in a first direction along the second portion 50*b* (e.g., toward the end position) and prevent movement of the coupler in a second direction, opposite the first direction, along the second portion 50*b*. In this embodiment, and with reference to FIGS. 7, 10 and 32 to 42, the coupler 42 can be spring-loaded within the coupler casing 44 and configured to cooperate with the cam device 56 in order to be locked in the end position (seen in FIG. 42). The cam device 56 is illustratively provided along the second portion 50*b* of the deployment trajectory, although other configurations are possible. As the coupler slides along the second portion 50*b*, the coupler engages the cam device (FIG. 32) and retracts within the coupler casing (FIGS. 35 and 38). When the coupler 42 is moved past the cam device 56, the spring-loaded configuration enables the coupler to spring back into the deployment slot section, with the cam device locking the coupler in the end position (FIG. 42).

Referring once again to FIG. 10, the retraction slot section 52 of the guiding slot 48 is configured to guide the coupler from the end position 53 toward the start position 51. In this embodiment, the retraction slot section 52 includes a first portion 52*a* and a second portion 52*b* communicating with one another at a transition portion 52*c* to enable movement of the coupler 42 therebetween. As described above, when in the end position 53, the cam device blocks movement of the coupler along the second portion 50*b* of the deployment slot section (e.g., blocks rotational movement about the first pivot). Therefore, it is noted that, in order to enable retraction of the coupler, the first portion 52*a* of the retraction slot section 52 extends in a direction different than about the first pivot (e.g., in a direction which differs from the direction of the second deployment portion 50*b*).

In this embodiment, the first retraction portion 52*a* is adapted to enable movement of the coupler at least about the second pivot. More specifically, the first retraction portion 52*a* is shaped and sized to enable a pivoting motion of the coupler about the first and second axes simultaneously. As such, it is noted that the radius (or arc section) of the first portion 52*a* of the retraction trajectory is substantially the same as the radius of the first portion 50*a* of the deployment trajectory. Thus, both first portions 50*a*, 52*a* are configured to enable a double-pivoting movement of the coupler. As seen in FIG. 10, the first retraction portion 52*a* guides the movement of the coupler 42 to at least disengage the cam device 56 and transition into the second retraction portion 52*b*. The second retraction portion 52*b* is shaped and configured to guide the coupler 42 back toward the starting position 51.

It should therefore be noted that, as the coupler moves along the retraction slot 52, it simultaneously moves from the second end 46*b* of the coupler channel 46 back toward the first end 46*a* (seen in FIG. 8). In some embodiments, the coupler engages the first end 46*a* of the coupler channel as it transitions from the first retraction portion 52*a* to the second retraction portion 52*b* (e.g., the coupler is located in the retraction transition portion 52*c* as it engages the first end of the coupler channel). Alternatively, the first and second retraction portion 52*a*, 52*b* can both be shaped and configured to enable movement of the coupler along a single arc and about both the first and second axes as the coupler is guided moves back to the starting position.

As seen in FIG. 10, the locking feature 55 can be further adapted to lock the coupler 42 in the starting position. More particularly, the locking feature 55 is adapted to prevent the coupler 42 from travelling back along the retraction slot section 52 once in the starting position 51. The locking feature 55 can include a second cam device 58 configured to enable movement of the coupler in a first direction along the second retraction portion 50*b* (e.g., toward the starting position) and prevent movement of the coupler in a second direction, opposite the first direction, along the second retraction portion 52*b*. Similar to the cam device 56, the coupler is adapted to retract within the coupler casing 44 when sliding over the second cam device, and snap back into the guiding slot 48 in or proximate to the starting position 51.

The locking feature 55 (e.g., the cam devices) can be adapted to provide a detectable, although not detrimental resistance of the actuation of the driver segment, which provides feedback to the user that the driver segment is almost at the end of its course (e.g., that the coupler is close to the end position), and that the wheel is almost in the engaged position.

It should thus be understood that the guiding slot 48 is shaped, sized and configured to guide the coupler between the starting and end positions, while restricting its movement to a desired direction when in (or proximate to) said starting and end positions. In this embodiment, when in the starting position 51, the coupler is restricted to moving along the deployment slot section 50, and while in the end position 53, the coupler is restricted to moving along the retraction slot section 52. Further, as seen in FIG. 10, in this embodiment, the deployment and retraction slot sections 50, 52 are independent from one another, only joining at the starting and end positions. However, it is appreciated that other configurations of the guiding slot are possible and may be implemented for assisting in guiding the coupler between desired and/or preferred positions and along a predetermined path.

It should also be noted that, when in the end position 53, the wheel is in its over-centered position and cannot revert to the stowed position as long as contact between the wheel and the ground is maintained. As such, in this embodiment, the coupler is adapted to engage and travel along the first retraction portion 52*a* when the wheel is lifted off the ground, for example, by a sufficient height to enable passing the normal vector toward the stowed position. In other words, disengaging the wheel from the ground "unlocks" the coupler and enables its retraction to move the wheel back toward the stowed position.

It should be understood that the wheel system 10 described hereinabove can correspond to one of two wheel systems, each connectable to respective skis. Therefore, each wheel system 10 can be operated in order to lift each ski off the ground and ride the snowmobile on the wheels. The pair of wheel systems can correspond to mirror images of themselves (e.g., a right-side wheel system corresponds to a mirror image of a left-side wheel system, and vice-versa). In some embodiments, the pair of wheel systems can be operatively connected to enable operation of both wheel systems simultaneously. However, it is appreciated that other configurations are possible, such as having independent wheel systems configured to be independently operated, for example.

EXAMPLE OF APPLICATION

The operation of the wheel system can be divided in three (3) phases: 1) a positioning phase; 2) a lifting phase; and 3) a locking phase. As previously described, the motion of the wheel, the movement of the driven segment and the trajectory of the coupler are each dependent of the actuation of the driver segment. It should be noted that the amounts of degrees of rotation for each step of the actuation process are exemplary only and should therefore not be construed as being limiting. It should further be noted that, in FIGS. 15 to 40, schematic representations of the wheel system are provided, which illustrate the trajectory of the coupler (or "follower"), represented by 42T, the trajectory of the second pivot, represented by P2T, and the trajectory of the wheel, represented by a 90T. These trajectories correspond to the motion of the corresponding components as the driver segment is pivoted about the main pivot.

With reference to FIGS. 15 to 24, the wheel system 10 is initially idle (FIGS. 15 and 16), where the actuator 32 is in the idle configuration, the driver segment is raised, and the wheel is in the stowed position. As such, the wheels (e.g., of each wheel system) are at a vertically higher position in order to clear the ground surface and facilitate dodging obstacles (e.g., rocks, twigs, branches, etc.). With the wheels in the stowed position, the snowmobile (not shown) can be ridden on its skis.

Figure 17:
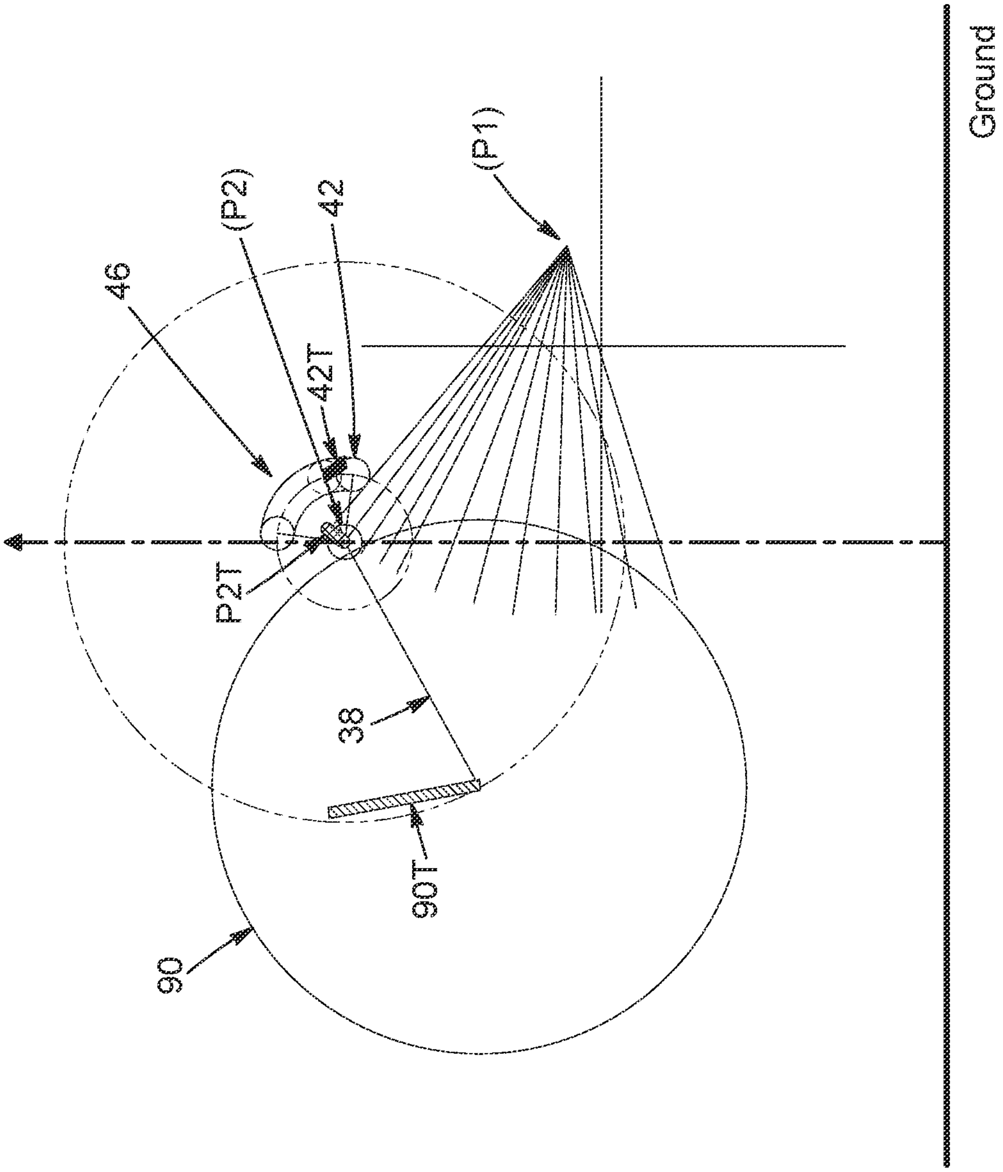
Figure 18:
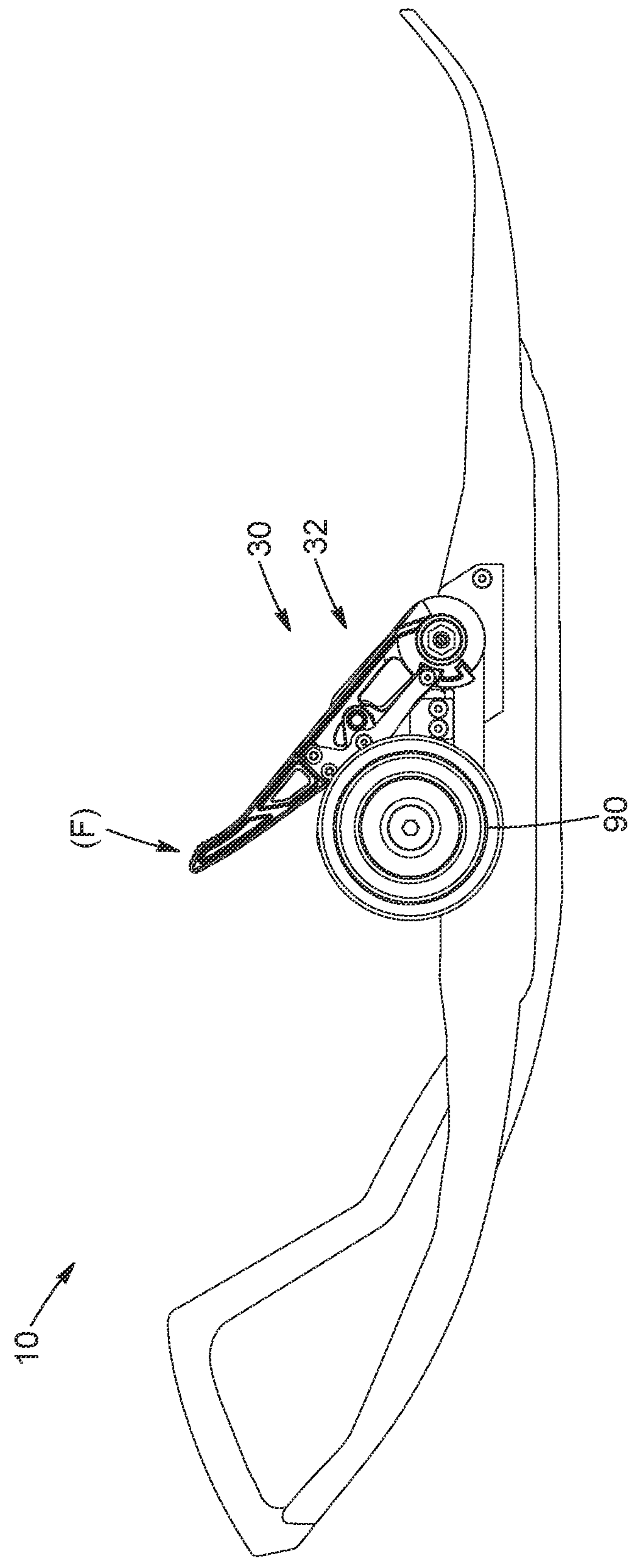

The actuating assembly 30 can be operated by pivoting the driver segment about the first or main pivot to initiate the positioning phase. As illustrated in FIGS. 17 and 18, a generally downward force engages the driver segment in rotation about the first pivot by about 3.2 degrees which engages the driven segment, and thus the wheel, in rotation about the secondary pivot by about 28.2 degrees. Moreover, it is noted that the follower slides along the angular range limiter (e.g., the coupler channel) as it rotates about the secondary pivot. Also, the secondary pivot itself is moved along with the driver segment and rotates about the main pivot by about the same amount (e.g., by about 3.2 degrees).

Figure 19:
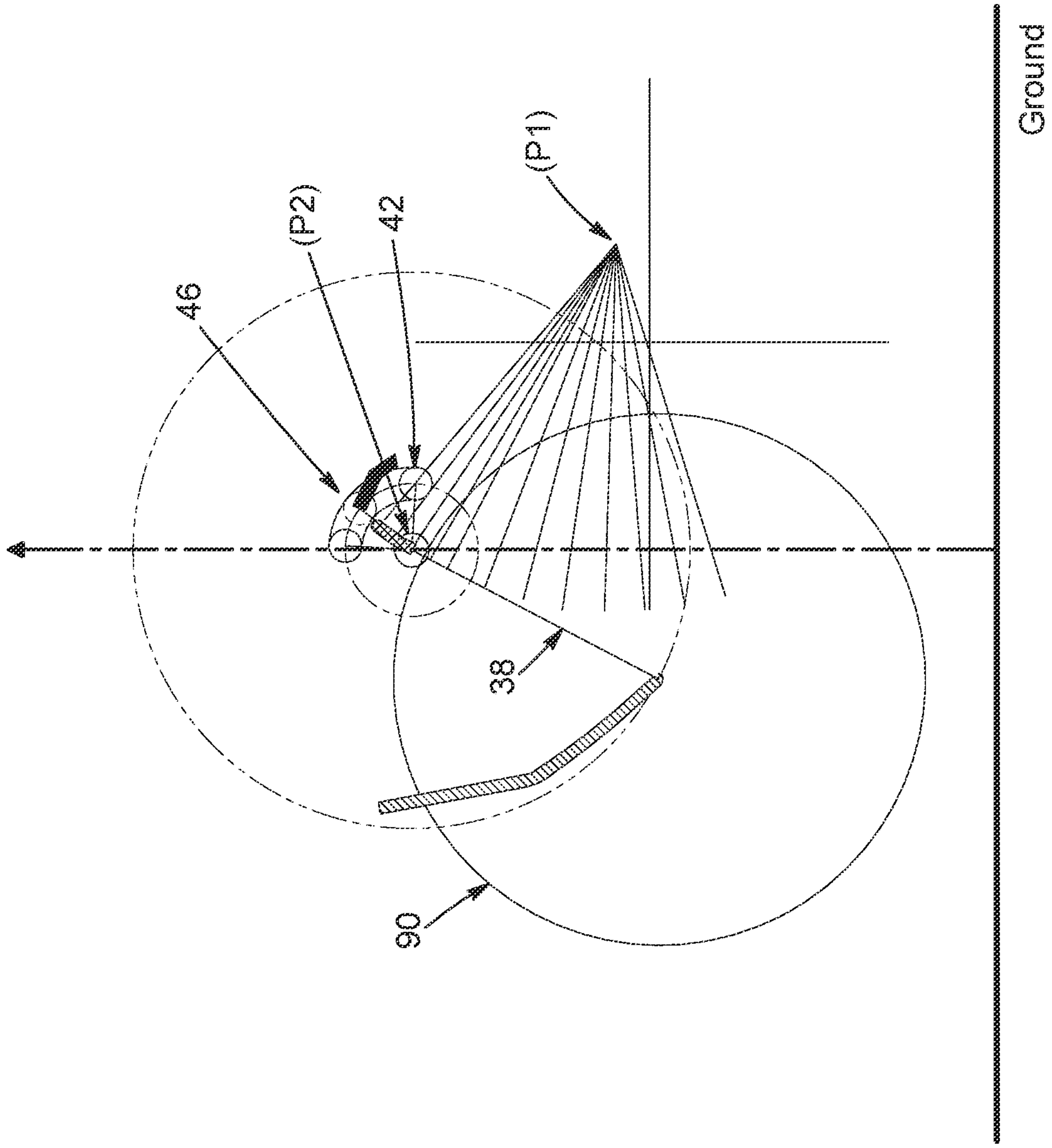
Figure 20:
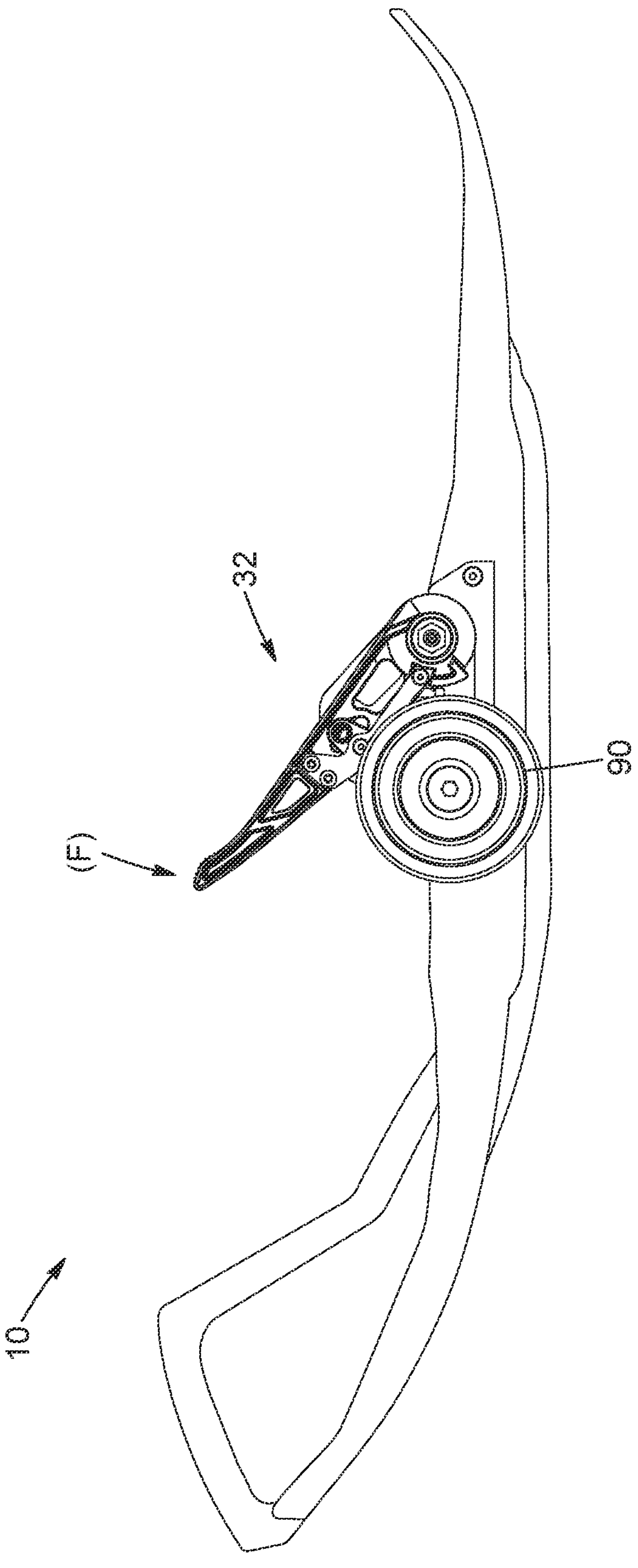
Figure 21:
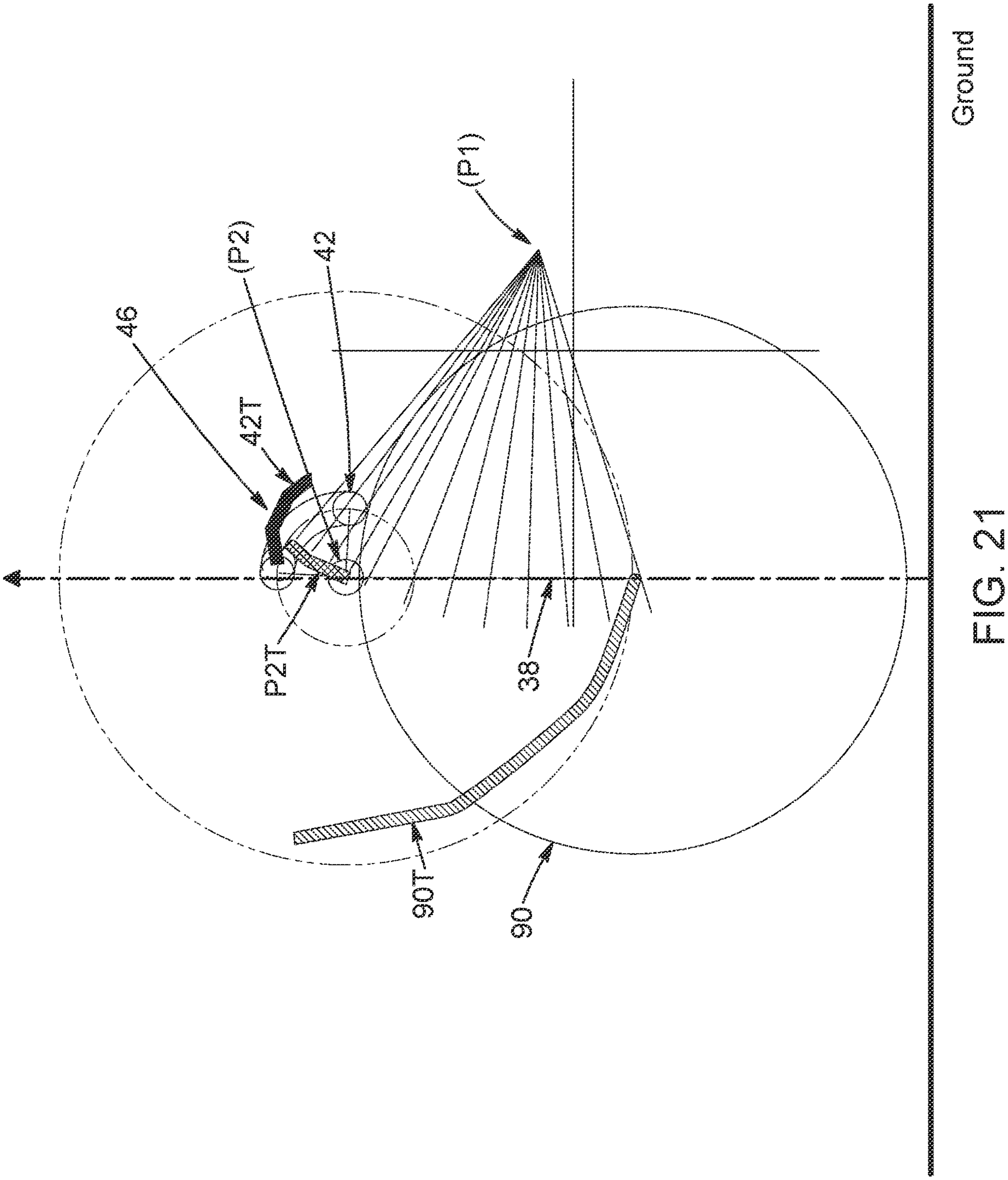
Figure 22:
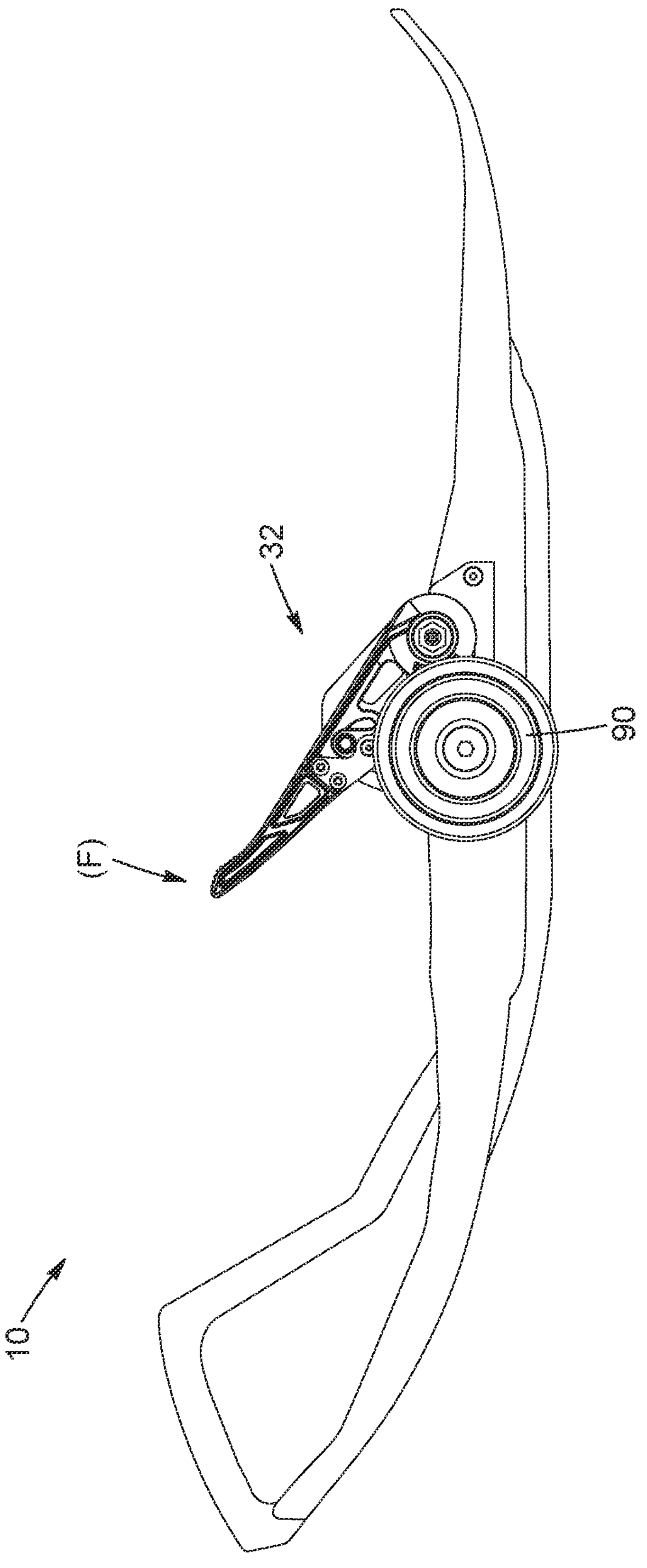

With reference to FIGS. 19 and 20, as the driver segment is further pivoted, for example, by another 3.2 degrees about the main pivot, the wheel is pivoted by an additional 33.7 degrees about the secondary pivot and nears the ground surface. As noted above, the follower continues its course along the coupler channel and the secondary pivot is pivoted with the driver segment about the main pivot. In FIGS. 21 and 22, it is illustrated that another 3.2 degrees of rotation of the driver segment about the main pivot engages the wheel in about 27 degrees of rotation about the secondary pivot. In this configuration, the wheel is illustratively in a centered position, where a normal vector (V) to the ground surface extending through the second pivot extends through a center of the wheel, for example. It should be noted that the pivoting or rotative distance of the wheel relative to the pivoting distance of the driver segment is dynamic (e.g., changes over time and/or during operation of the driver segment). For instance, in the above example, the distance traveled by the wheel is about 3 to 12 times greater than the distance traveled by the driver segment. As such, the pivoting distance ratio between the driver segment and the driven segment and the wheel can be correspondingly dynamic, and can vary between about 3:12 and 3:36 during operation of the driver segment, for an overall ratio of about 10:80 to 15:110 (e.g., 12.8 degrees of rotation for the driver segment engages the wheel for about 102 degrees of rotation).

Figure 23:
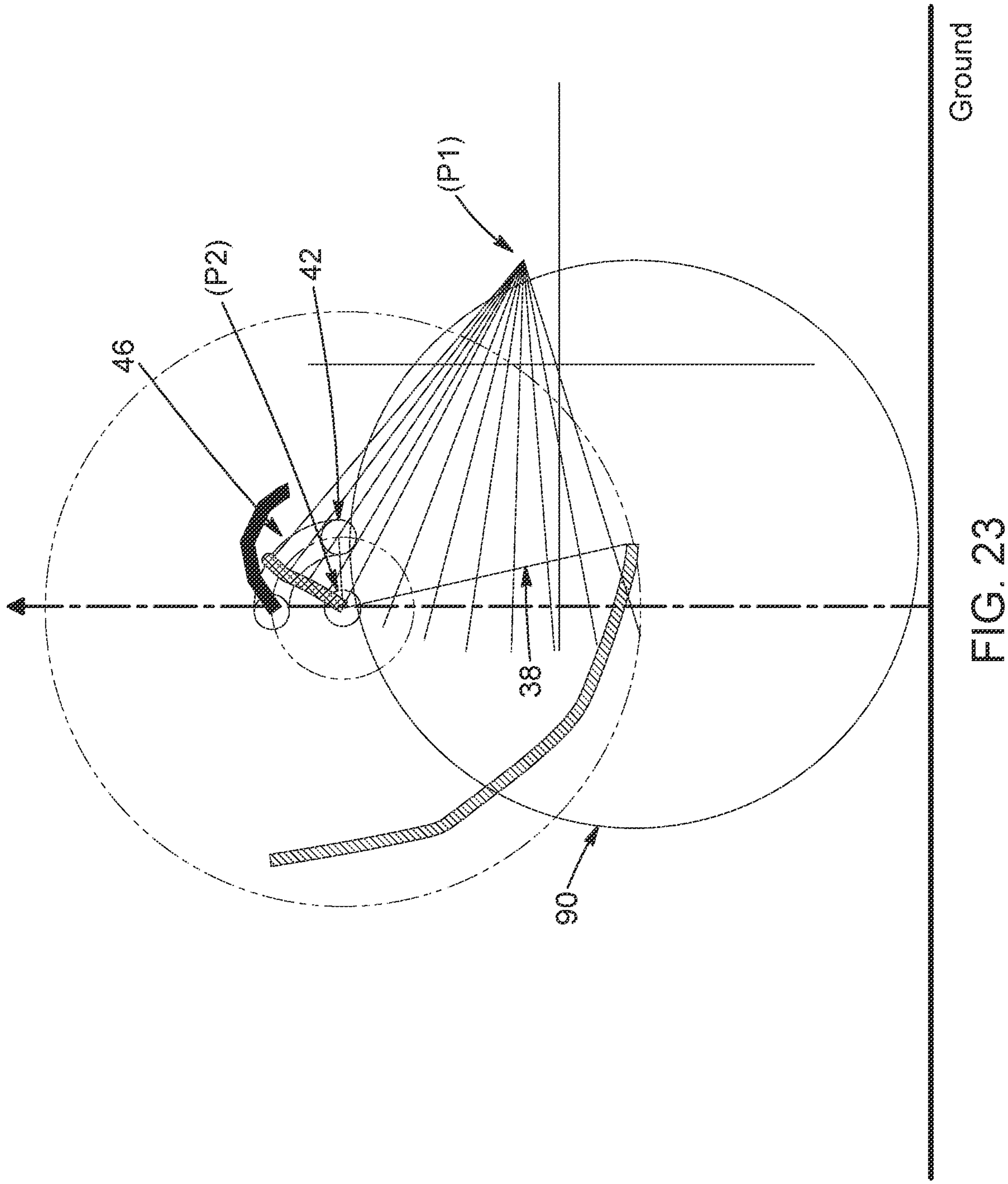
Figure 24:
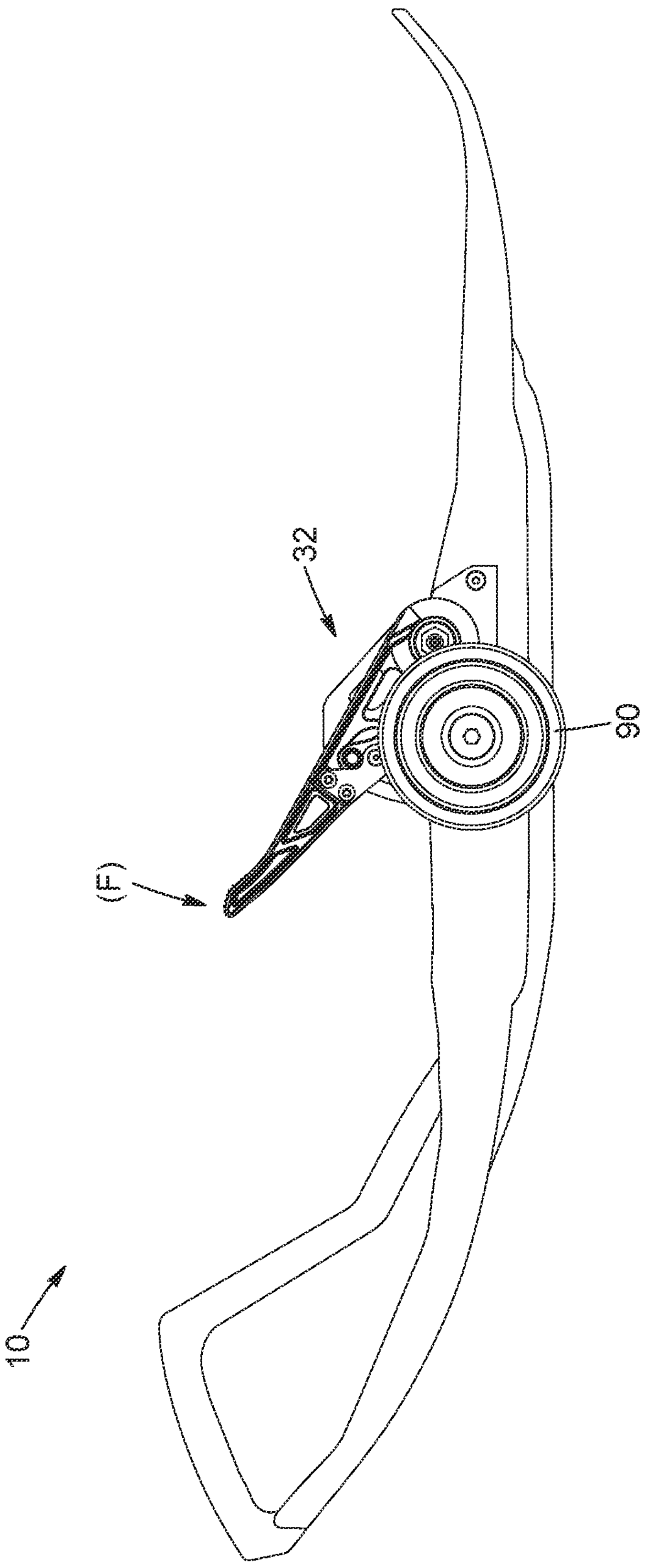

As seen in FIGS. 23 and 24, the driver segment, along with the secondary pivot, are pivoted by another 3.2 degrees, engaging the wheel in an additional 13.1 degrees of rotation about the secondary pivot in the intermediary and/or over-centered position (e.g., the wheel pivots past the normal vector (V) of the ground surface). In this position, the coupler engages/abuts against the second end of the coupler channel, thereby preventing any further rotation of the wheel about the secondary pivot. In some embodiments, this marks the end of the positioning phase. Also, it is noted that the coupler has moved along the first portion 50*a* (FIG. 10) of the deployment slot and is located in the transition portion 50*c* prior to moving into the second portion 50*b* of the deployment slot.

Figure 25:
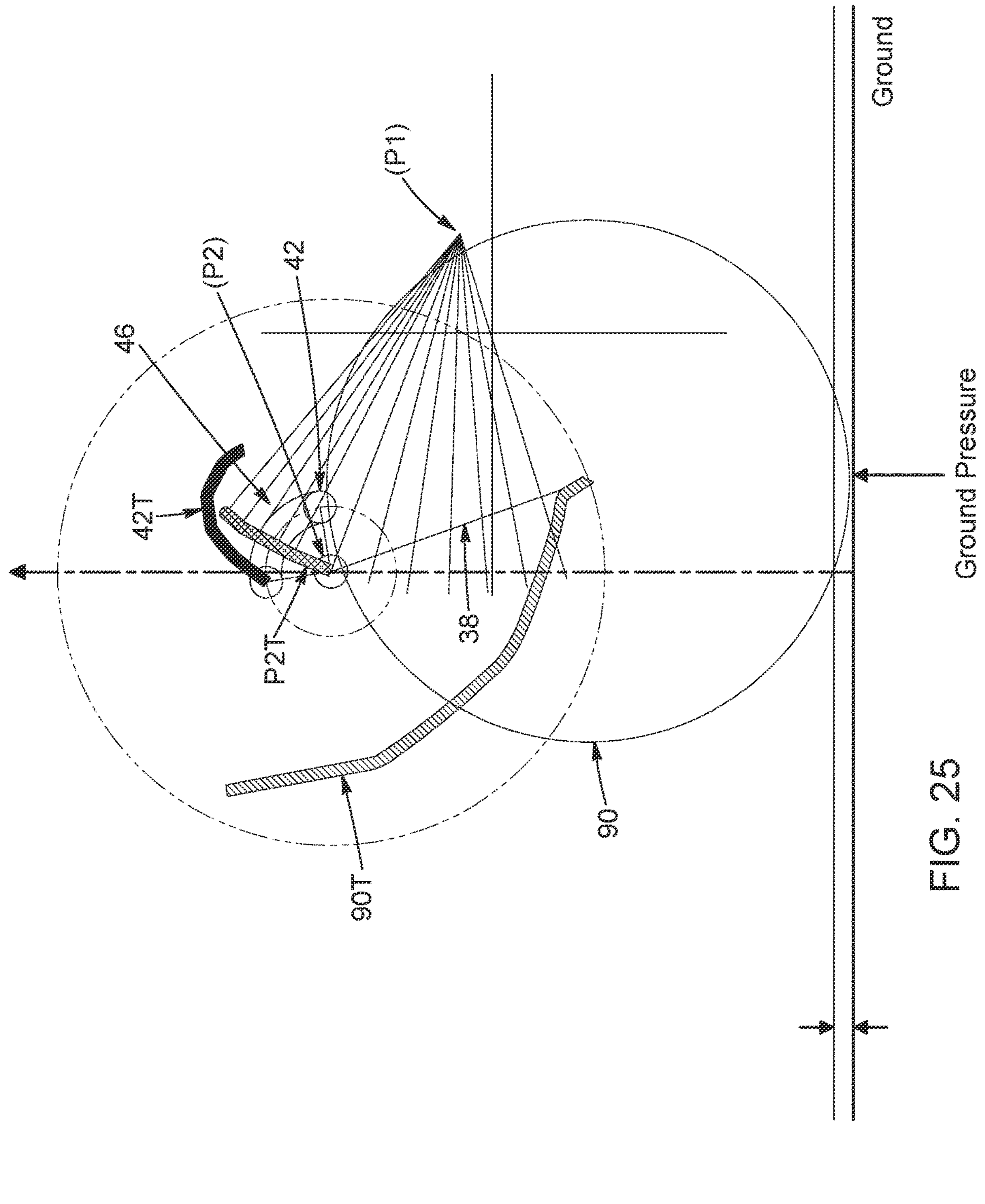
Figure 26:
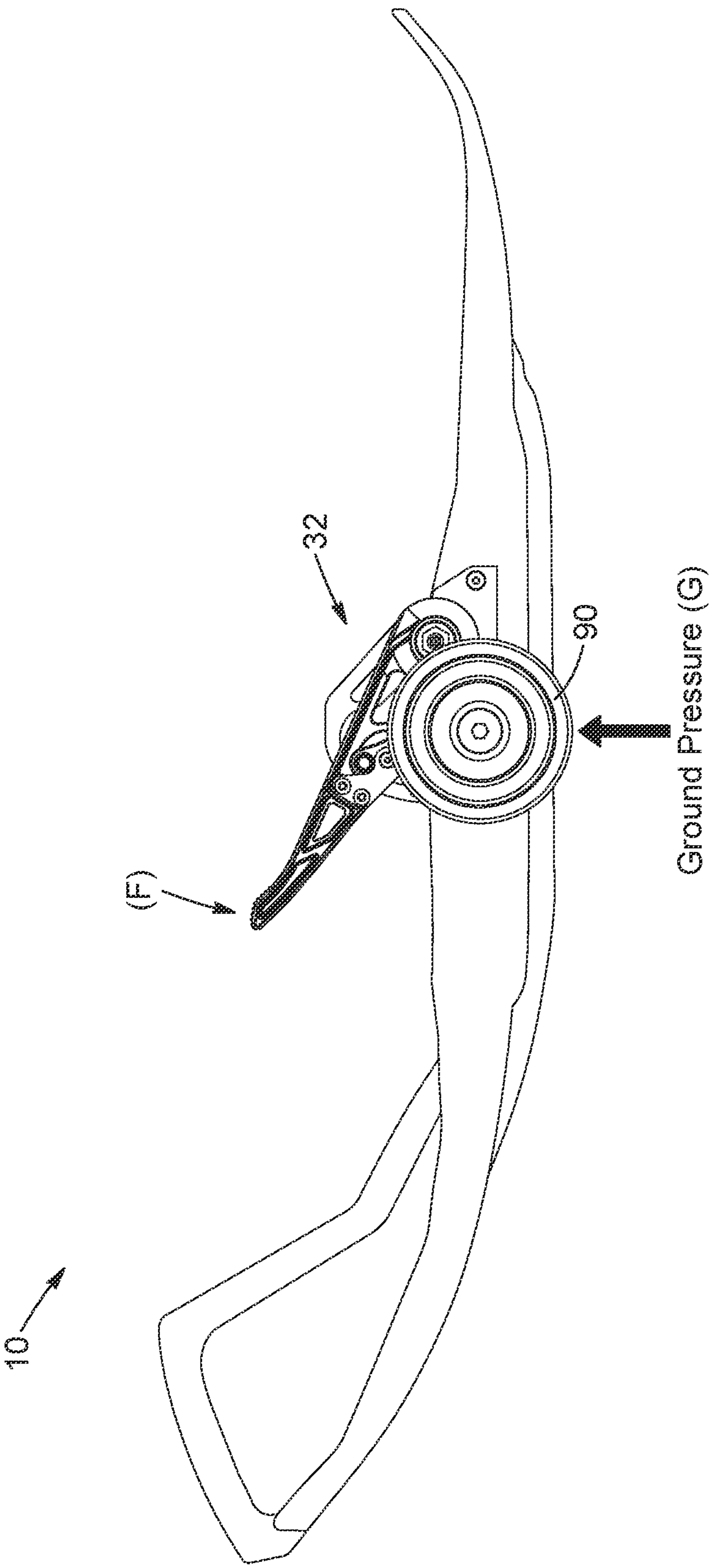
Figure 27:
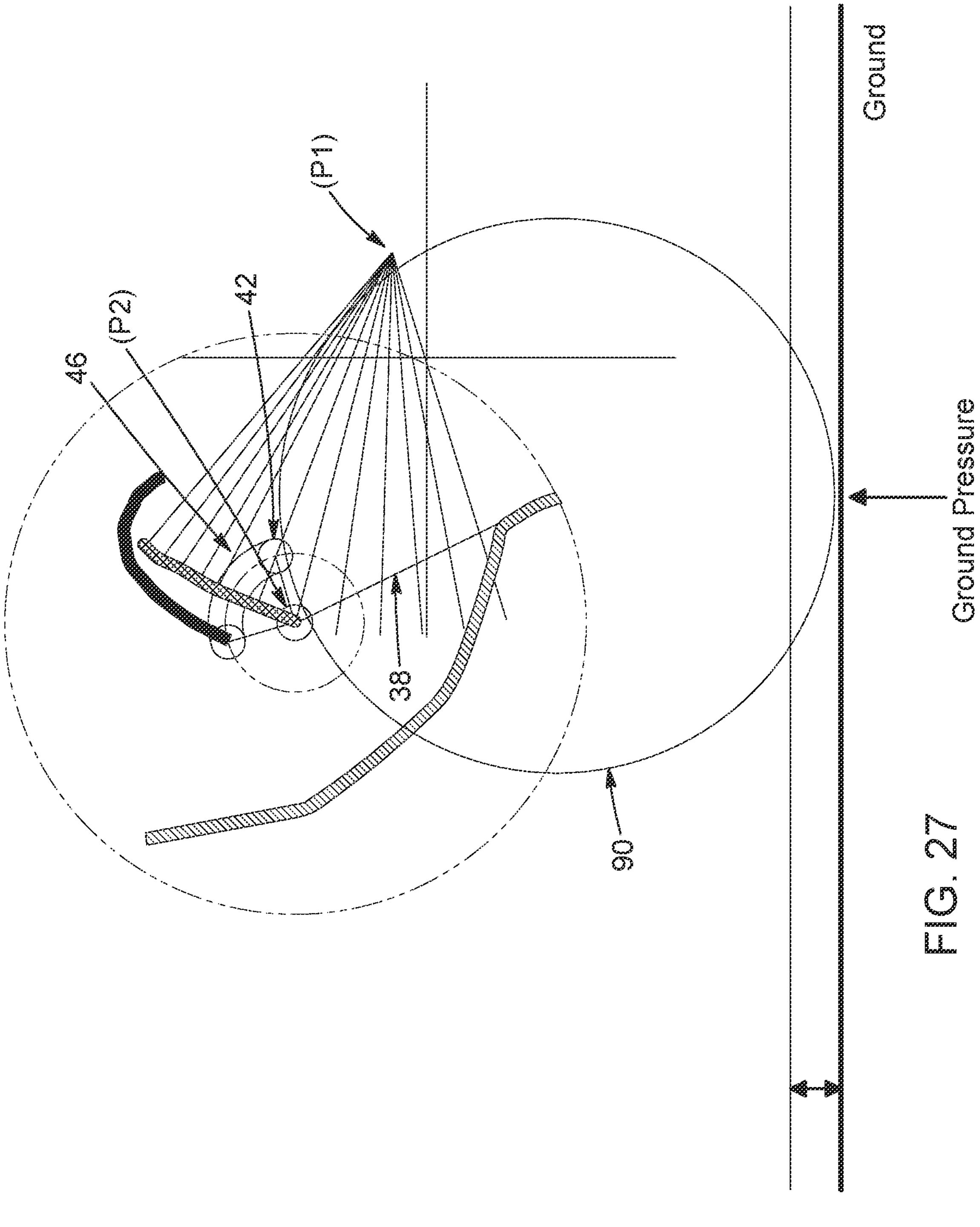
Figure 28:
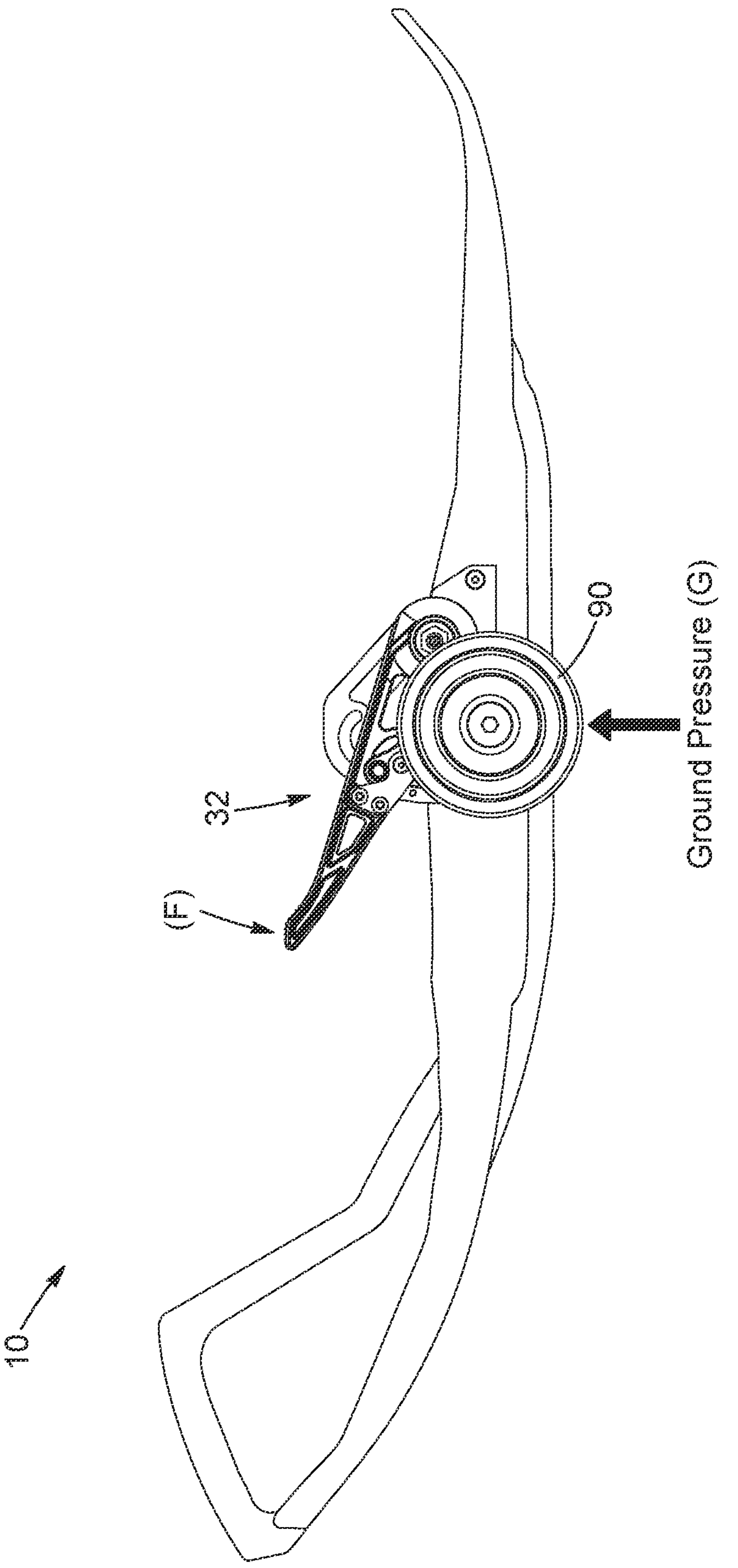
Figure 29:
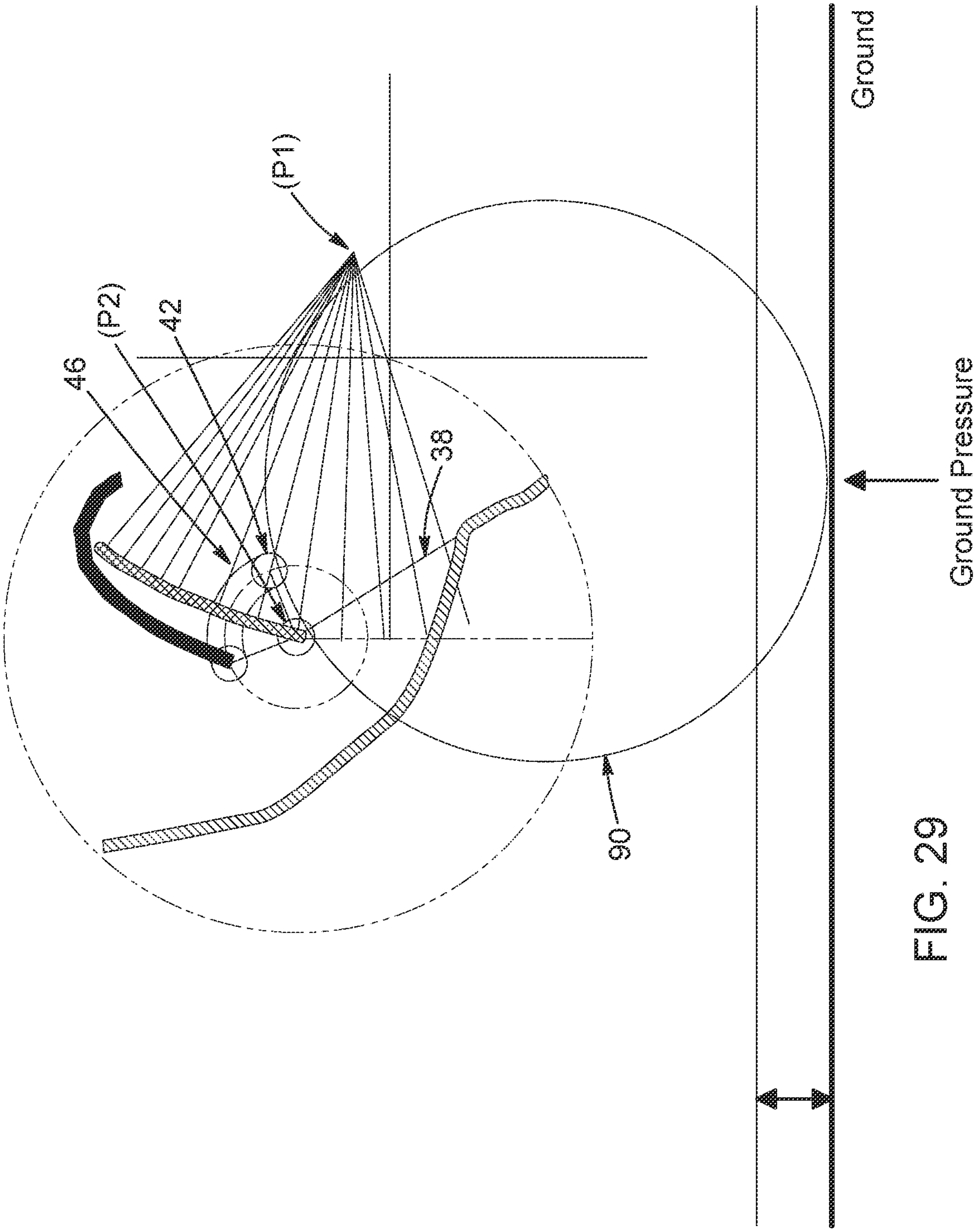
Figure 30:
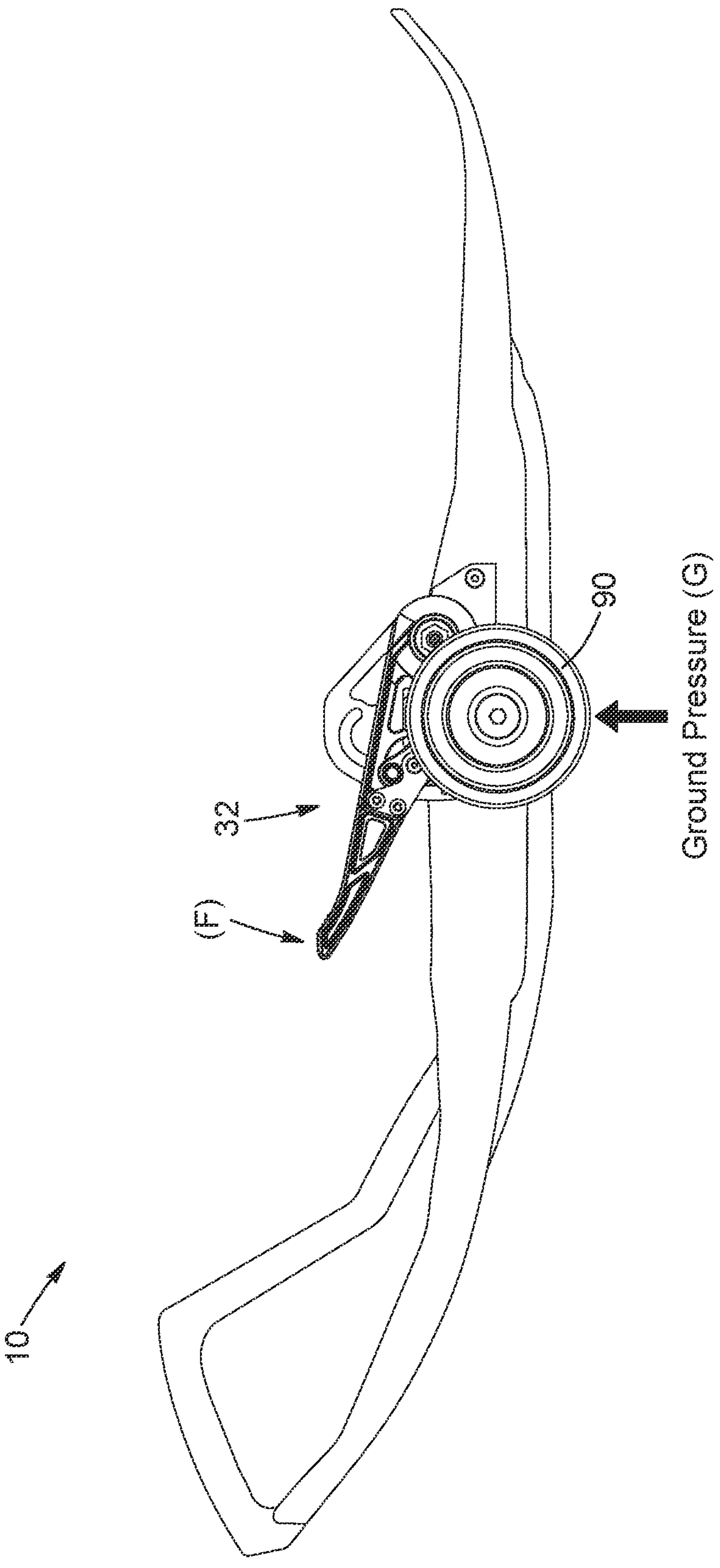
Figure 31:
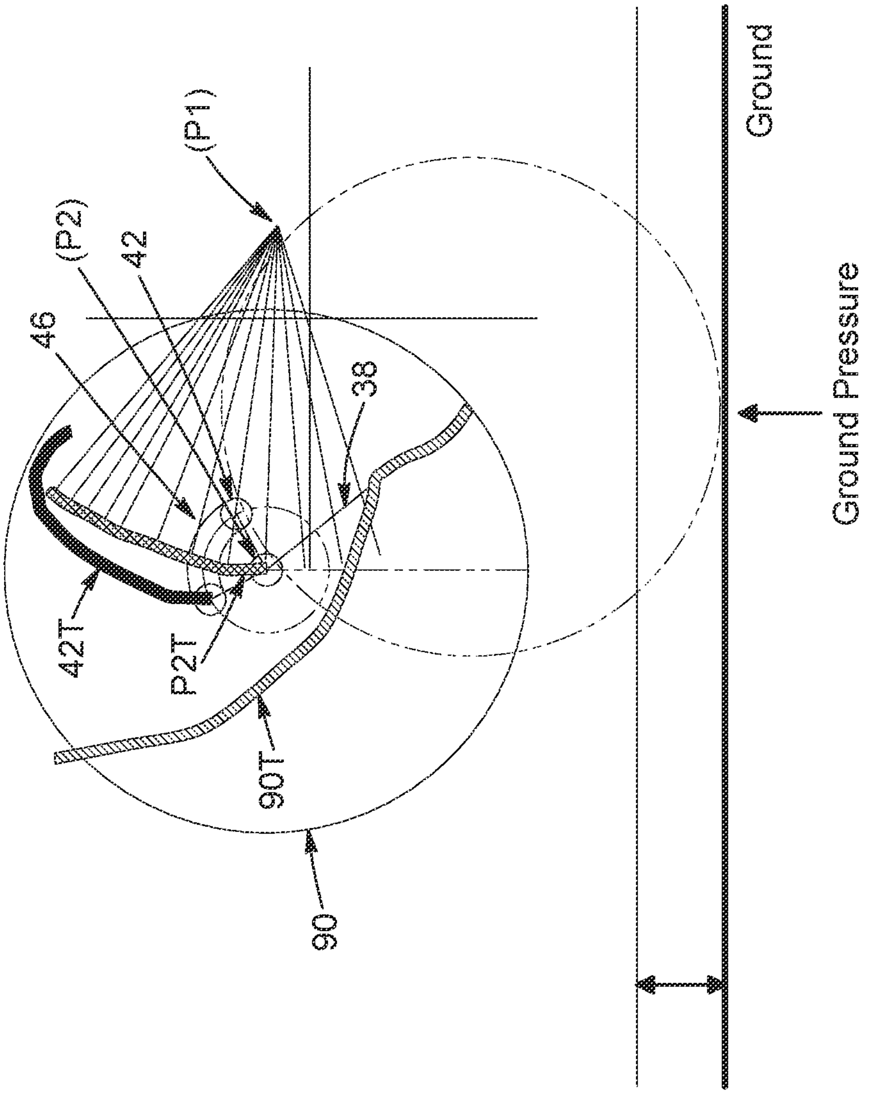
Figure 32:
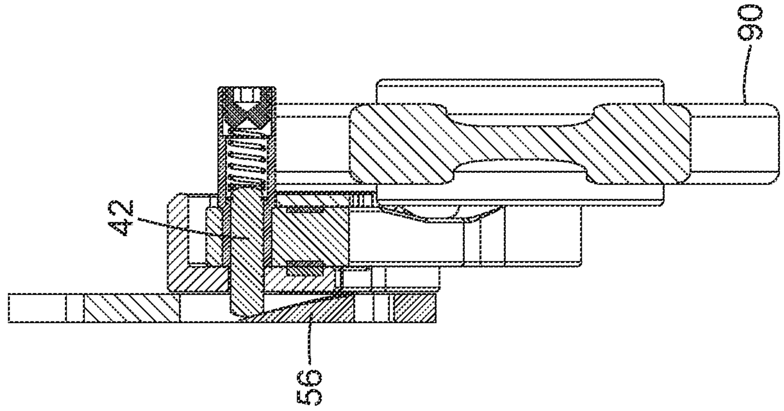
FIGS. 32, 35, 38 and 42 are side views of the actuating assembly shown in FIGS. 33, 36, 39 and 41, respectively, showing the coupler cooperating with a locking feature of the actuating assembly, according to an embodiment.
Figure 33:
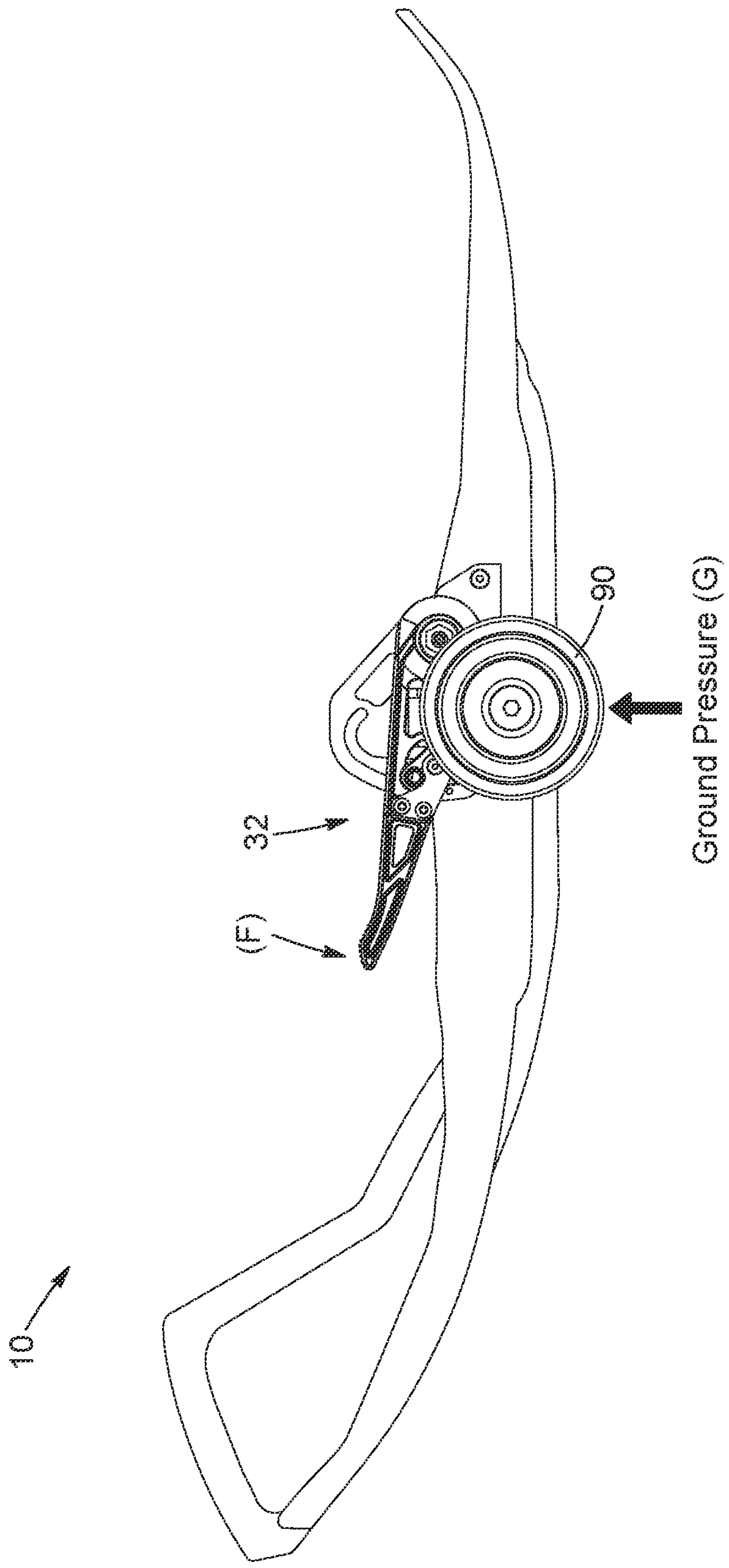
Figure 34:
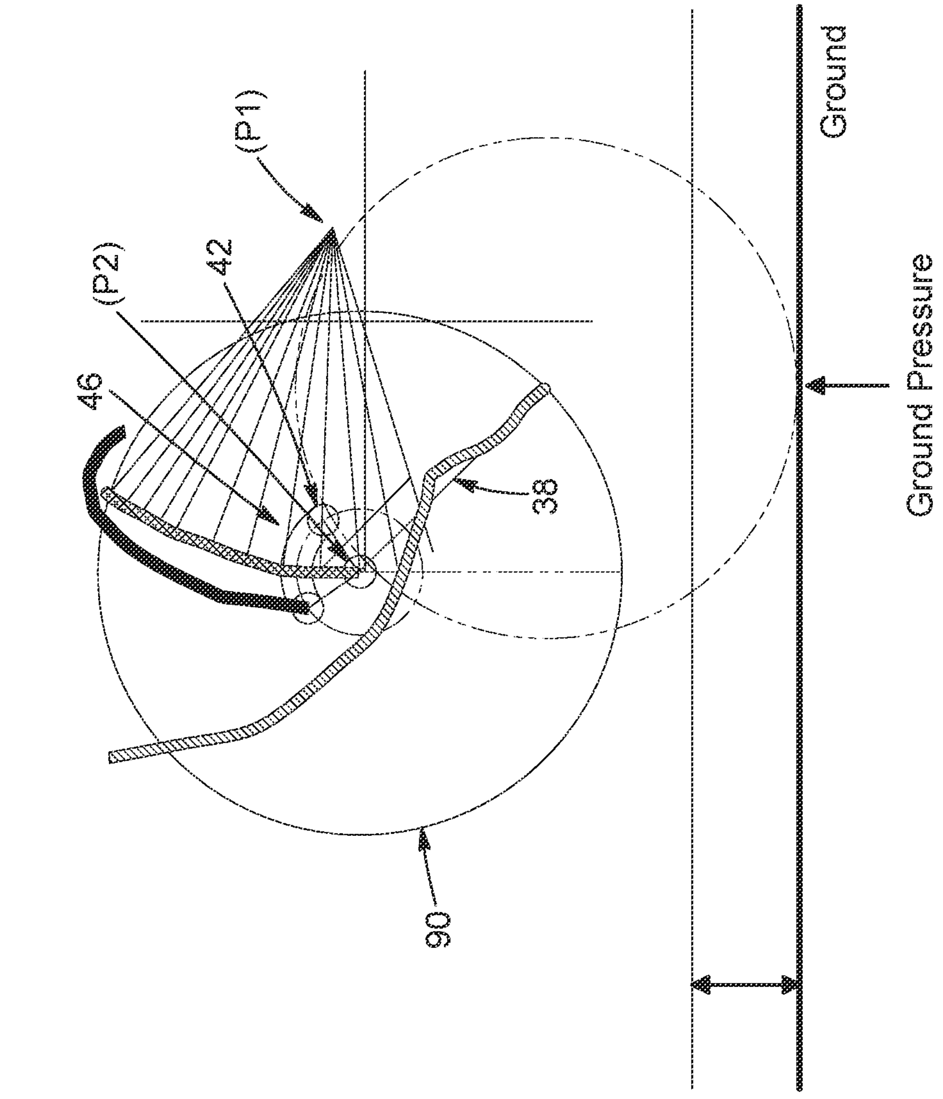

Now referring to FIGS. 25 and 26, the lifting phase can be initiated. From the intermediary position of the wheel, the driver segment can be further pivoted about the main pivot. It is noted that, during the lifting phase, rotation of the driven segment and of the wheel about the secondary pivot is blocked. As such, both the driver and driven segments, along with the wheel, are made to pivot about the main pivot. The pivoting motion about the main pivot is guided by the coupler sliding along the guiding slot, and more specifically along the second portion of the deployment slot section, which corresponds to an arc of a circle having the main pivot as a center. As illustrated in FIGS. 25 to 41, as the assembly rotates about the main pivot, the wheel engages and pushes against the ground surface, thereby lifting the ski off the ground. The assembly rotates until the coupler reaches the end position (e.g., locked behind the cam device) and the wheel is in the engaged position. In this embodiment, this marks the end of the lifting phase.

The locking phase is included within the lifting phase. More specifically, the locking phase is initiated when the coupler first engages the cam device and begins to retract/compress within the coupler casing. The locking phase ends once the coupler passes the cam device and extends outwardly into the guiding slot and/or the end position.

In the described example, the wheel is adapted to engage the ground surface after having moved to the over-centered position, and once the coupler engages the second end of the coupler channel (e.g., once the positioning phase is over). However, it should be noted that the wheel system can be alternatively configured to have the wheel engage the ground at any suitable location about the secondary pivot, such as prior to moving into the over-centered position. The configuration of the wheel can be adjusted by adjusting the position of the support plate relative to the adapter plate, or by adjusting the position of the support plate relative to the ski when the adapter plate is omitted. For example, connecting the support plate in a lower position relative to the adapter plate or the ski can enable the wheel to engage the ground surface earlier along the pivoting motion of the driver segment.

Figure 40:
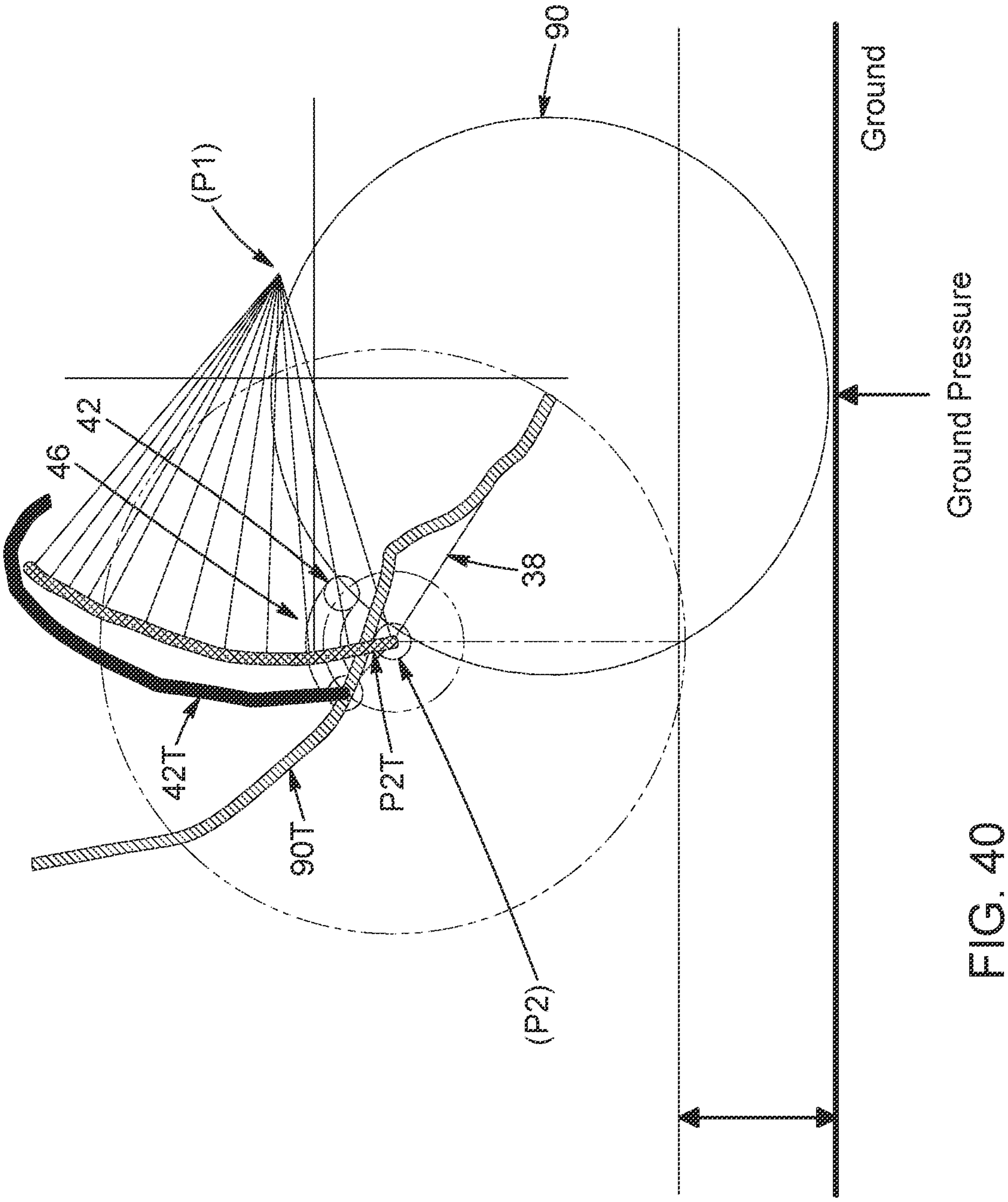
Figure 41:
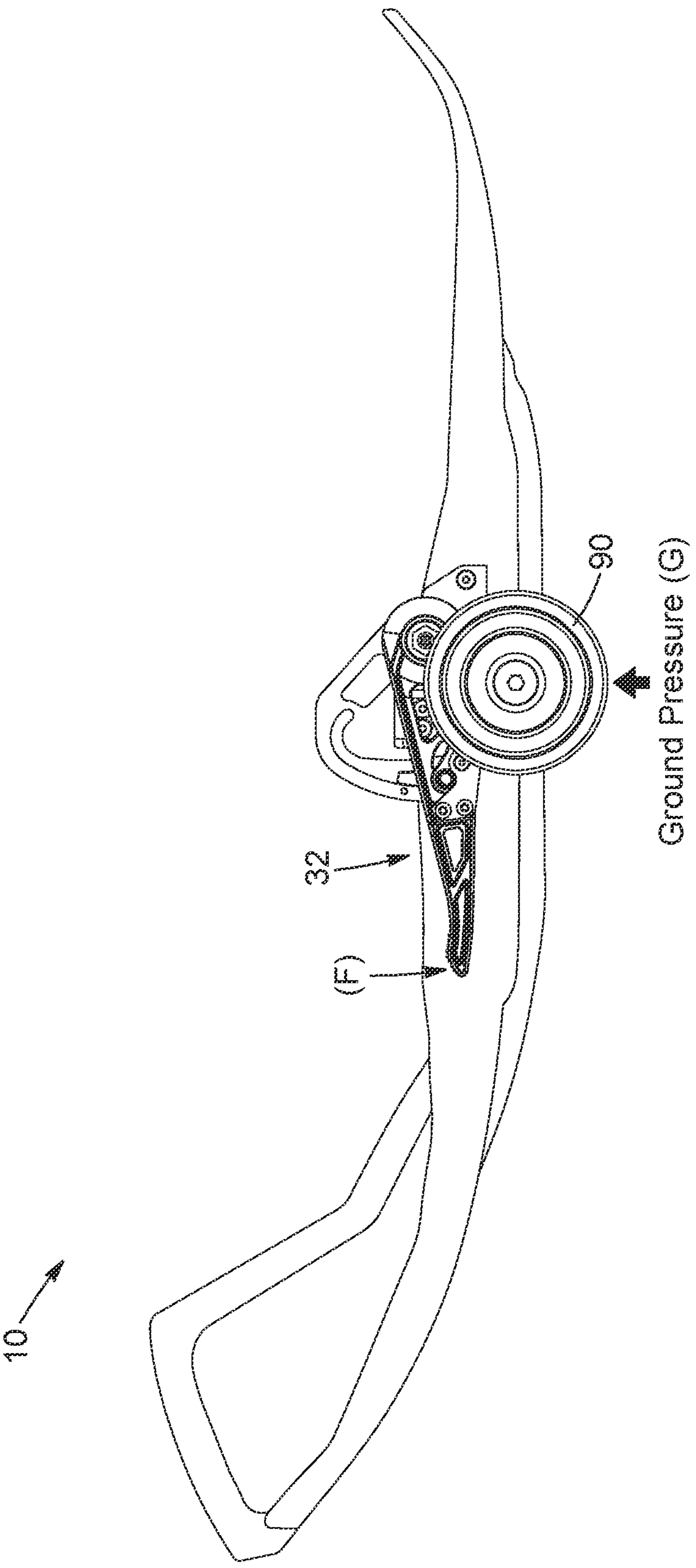

Furthermore, as the wheel engages the ground, the resulting ground pressure lifts the ski and consequently contracts the vehicle's suspension. In some embodiments, during the lifting phase, the double-pivot assembly provides an efficiency ratio, or "ratio of force" defined between the applied pressure or actuation force (F) and the ground pressure (G) to facilitate lifting the skis off the ground. For example, in FIG. 25, during the lifting phase, the wheel initially engages and pushes against the ground surface, and the efficiency ratio is of about 3.8:1. In other words, the force generated by the ground (e.g., the ground pressure (G)) is 3.8 times greater than the actuating force (F) (e.g., the force applied to pivot the driver segment). As the driver segment is further pivoted, as seen in FIGS. 27, 29, 31, 34, 37 and 40, the efficiency ratio increases. For example, for about each 6 degrees of rotation of the driver segment, the efficiency ratio can increase to 4.0:1 (FIG. 27), 4.5:1 (FIG. 29), 4.8:1 (FIG. 31), 5.5:1 (FIG. 34), 6.2:1 (FIG. 37) and 8.0:1 (FIG. 40). It is thus noted that the snowmobile, or at least the skis thereof, become easier to lift off the ground as the actuating assembly is operated.

It should therefore be understood that, even if the force required to lift a snowmobile from 1 inch off the ground to two inches off the ground increases, the force required to operate the actuating assembly remains relatively low due to the increase in the efficiency ratio. This configuration (e.g., the increase of the efficiency ratio during the lifting phase) also allows for the system to be operated without having to pre-emptively lift the snowmobile ski.

Once the wheel is in the over-centered and engaged position, the actuating assembly is locked in this configuration as long as the wheel remains in contact with the ground. It is thus noted that reducing or removing the ground pressure, for example, by lifting the ski and/or the front end of the snowmobile, enables the wheel to move back toward the stowed position. The wheel can be adapted to move back via gravity (e.g., from the over-centered position (FIG. 40) to the centered position (FIG. 21)) and/or via the assistance of the biasing mechanism 60, as described above. The biasing mechanism 60 generates a force on the actuating assembly to autonomously revert the wheel to the stowed position (FIG. 16) without intervention from the user.

ALTERNATE EMBODIMENTS

Figure 43:
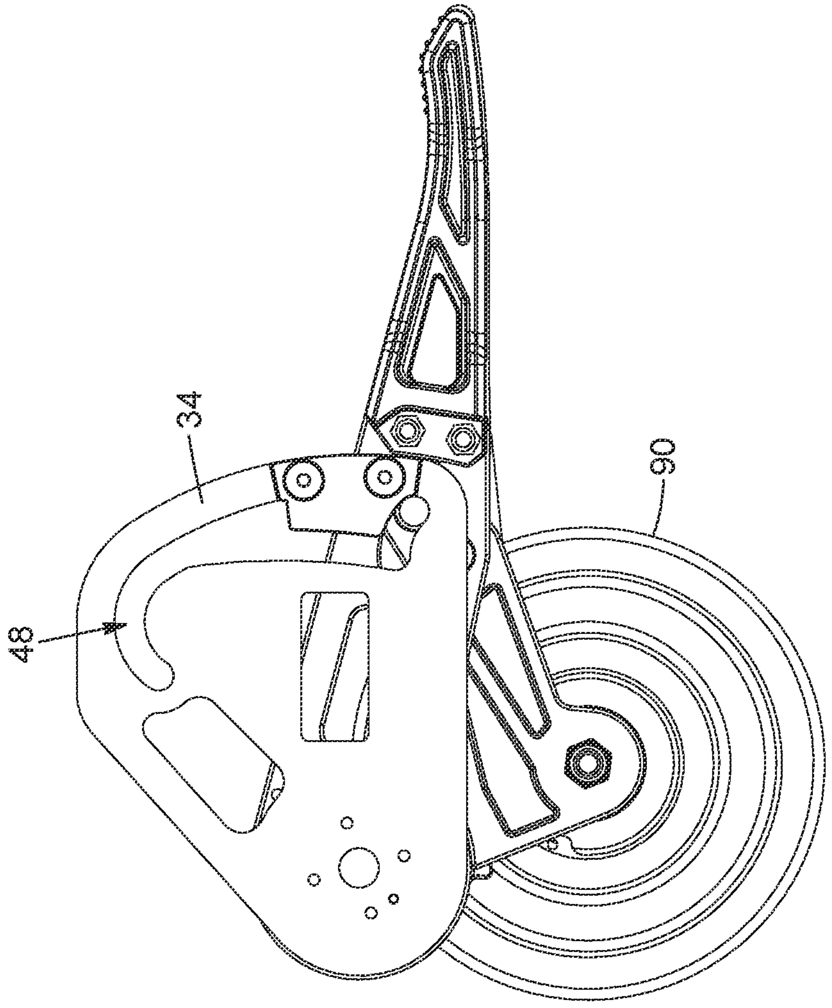
FIG. 43 is a rear view of the actuating assembly shown in FIG. 41, showing the coupler locked in an end position by the locking feature, according to an embodiment.
Figure 44:
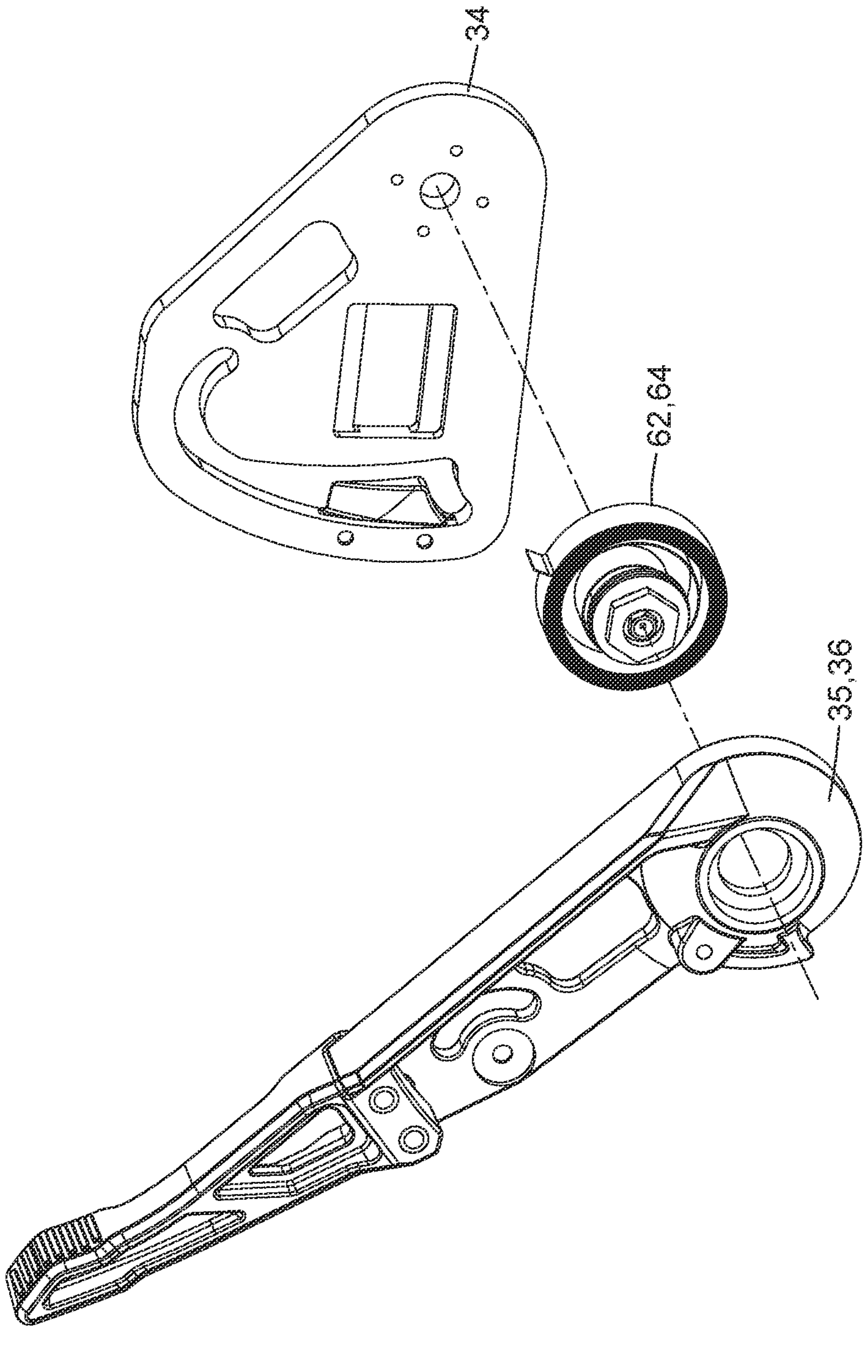
FIG. 44 is an exploded view of a portion of the actuating assembly, showing a helicoidal spring adapted to be housed within the driver segment, according to an embodiment.
Figure 45:
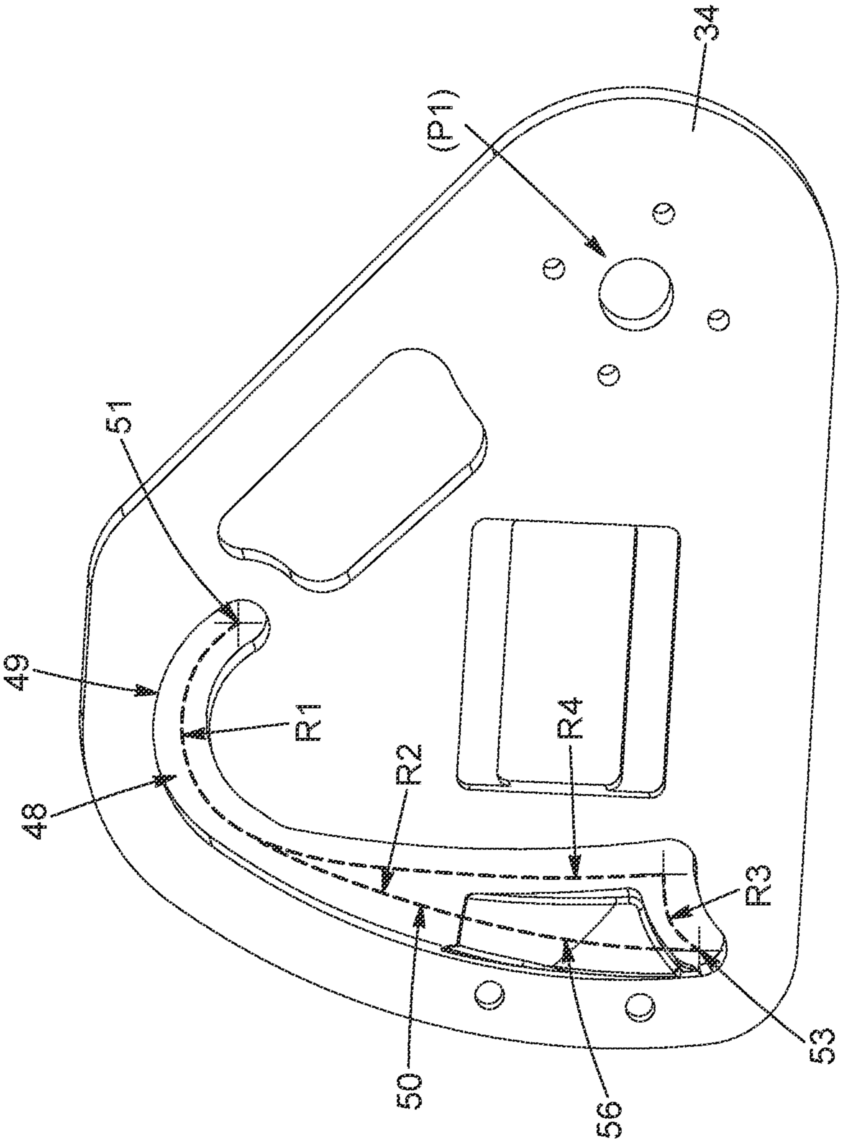
FIG. 45 is a front view of an alternate embodiment of the support plate, showing a guiding slot having overlapping deployment and retraction trajectories, according to an embodiment.
Figure 46:
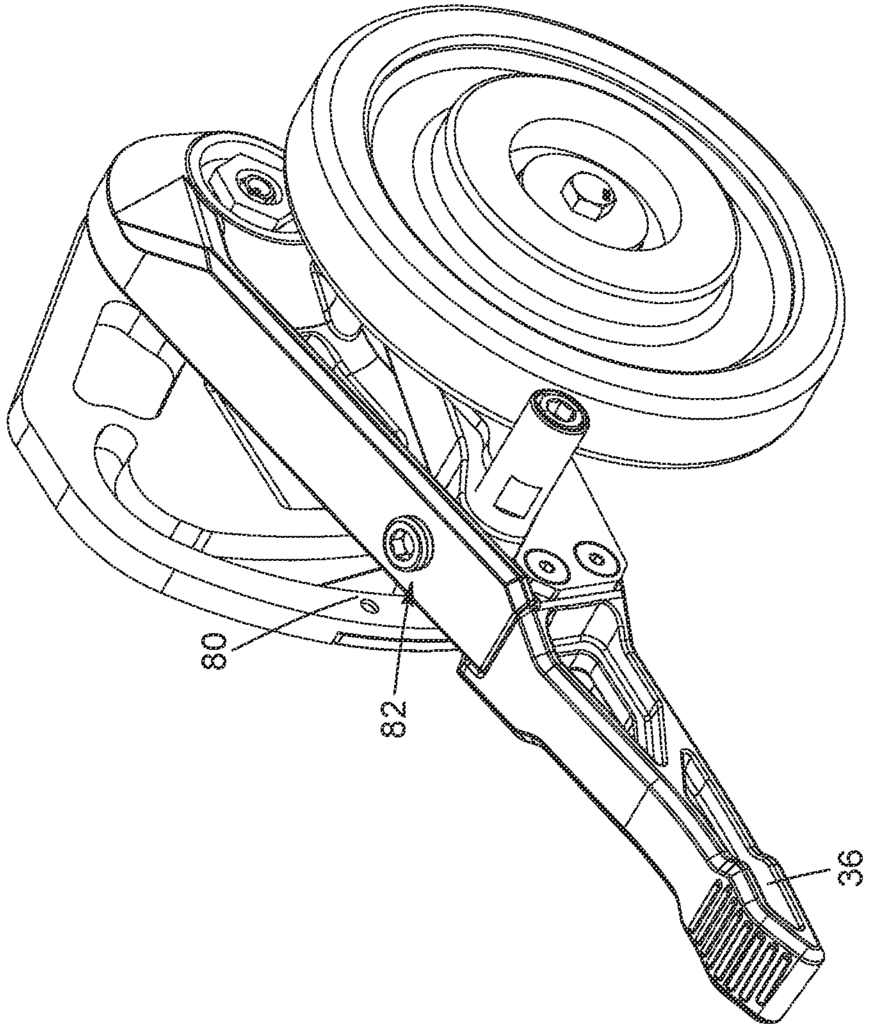
FIG. 46 is a top perspective view of an alternate embodiment of the actuating assembly, showing a blocking mechanism operable to lock the actuating assembly in the desired configuration.
Figure 48:
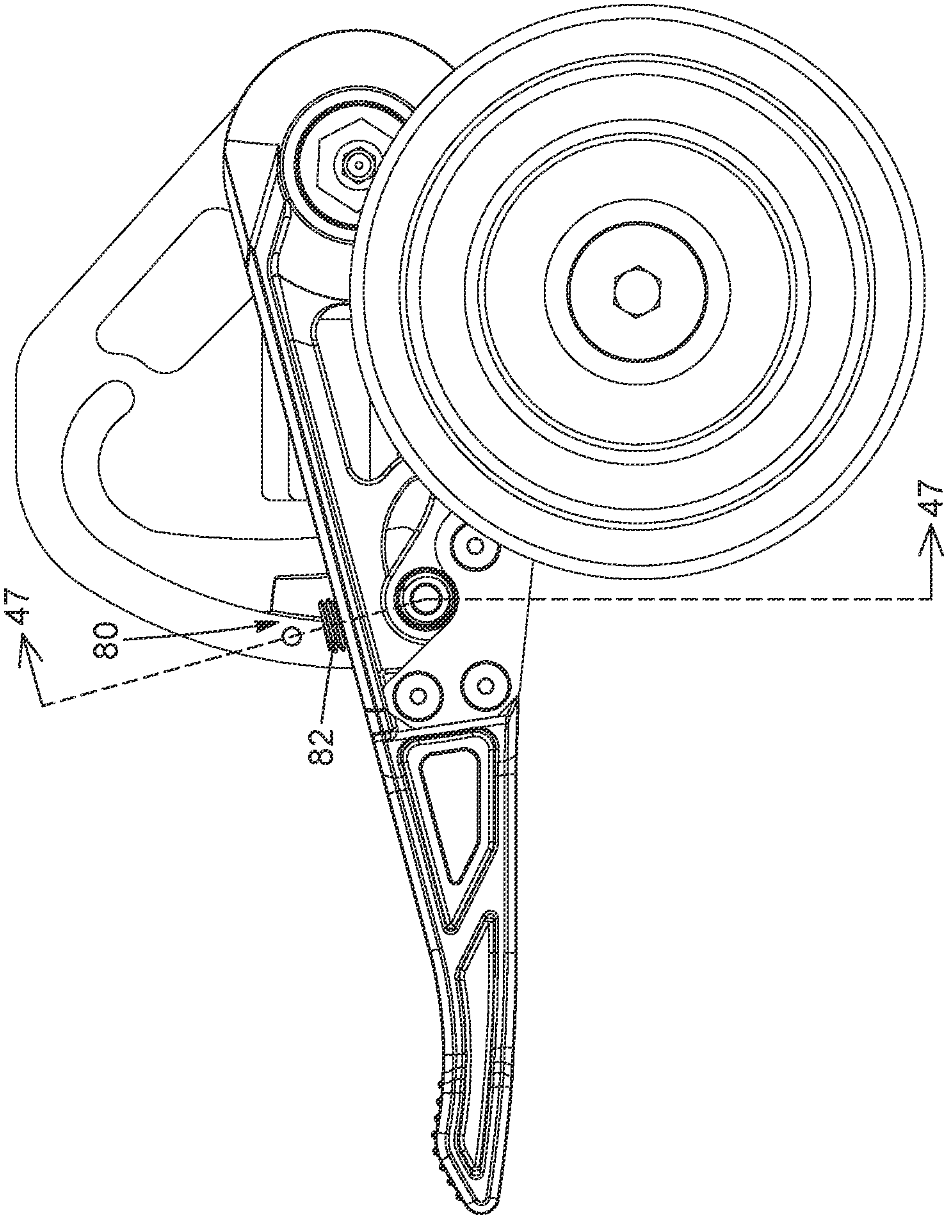
FIGS. 47 and 48 are side and front views of the actuating assembly shown in FIG. 46, respectively, showing a set screw of the blocking mechanism in an unlocked position, according to an embodiment.
Figure 47:
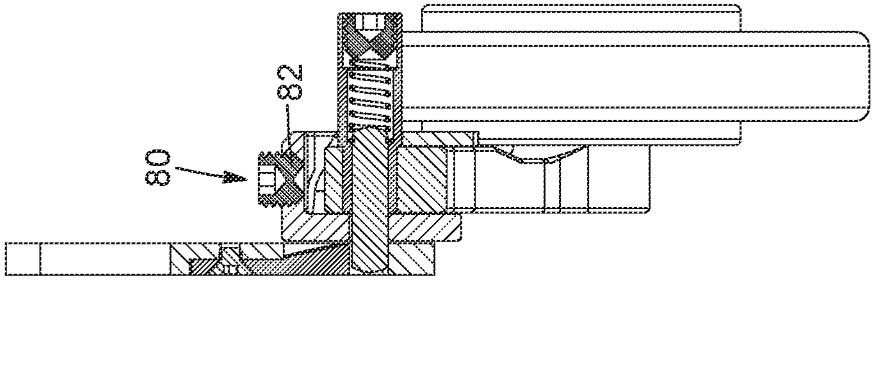

With reference to FIGS. 43 to 45, an alternate embodiment of the support plate 34 is shown. In this embodiment, the guiding slot 48 includes a single opening or recess defined in the support plate. Therefore, the deployment trajectory of the coupler and the retraction trajectory overlap one another along at least a portion thereof, such as along the first portion proximate the top end of the guiding slot. Moreover, in this embodiment, the cam device 56 is removably connected to the support plate 34, thereby enabling, removal, replacement and/or repair thereof when desired. It should be noted that additional cam devices can be connected to the support plate 34, as described herein.

Figure 58:
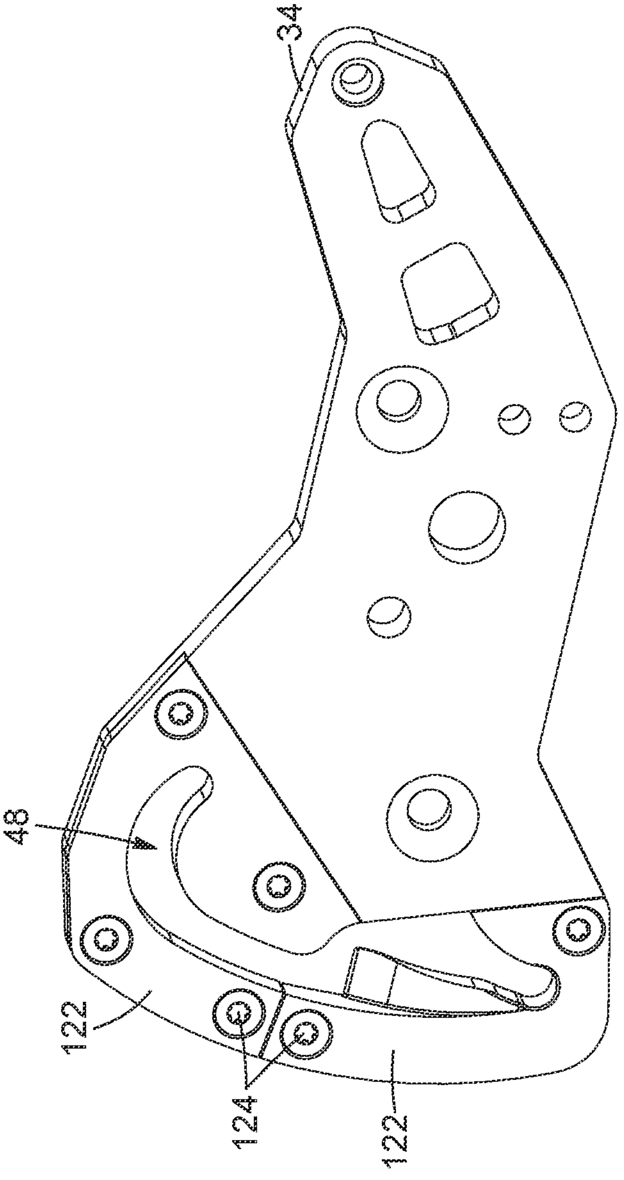
FIG. 58 is a perspective view of an alternate embodiment of the support plate.
Figure 59:
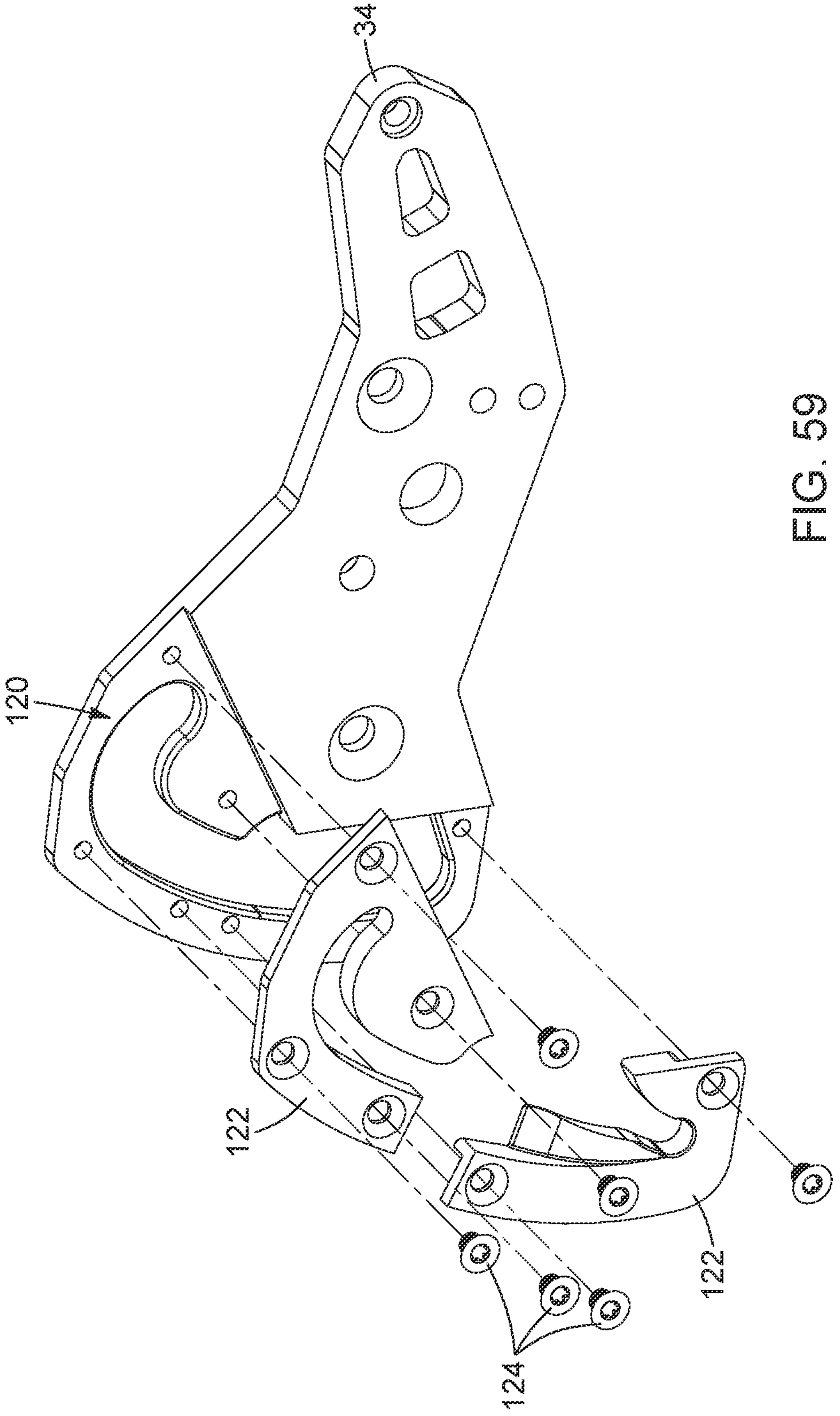
FIG. 59 is an exploded view of the support plate shown in FIG. 58, showing support plate inserts connectable to the support plate, according to an embodiment.
Figure 60:
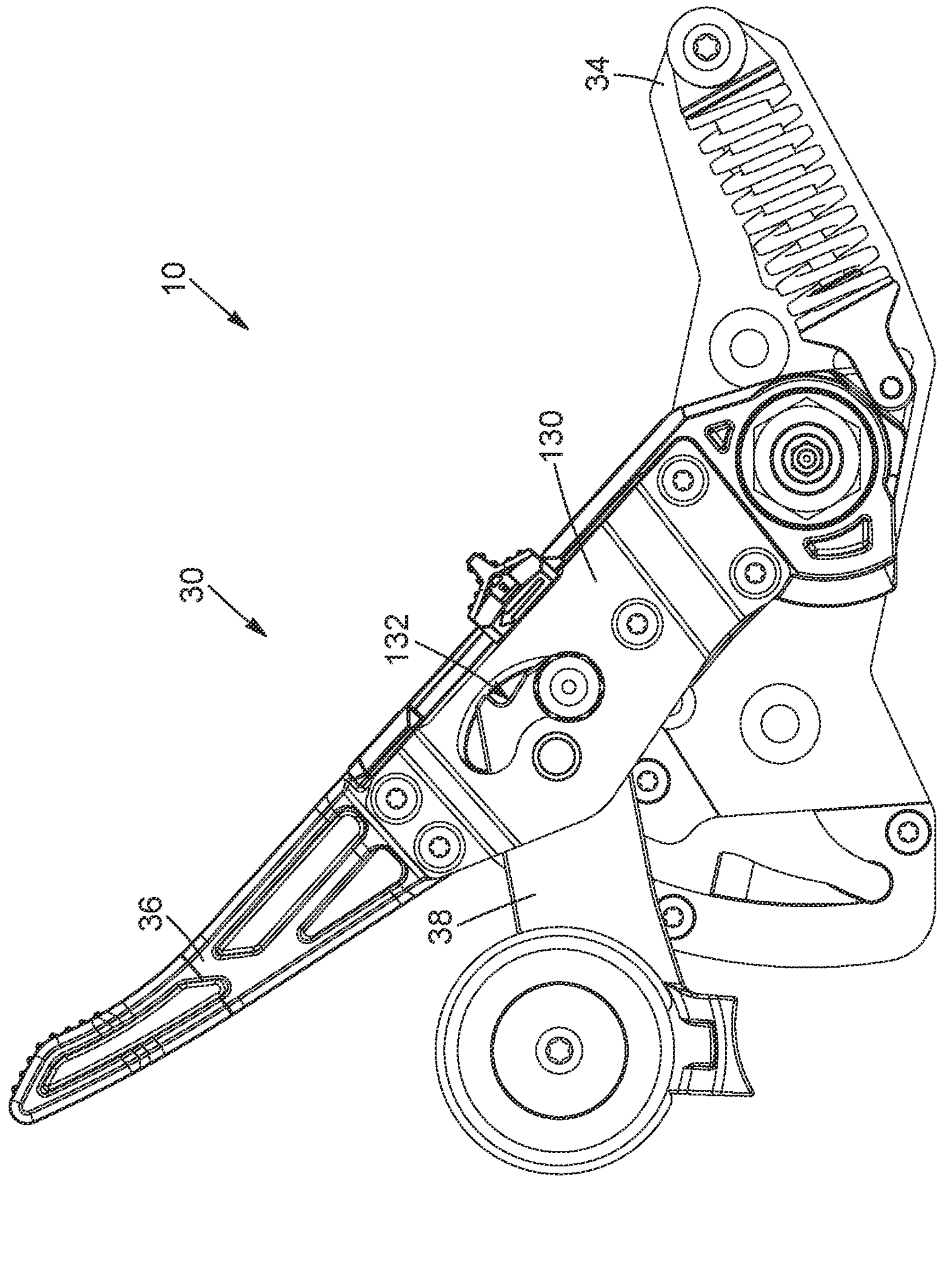
FIG. 60 is a front view of an alternate embodiment of the actuating assembly, showing a cover plate coupled to the driver and driven segments.

Another embodiment of the support plate 34 is shown in FIGS. 58 and 59. In this embodiment, the support plate 34 includes a stepped portion 120 having a reduced thickness relative to the rest of the support plate. One or more support plate inserts 122 can be removably connectable to the support plate in the stepped portion 120, for example, via mechanical fasteners 124. In the present embodiment, the combined thickness of the stepped portion 120 and of one of the plate inserts 122 substantially corresponds to the thickness of the rest of the support plate 34, although other configurations are possible. As seen in FIGS. 58 and 59, the support plate 34 can include two support plate inserts 122 having respective sections of the guiding slot 48 for guiding the coupler. It is noted that the coupler slides along the guiding slot 48 and can therefore damage or wear the support plate inserts 122. As such, having the support plate inserts 122 be removably connected enables repairs and/or replacement when required. The support plate inserts 122 can be made of any suitable material, such as material having characteristics (e.g., elasticity, viscosity, hardness, brittleness, rigidity, etc.) suitable for prolonged use. In some embodiments, the support plate inserts 122 are made of Nylatron®, although other materials or combinations of materials are possible and may be used.

Figure 50:
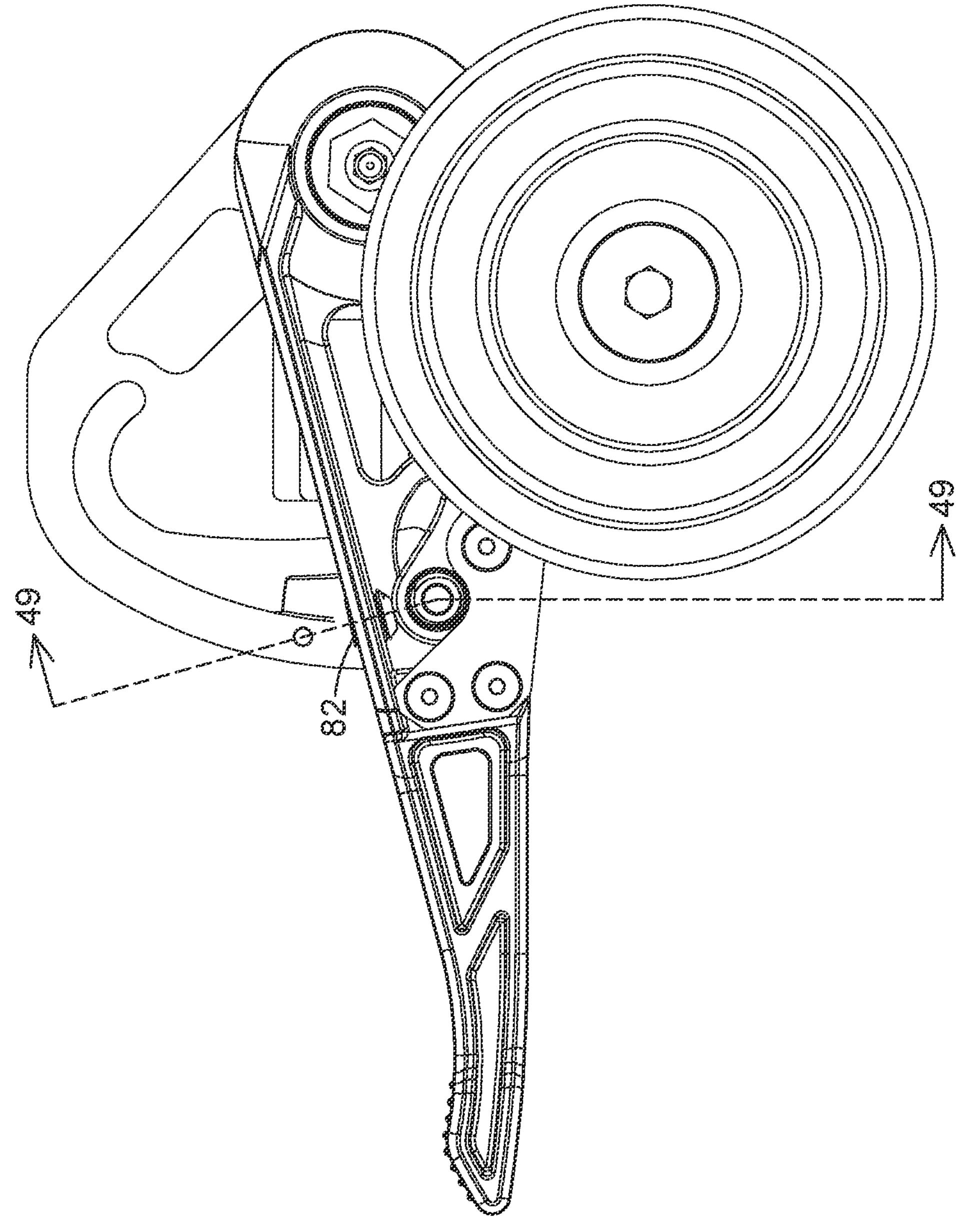
FIGS. 49 and 50 are side and front views of the actuating assembly shown in FIG. 46, respectively, showing the set screw of the blocking mechanism in a locked position, according to an embodiment.
Figure 49:
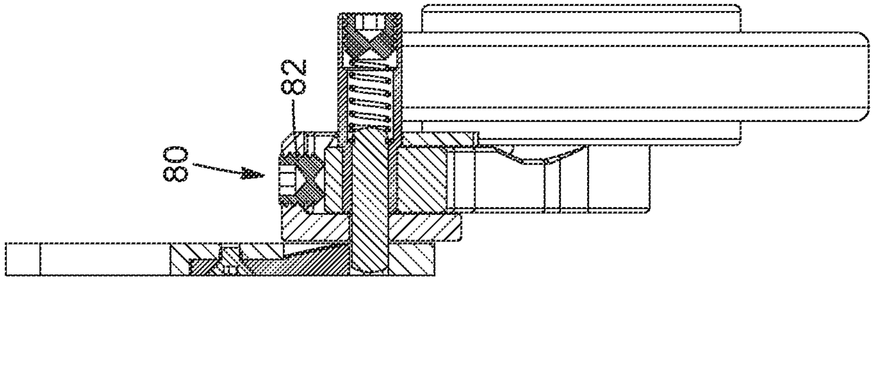

In another possible embodiment, and as seen in FIGS. 46 to 50, the actuating assembly 30 can include a blocking mechanism 80 selectively operable to lock any part of the actuating assembly 30 in the desired position. More specifically, the blocking mechanism 80 can be configured to lock the position/configuration of the actuating assembly, even if the wheel becomes disengaged from the ground. It is appreciated that, due to the interconnection and/or cooperation between the driver segment, driven segment and the wheel, blocking movement of one of these components can block movement of the other two. in this embodiment, the blocking mechanism 80 can include a set screw 82 operatively coupled to the driver segment 36 to selectively impede movement of the coupler and/or driven segment along their respective trajectories, thereby blocking rotation of the wheel. For example, the set screw 82 can be operated to lock the actuating assembly in the engaged or deployed configuration. In other words, after operating the actuating assembly in the deployed configuration, the set screw 82 can be operated (e.g., screwed into the driver segment) from the unlocked position (FIG. 48) to the locked position (FIG. 50). When in the locked position, a portion of the set screw extends across the retraction trajectory of the coupler, thereby blocking its retraction and locking the assembly in the deployed configuration. The blocking mechanism 80 is manually operable by screwing and unscrewing the set screw, although it is appreciated that automated operation is possible (e.g., via a rotative motor). Manual operation of the blocking mechanism can require a tool (e.g., hexagonal key) or be toollessly accomplished (e.g., using fingers to screw/unscrew).

Figure 51:
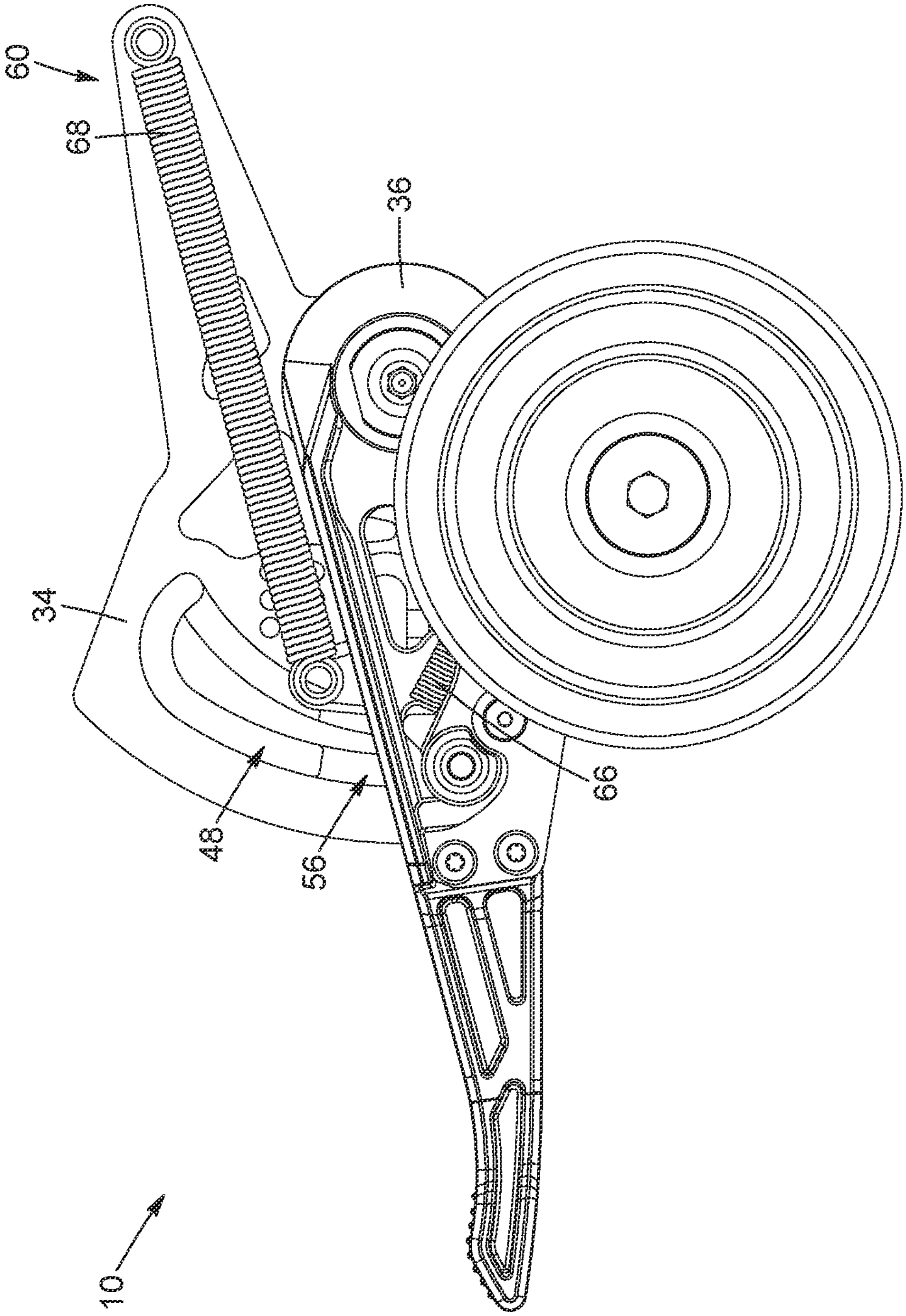
FIG. 51 is a front view of an alternate embodiment of the actuating assembly, showing a biasing mechanism provided with a pair of springs coupled between the driver segment, the driven segment and/or the support plate, according to an embodiment.

With reference to FIG. 51, another embodiment of the wheel system 10 is shown. In this embodiment, the driver segment 36 is operatively coupled to the support plate 34 via an extension spring 68. The extension spring 68 can be part of the biasing mechanism 60 configured to bias the wheel back into the stowed position. Similar to the helicoidal spring described in relation with previous embodiments, the extension spring 68 is configured to generate a force opposite the force required to operate the actuating assembly in order to revert the assembly to the idle configuration. In other words, the extension spring is adapted to generate a force on the driver segment to bring the coupler back to the start position (e.g., see reference 51 in FIG. 10). In some embodiments, the extension spring 68 can be adapted to replace the previously described helicoidal spring, although it is appreciated that the extension spring 68 and the helicoidal spring can cooperate to generate the force for reverting the assembly to the idle configuration.

The extension spring 68 can be configured to generate an increased force (e.g., when compared to the helicoidal spring) to have the coupler move/rotate about the first pivot. However, the increased force can cause the coupler to generate sufficient friction forces against the cam device 56 and/or the sides of the guiding slot 48 such that the system is blocked or in a "self-locking" configuration. As such, the biasing mechanism can include a secondary resilient element (e.g., the tension spring 66) configured to bias the coupler from its deployment trajectory to it retraction trajectory. In other words, the tension spring 66 can be adapted to at least partially counter the friction forces generated between the coupler and the cam device, and bias the coupler toward the retraction slot section, thereby enabling movement toward the start position.

Figure 53:
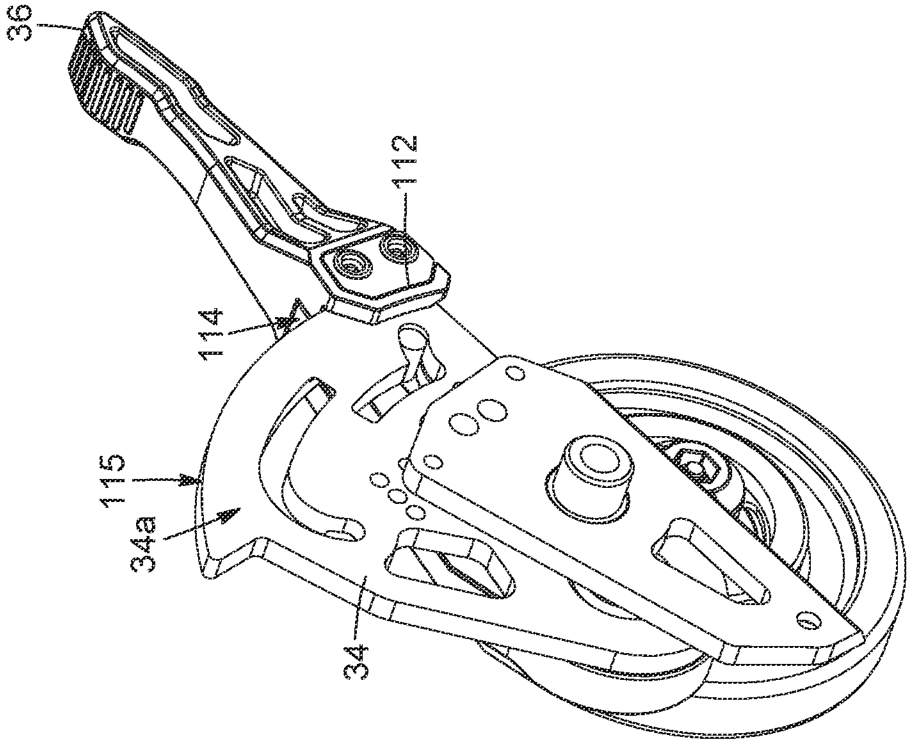
FIGS. 52 and 53 are rear perspective views of the actuating assembly shown in FIG. 51, showing a driver guide adapted to guide the rotational movement of the driver segment, according to an embodiment.
Figure 52:
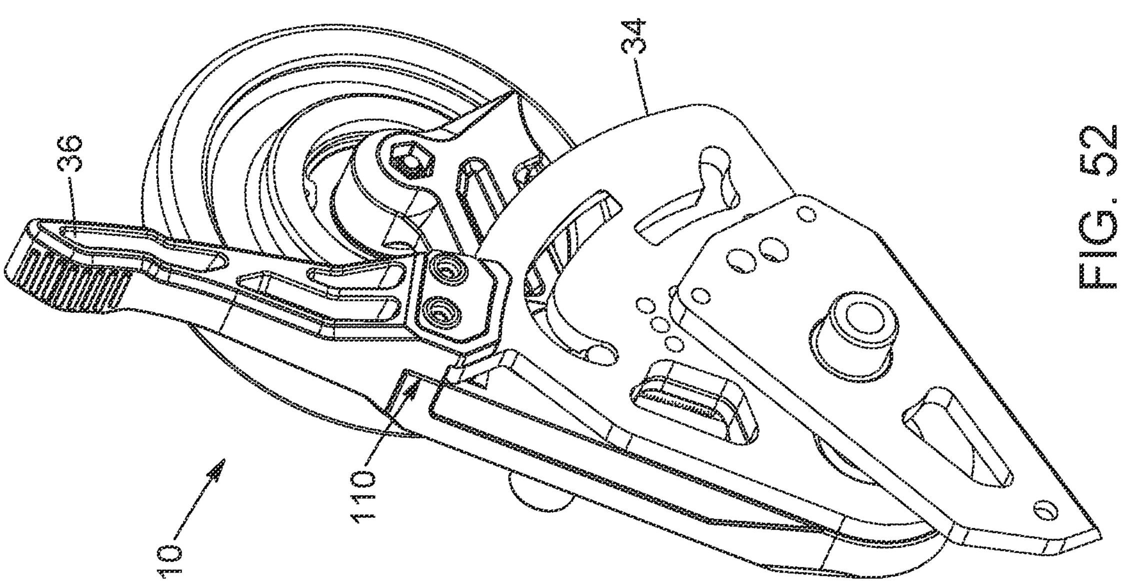

As seen in FIGS. 52 and 53, the wheel system 10 can include a driver guide 110 configured to maintain the driver segment 36 generally parallel to the support plate 34 during movement thereof. In some embodiments, the one or more springs of the biasing mechanism can generate forces which can at least partially offset the driver segment relative to the support plate, for example. In this embodiment, the driver guide 110 can include a segment extension 112 extending from a portion of the driver segment 36 along a rear surface **34*a* of the support plate 34. The segment extension 112 can be positioned so as to engage a periphery of the support plate, such as a forward edge 115 thereof. More specifically, the segment extension 112 defines a recess 114 with the body of the driver segment, and the forward edge 115 is shaped and sized to extend within and engage the recess 114. As illustrated, the forward edge 115 can be shaped and sized to maintain the segment extension 112 in engagement therewith, whether in the idle configuration (FIG. 52) or the deployed configuration (FIG. 53). It is noted that the driver guide 110 can guide the driver segment 36 via contact and/or friction between the segment extension 112 and the support plate. In some embodiments, the distal end of the driver segment can be made of plastic and removably connected to the proximal end 36*a*** to enable replacement, for example, after prolonged use and/or damaging the driver segment.

Figure 54:
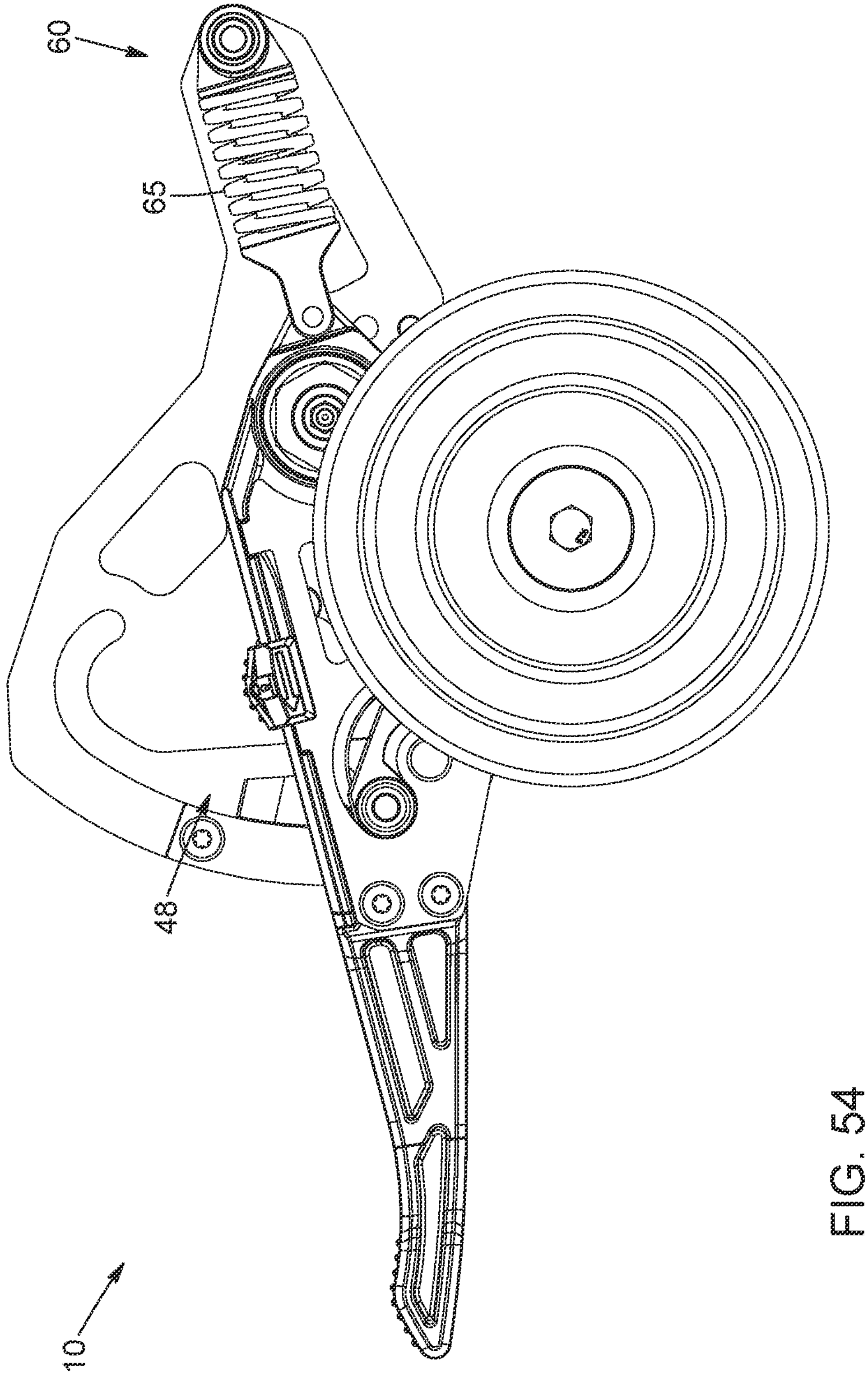
FIG. 54 is a front view of an alternate embodiment of the actuating assembly, showing a compression spring coupled between the support plate and a proximal end of the driver segment.
Figure 55:
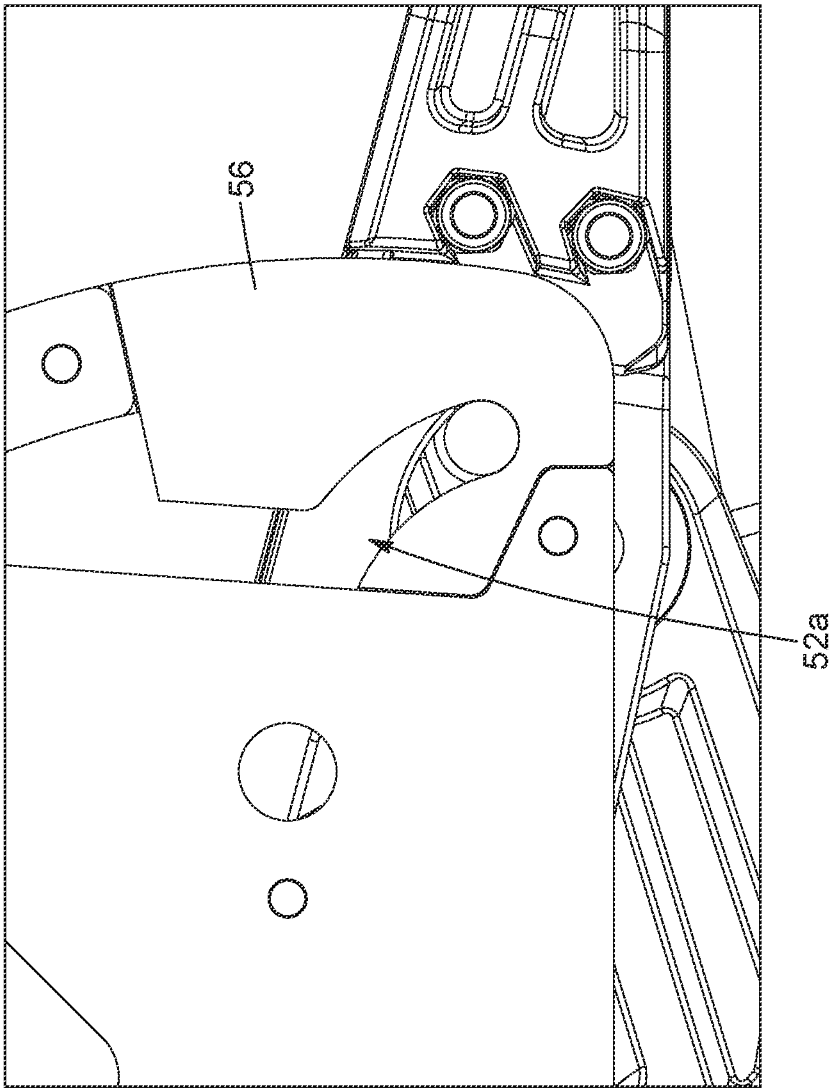
FIG. 55 is an enlarged rear view of the actuating assembly shown in FIG. 54, showing an angled section of the guiding slot, according to an embodiment.

Now referring to FIGS. 54 to 57B, another embodiment of the wheel system 10 is shown. In this embodiment, the biasing mechanism 60 includes a compression spring 65, such as a high-force compression spring (e.g., a die spring). The compression spring 65 generates an axial force (F) adapted to push against the proximal end of the driver segment 36, thereby defining a lever arm (L) with the first pivot axis. The compression spring is therefore adapted to generate torque equal to the spring force multiplied by the length of the lever arm. It should be noted that, when in the idle configuration (e.g., illustrated in FIG. 56), the lever arm is longer than when in the deployed configuration (e.g., illustrated in FIG. 54). In this embodiment, when in the deployed configuration, the axial force generated by the compression spring is slightly offset relative to the main pivot, therefore defining the shorter lever arm. This configuration of the compression spring thereby lowers the generated torque about the first pivot, which in turn lowers the generated friction forces of the coupler within the guiding slot 48. It is thus noted that the secondary resilient element is no longer required to assist in moving the coupler toward the retraction slot section. As seen in FIG. 55, the first retraction portion 52*a* defines a more acute angle with the deployment slot section, thereby reducing further the friction forces and facilitating retraction of the coupler to the start position.

However, it should be noted that, in alternate embodiments, the compression spring can be adapted to generate an axial force aligned with the main pivot (when in the deployed configuration) such that the compression spring by itself would not be sufficient to bias the assembly back into the idle configuration. In such embodiments, the secondary resilient element would be required to at least partially rotating the assembly back towards the idle configuration. It is appreciated that, once the rotation has started, a lever arm is defined and the compression spring can assist in biasing the assembly into the idle configuration.

Figure 56:
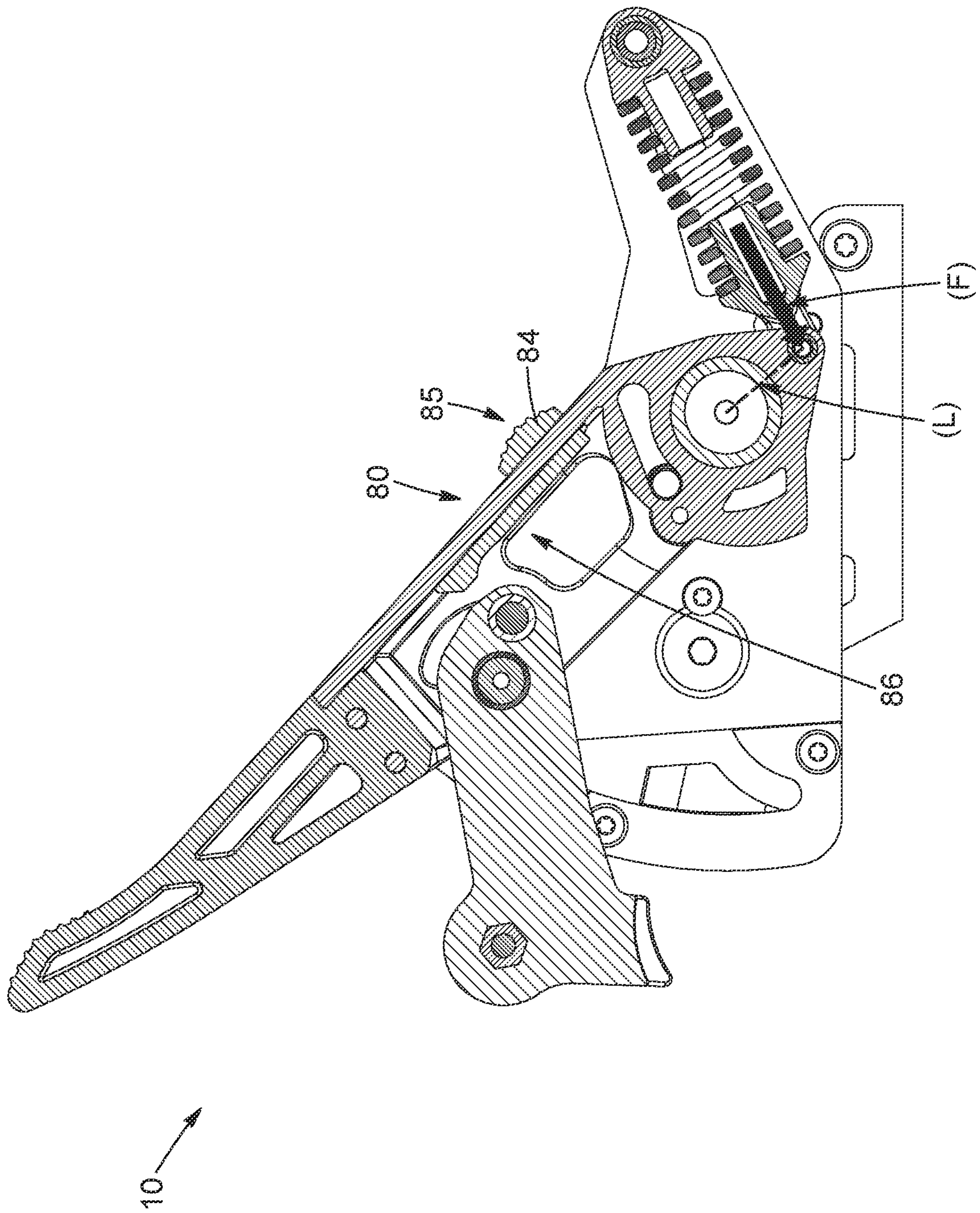
FIG. 56 is a front view of an alternate embodiment of the actuating assembly, showing a slider of the blocking mechanism mounted to a top part of the driver segment.
Figure 57B:
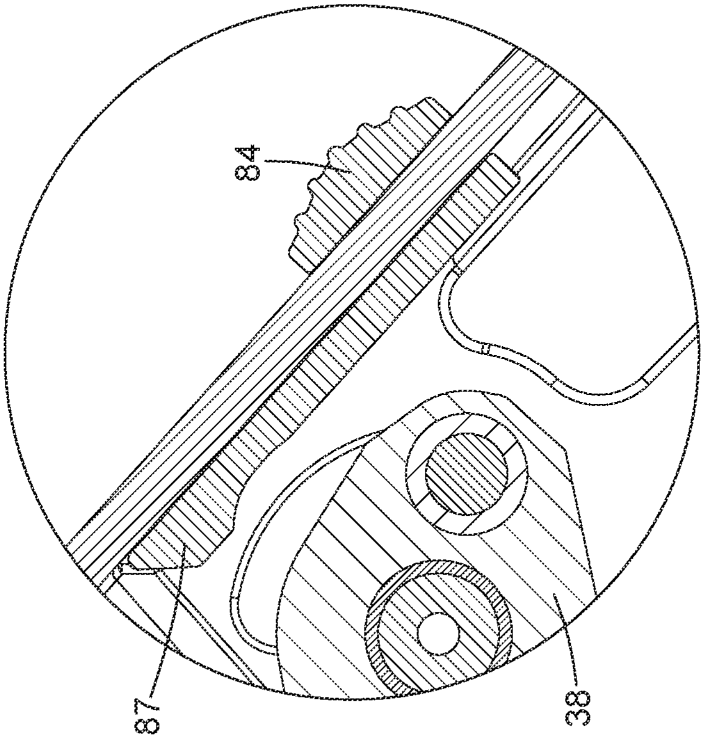
FIGS. 57A and 57B are enlarged views of the slider shown in FIG. 56, showing a blocker of the slider in an unlocked position (FIG. 57A) and in a locked position (FIG. 57B).
Figure 57A:
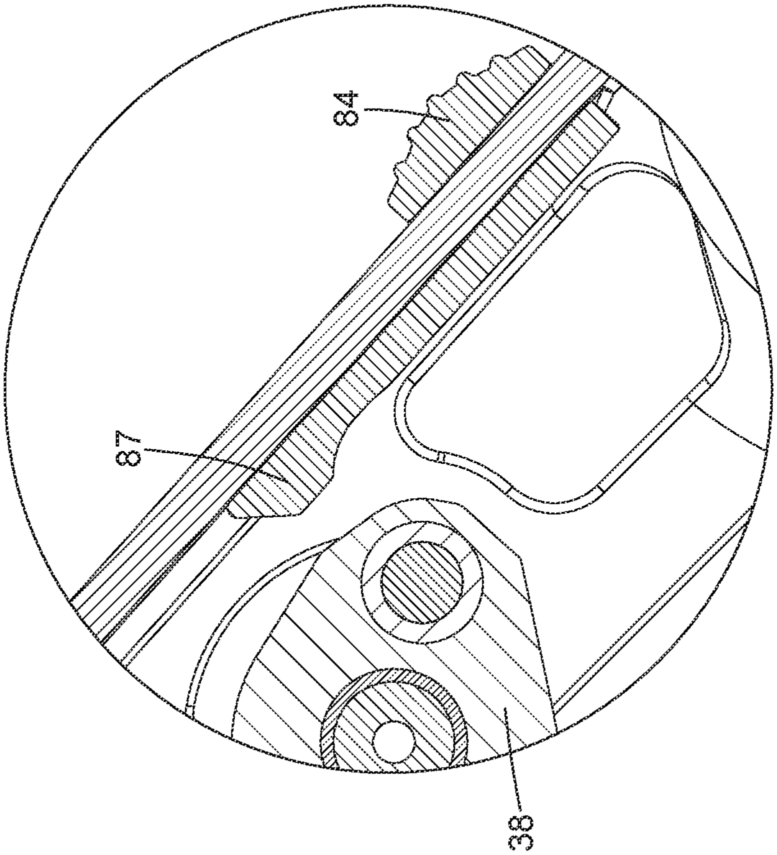

With reference to FIGS. 56 and 57B, in addition to FIGS. 54 and 55, another embodiment of the blocking mechanism 80 is shown. In this embodiment, the blocking mechanism 80 is operable to lock the wheel system 10 in both of the idle configuration and the deployed configuration. As such, unintentional and/or undesired change of configuration of the wheel system 10 can be prevented. In this embodiment, the blocking mechanism includes a slider 84 slidably coupled to the driver segment 36. The slider 84 includes a top part 85 extending above the driver segment and actuatable to operate the blocking mechanism, and a bottom part 86 provided with a blocker 87 adapted to prevent movement of at least one component of the wheel system 10. As seen in FIG. 57A, the slider 84 is in a first position, where the blocker 87 is spaced from the coupler channel and/or the driven segment. Upon operation thereof, for example, by sliding the top part 85 (e.g., manually by hand or foot), the blocker 87 becomes disposed in a second position, where a portion thereof blocks movement of the driven segment 38. As such, attempting to move the system from the idle to the deployed configuration is prevented since rotation of the driven segment (and thus movement of the coupler) is blocked. Similarly, when in the deployed configuration, the blocker 87 is adapted to block movement of at least the driven segment, thereby locking the system in the deployed configuration.

With reference to FIGS. 60 to 63, another embodiment of the wheel system 10 is shown. In this embodiment, the actuating assembly 30 includes a cover plate 130 connectable to the driver segment 36 and shaped and sized to cover a portion of the driven segment 38. The cover plate 130 includes a secondary coupler channel 132 shaped and adapted to have a portion of the coupler extend therethrough for guiding the coupler during actuation of the assembly 30 (similar to coupler channel 46 described in relation to previous embodiments). In this embodiment, the biasing mechanism includes a secondary pivot resilient element 134 provided between the driver segment 36 and the cover plate 130 and configured to assist in reverting the actuating assembly 30 towards the idle configuration.

Figure 61:
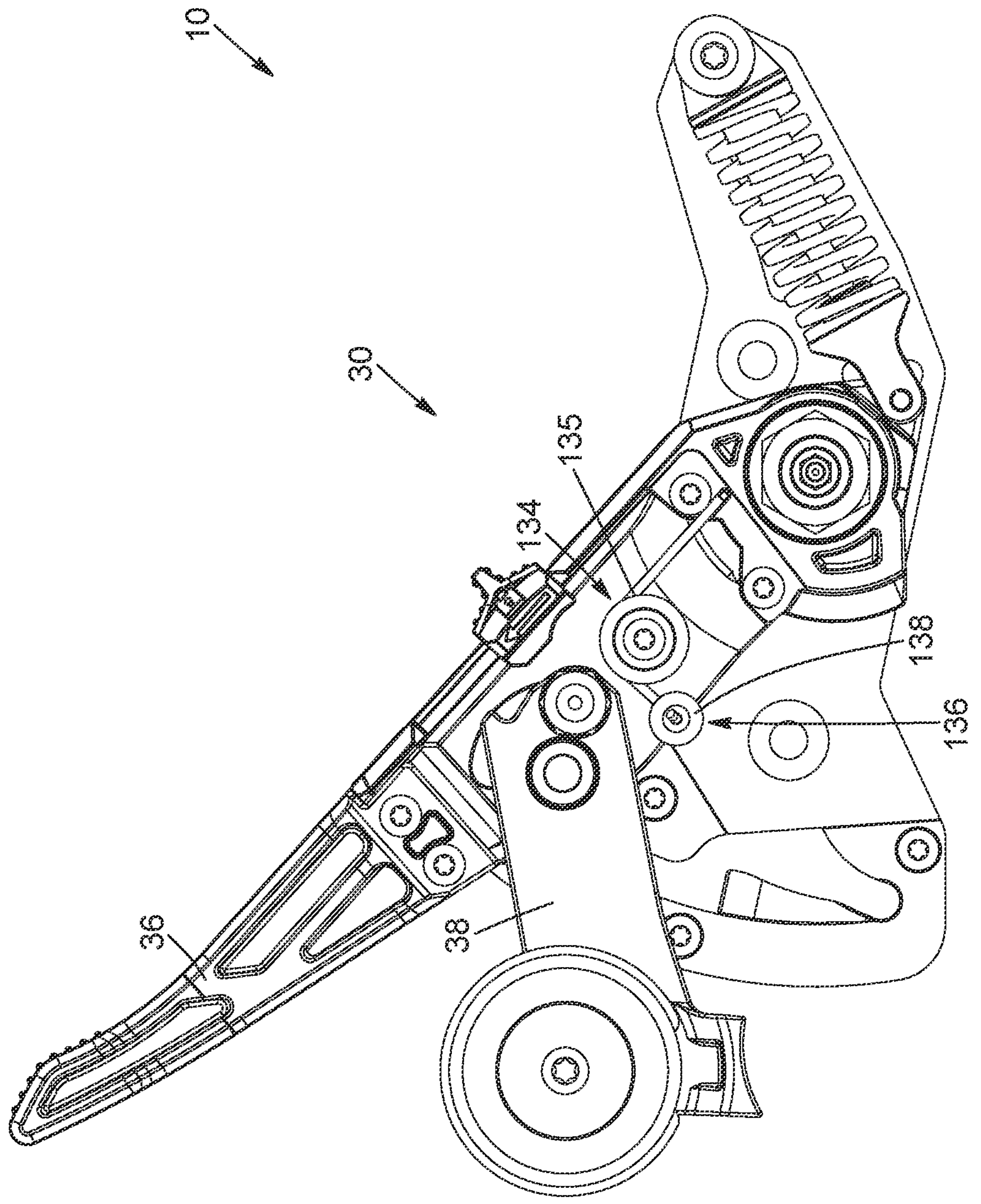
FIGS. 61 to 63 are front views of the actuating assembly shown in FIG. 60 with the cover plate removed, showing a secondary pivot resilient element configured to be engaged by the driven segment during rotation thereof, according to an embodiment.
Figure 62:
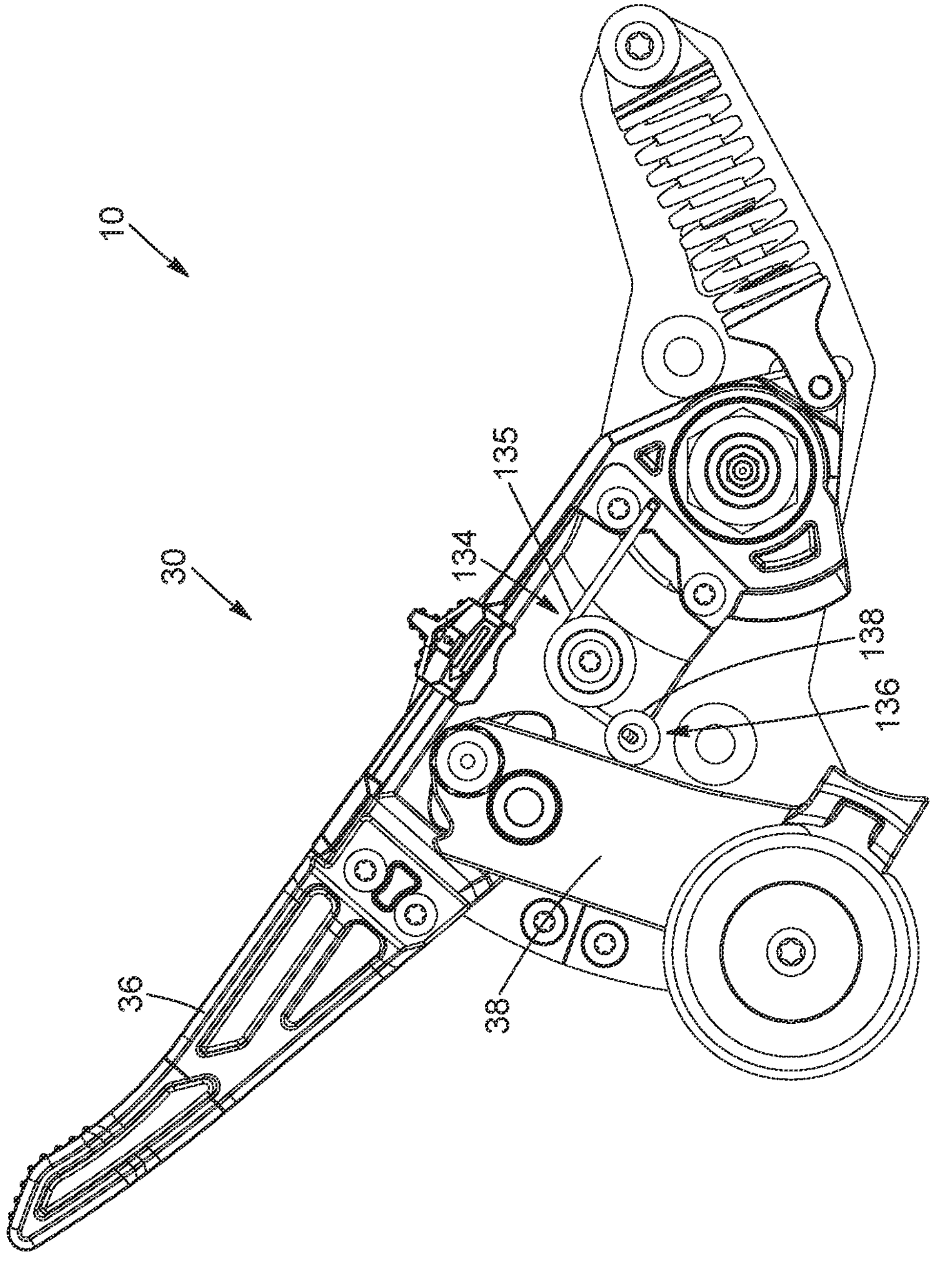
Figure 63:
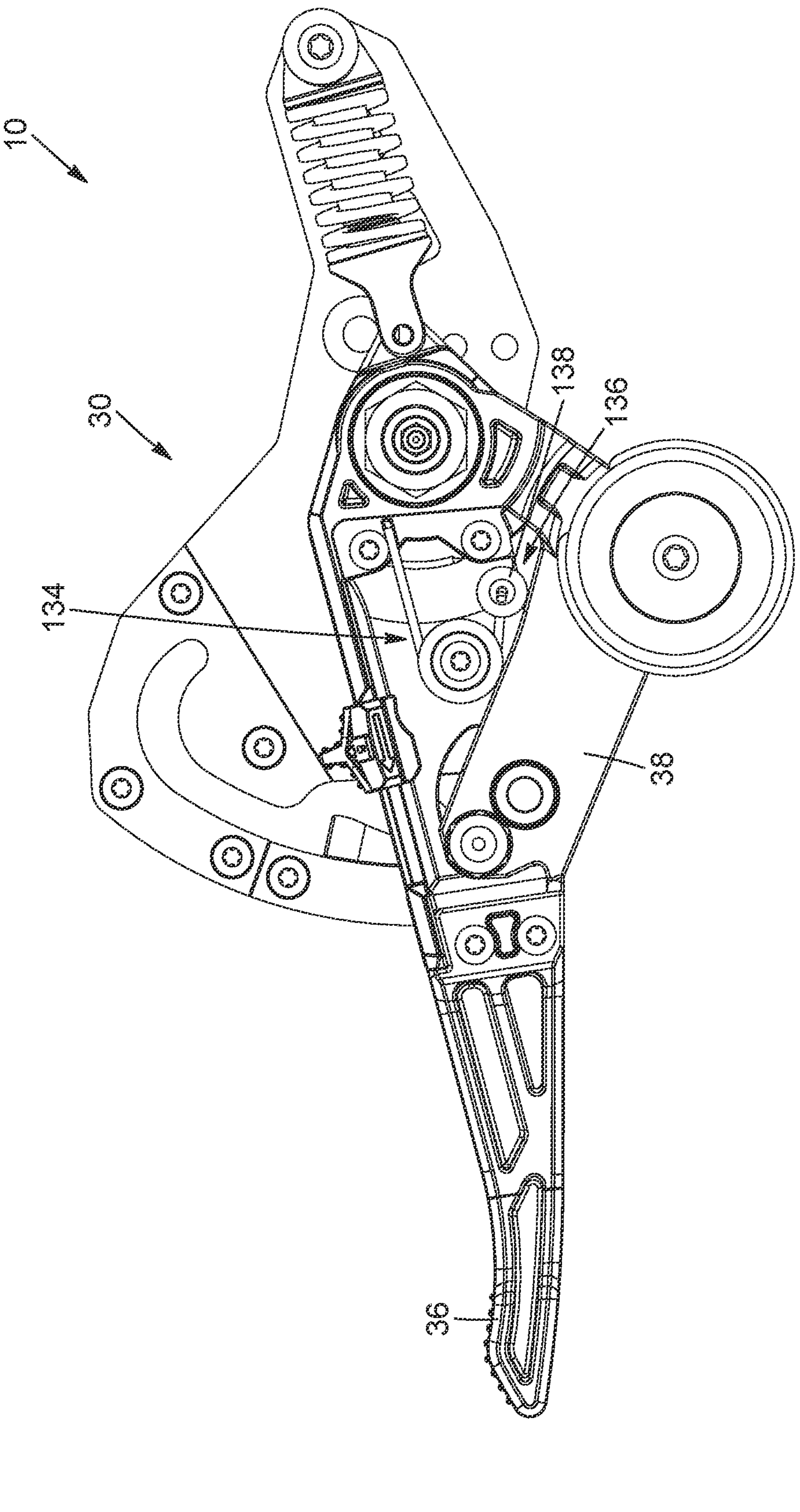

In FIGS. 61 to 63, the actuating assembly 30 is shown with the cover plate removed to better illustrate the secondary pivot resilient element 134. In this embodiment, the secondary pivot resilient element 134 includes a torsion spring 135 having a free end 136 configured to engage the driven segment 38 during operation of the actuation assembly 30. More specifically, as the driver segment is rotated, the driven segment 38 correspondingly rotates and engages the free end 136 of the torsion spring 135, thereby twisting the torsion spring 135. The torsion spring 135 is configured to resist the twisting motion and therefore generates a force in the opposite direction in order to assist in reverting the actuating assembly to the idle configuration.

As seen in FIGS. 61 to 63, when in the idle configuration (FIG. 61), the torsion spring 135 is at rest and the free end 136 is spaced from the driven segment 38. As the actuating assembly is operated (e.g., via rotation of the driver segment), the driven segment is rotated and engages the free end 136. This can correspond to a partially deployed configuration of the actuating assembly (FIG. 62). Rotating the driver segment further to operate the actuating assembly in the deployed configuration (FIG. 63) urges the driven segment in rotation to push against the free end 136 and twist the torsion spring 135. The torsion spring 135 therefore stores the corresponding mechanical energy to exert a torque on the driven segment 38 in order to bias the assembly back towards the idle configuration. In some embodiments, the free end 136 of the torsion spring 135 includes a roller 138 configured to roll along the driven segment 38 during rotation thereof to facilitate (e.g., to not hinder) its movement. The roller 138 can be mounted to the free end 136 in a manner enabling free rolling although other configurations are possible.

It should be noted that other embodiments of the biasing mechanism are possible, and more particularly, of the secondary pivot resilient element 134. For instance, the torsion spring 135 can be replaced, or assisted, by a clock spring, an assortment of magnets arranged to repel each other when nearing the deployed configuration, a counterweight system, among other possibilities.

It should be appreciated from the present disclosure that the various implementations of the snowmobile retractable wheel system, actuating assembly and related components assist and facilitate configuring the snowmobile between the skis and the wheels. Each actuating assembly is configured to enable the corresponding wheel to be selectively moved to engage the ground and lift the ski, thereby enabling riding the snowmobile on the wheels. The actuating assembly includes a double-pivot mechanism actuatable by pivoting a lever (e.g., the driver segment) to engage the wheel. It is noted that having two pivots moving simultaneously allows for greater motion of the wheel caused by a smaller motion of the lever (e.g., in relation to the motion of the wheel). This can reduce the required space required to operate the retractable wheel system, allowing for a more compact and versatile design. The double-pivot mechanism further provides an efficiency ratio, which increases as the lever is pivoted further toward the deployed configuration. Therefore, actuation of the system and deployment of the wheel is facilitated.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the implementations set forth in the examples, but should be given the broadest interpretation consistent with the description as a whole. For instance, the actuating assembly can include a plurality of couplers selectively engageable with the driver and/or driven segments based on the phase of operation (e.g., positioning phase, lifting phase, locking phase, etc.).

As used herein, the terms "coupled", "coupling", "attached", "connected" or variants thereof as used herein can have several different meanings depending in the context in which these terms are used. For example, the terms coupled, coupling, connected or attached can have a mechanical connotation. For example, as used herein, the terms coupled, coupling or attached can indicate that two elements or devices are directly connected to one another or connected to one another through one or more intermediate elements or devices via a mechanical element depending on the particular context.

In the present disclosure, the same numerical references refer to similar elements. In addition, for the sake of simplicity and clarity, namely so as to not unduly burden the figures with several reference numbers, not all figures contain references to all the components and features shown, and references to some components and features may be found in only one figure, and components and features of the present disclosure which are illustrated in other figures can be easily inferred therefrom. The embodiments, geometrical configurations, materials mentioned and/or dimensions shown in the figures are optional and are given for exemplification purposes only.

Furthermore, although the various exemplary embodiments of the wheel system described herein may be used in relation with a snowmobile ski, it is understood that it may be used with other types of skis and/or for other purposes. For this reason, the term "ski" as used herein should not be taken as to limit the scope of the present disclosure as being used with snowmobile skis in particular. It should be understood that the term "ski" should, in the context of the present disclosure, encompass all other types of skis with which the described embodiments could be used and may be useful. It is further noted that the retractable system can be used in combination with other equipment or accessories (e.g., snow scrapers/scratchers), and/or for other types of applications.

In addition, although the optional configurations as illustrated in the accompanying drawings comprise various components and although the optional configurations of the wheel system as shown may consist of certain configurations as explained and illustrated herein, not all of these components and configurations are essential and thus should not be taken in their restrictive sense, i.e., should not be taken as to limit the scope of the present disclosure. It is to be understood that other suitable components and cooperations thereinbetween, as well as other suitable configurations may be used for the wheel system and corresponding parts, as briefly explained, and as can be easily inferred herefrom, without departing from the scope of the disclosure.

The invention claimed is:

1. A retractable wheel system for a snowmobile ski, comprising:

an actuating assembly comprising:

a support plate connectable to the snowmobile ski and comprising a first pivot; and a driver segment pivotally connected to the support plate and operable to pivot about the first pivot, the driver segment comprising a second pivot; and a driven segment pivotally connected to the driver segment and operable to pivot about the second pivot; and a wheel coupled to the driven segment and movable therewith about the second pivot between a stowed position, where the wheel is spaced from a ground surface, and a deployed position, where the wheel is in engagement with the ground surface and provides lift to the snowmobile ski relative to the ground surface, wherein operating the driver segment to pivot about the first pivot engages the second pivot in rotation about the first pivot, and further engages the driven segment and the wheel in rotation about the second pivot to position the wheel in the deployed position, wherein the actuating assembly comprises a biasing mechanism provided with one or more resilient elements configured to bias the wheel to the stowed position.

2. The retractable wheel system of claim 1, wherein the first member comprises a coupler channel defined along a portion thereof, and wherein the actuating assembly further comprises a coupler adapted to extend through the driven segment and engage the coupler channel to operatively couple the driven segment to the driver segment, the coupler channel being arcuate and extending at least partially about the second pivot, and wherein the coupler is configured to guide the rotation of the driven segment and of the wheel about the second pivot upon pivoting the driver segment about the first pivot.

3. The retractable wheel system of claim 2, wherein the coupler channel includes a first end and a second end and is adapted to limit movement of the coupler about the second pivot, thereby defining a predetermined range of rotational movement of the wheel about the second pivot.

4. The retractable wheel system of claim 3, wherein, upon pivoting the first member, the coupler is adapted to slide along the coupler channel from the first end toward the second end, and the wheel is adapted to pivot about the first pivot and the second pivot simultaneously.

5. The retractable wheel system of claim 4, wherein, upon sliding the coupler from the first end to the second end, the wheel is pivoted further than a normal vector extending from the ground surface through the second pivot.

6. The retractable wheel system of claim 3, wherein, when the coupler abuts against the second end, rotation of the driven segment and the wheel about the second pivot is blocked, and further pivoting the driver segment engages the driven segment and the wheel in rotation about the first pivot, and wherein the wheel is adapted to engage with and push against the ground surface for lifting the snowmobile ski from the ground.

7. The retractable wheel system of claim 2, wherein the support plate comprises a guiding slot, and wherein the coupler is adapted to extend through the driver segment and the driven segment to engage the guiding slot and operatively couple the driver segment, the driven segment and the support plate to one another.

8. The retractable wheel system of claim 7, wherein the guiding slot comprises:

a deployment slot section adapted to guide the coupler along a predetermined deployment trajectory from a starting location to an end location to guide the wheel from the stowed position to the deployed position; and a retraction slot section adapted to guide the coupler along a predetermined retraction trajectory from the end location to the starting location to guide the wheel from the deployed position to the stowed position.

9. The retractable wheel system of claim 8 wherein the deployment slot section and the retraction slot section at least partially overlap one another.

10. The retractable wheel system of claim 1, wherein the driver segment is adapted to pivot about the first pivot by a driver distance to engage the wheel in rotation about the second pivot by a wheel distance, wherein the wheel distance is about 3 to 12 times greater than the driver distance.

11. The retractable wheel system of claim 1, wherein the one or more resilient elements comprise a coiled spring or a helicoidal spring operatively coupled to the driver segment and configured to bias the driver segment about the first pivot to revert the wheel to the stowed position.

12. The retractable wheel system of claim 1, wherein the one or more resilient elements comprise at least one of a compression spring and an extension spring operatively coupled to at least one of the driver segment and the driven segment, the at least one of the compression spring and the extension spring being configured to generate a force opposing rotation of at least one of the driver segment and the driven segment to assist in reverting the wheel to the stowed position.

13. The retractable wheel system of claim 1, wherein the one or more resilient elements comprise a secondary pivot biasing element configured to oppose rotation of the driven segment about the second pivot and exert a force thereon to assist in reverting the wheel to the stowed position.

14. A retractable wheel system for a snowmobile ski, comprising:

a support plate connectable to the snowmobile ski;

an actuator operatively coupled to the support plate and comprising a driver segment and a driven segment adapted to cooperate to define a double-pivot assembly having a first pivot axis and a second pivot axis; and a wheel coupled to the double-pivot assembly and being movable along a first trajectory between a stowed position, where the wheel is spaced from a ground surface, and an intermediary position, where the wheel contacts the ground surface, the wheel being further movable along a second trajectory between the intermediary position and a deployed position, where the wheel is in engagement with the ground surface and provides lift to the snowmobile ski relative to the ground surface.

15. The retractable wheel system of claim 14, wherein movement of the wheel along the first trajectory includes a rotational movement of the wheel about the first pivot axis and a rotational movement of the wheel about the second pivot axis.

16. The retractable wheel system of claim 14, wherein the driver segment is pivotally connected to the support plate about the first pivot axis, and the driven segment is pivotally connected to the driver segment about the second pivot axis.

17. The retractable wheel system of claim 14, wherein the actuator comprises a follower pin configured to operatively couple the driven segment to the driver segment such that pivoting the driver segment about the first pivot axis engages the driven segment in rotation about the first pivot axis and the second pivot axis simultaneously.

18. The retractable wheel system of claim 17, wherein the actuator comprises an angular range limiter configured to block rotation of the wheel about the second pivot axis during movement of the wheel along the second trajectory.

19. The retractable wheel system of claim 18, wherein the follower pin is housed in a portion of the driven segment and operatively engages the angular range limiter, and wherein the angular range limiter comprises a groove defined in the driver segment.

* * * * *